(12) United States Patent
Ji et al.

(10) Patent No.: US 12,511,024 B2
(45) Date of Patent: Dec. 30, 2025

(54) MULTI-APPLICATION INTERACTION METHOD

(71) Applicant: Huawei Technologies Co., Ltd., Shenzhen (CN)

(72) Inventors: Wei Ji, Shanghai (CN); Xue Lu, Shanghai (CN); Zhenchao Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 18/245,277

(22) PCT Filed: Sep. 16, 2021

(86) PCT No.: PCT/CN2021/118690
§ 371 (c)(1),
(2) Date: Mar. 14, 2023

(87) PCT Pub. No.: WO2022/057852
PCT Pub. Date: Mar. 24, 2022

(65) Prior Publication Data
US 2023/0367464 A1     Nov. 16, 2023

(30) Foreign Application Priority Data

Sep. 16, 2020   (CN) .......................... 202010975274.8

(51) Int. Cl.
| G06F 3/04845 | (2022.01) |
| G06F 3/041 | (2006.01) |
| G06F 3/04842 | (2022.01) |
| G06F 3/0486 | (2013.01) |

(Continued)

(52) U.S. Cl.
CPC ........ *G06F 3/04845* (2013.01); *G06F 3/0412* (2013.01); *G06F 3/04842* (2013.01); *G06F 3/0486* (2013.01); *G06F 3/1431* (2013.01); *G06F 3/147* (2013.01); *G06F 2203/04803* (2013.01)

(58) Field of Classification Search
None
See application file for complete search history.

(56) References Cited

U.S. PATENT DOCUMENTS

2014/0160049 A1\* 6/2014 Shin ........................ G06F 9/543
345/173
2015/0067590 A1\* 3/2015 Lee ....................... G06F 3/0484
715/803

(Continued)

FOREIGN PATENT DOCUMENTS

CN          107491258 A     12/2017

*Primary Examiner* — Gabriel Mercado
(74) *Attorney, Agent, or Firm* — Conley Rose, P.C.

(57) ABSTRACT

A method includes a first electronic device that displays an interface of a first application and an interface of a second application and obtains first content in the interface of the first application and second content in the interface of the second application; receives a drag operation on both the first content and the second content and displays a first window after the first content and the second content are dragged to a first area on a touchscreen of the first electronic device, where the first window includes third content related to the first content and the second content and an option for sharing.

20 Claims, 88 Drawing Sheets

(51) Int. Cl.
*G06F 3/14* (2006.01)
*G06F 3/147* (2006.01)

(56) References Cited

U.S. PATENT DOCUMENTS

2017/0083182 A1\* 3/2017 Singh ................... G06F 3/0482
2018/0335913 A1\* 11/2018 Nilo ................... G06F 3/04817

\* cited by examiner

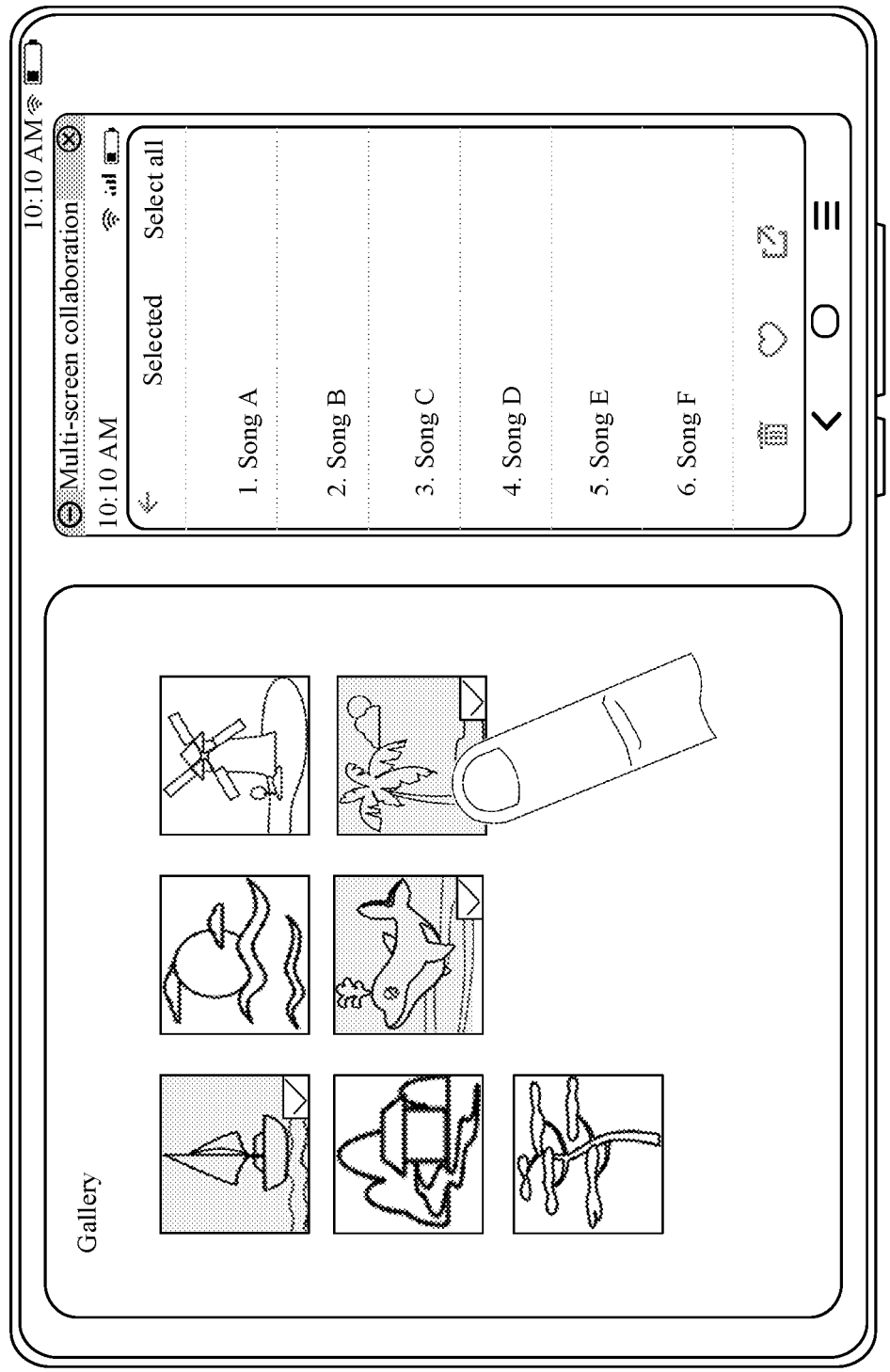
FIG. 5a(1)

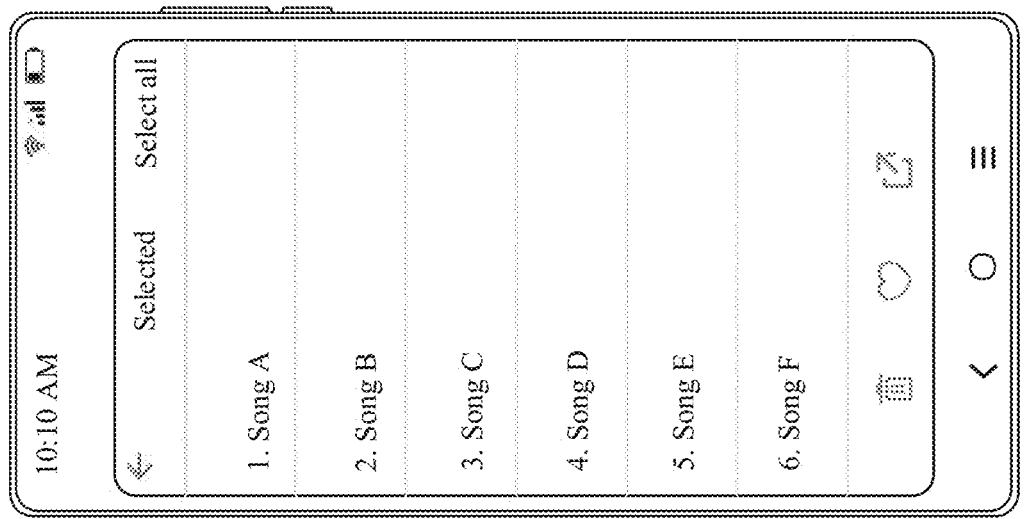
CONT.
FROM
FIG. 5a(1)
FIG. 5a(2)

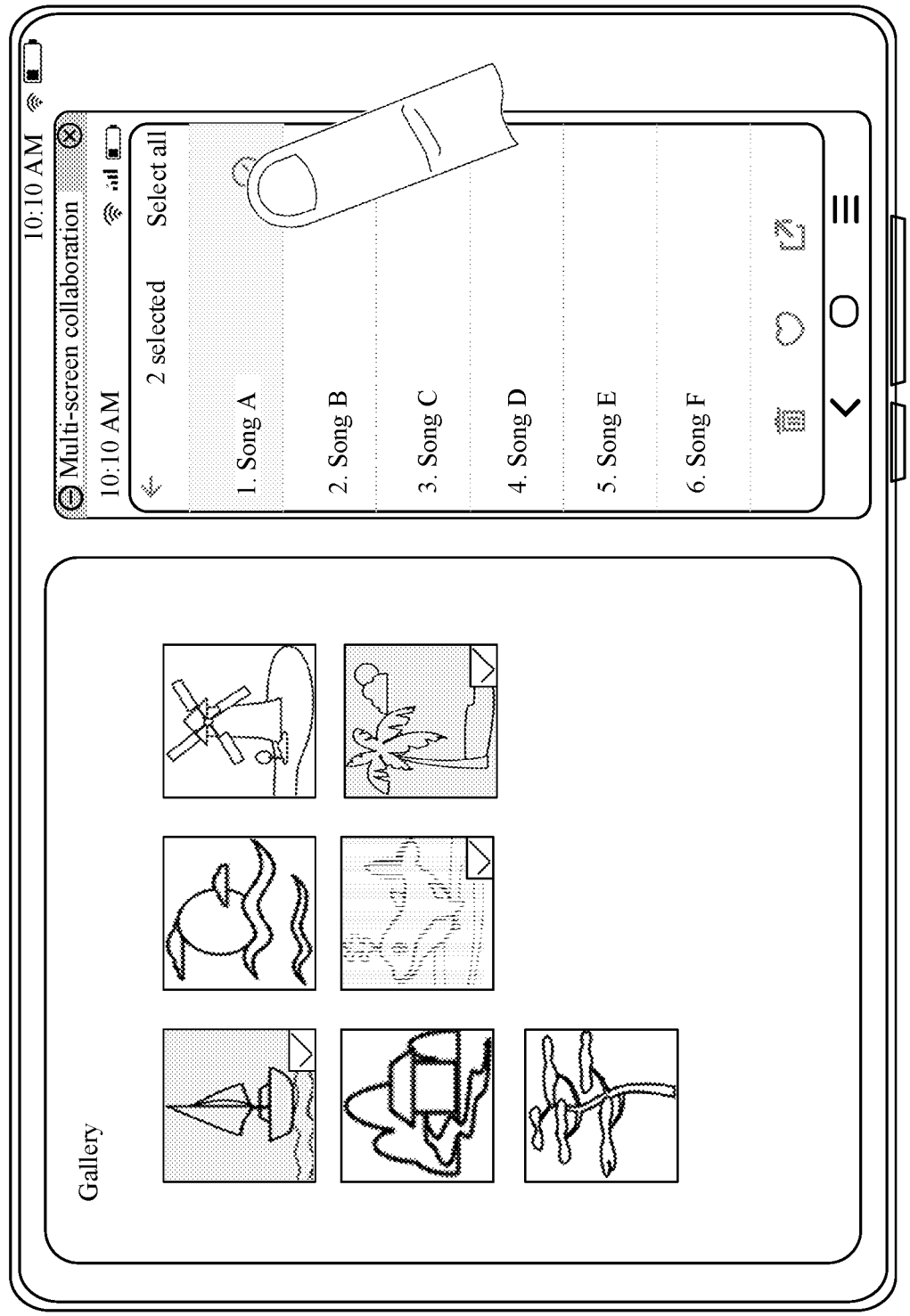
FIG. 5b(1)

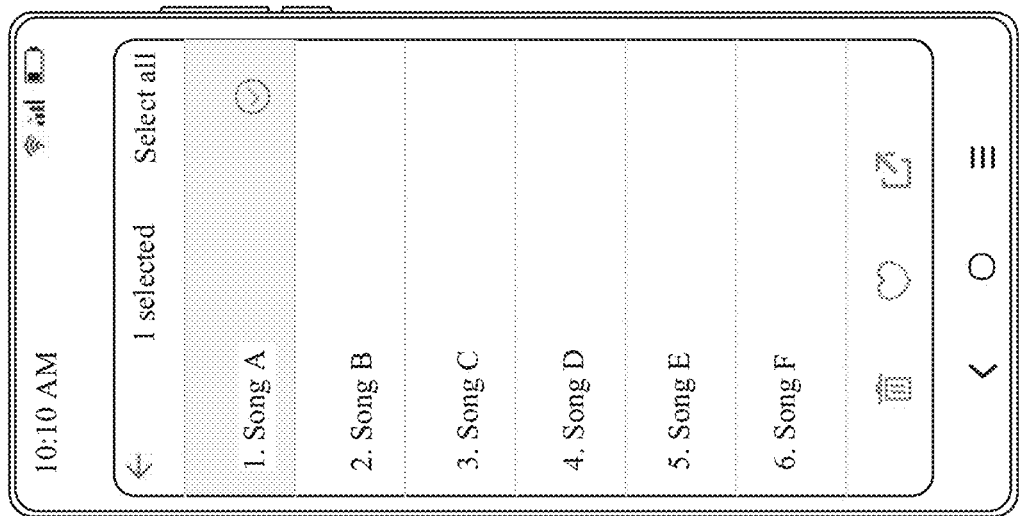
CONT.
FROM
FIG. 5b(1)
FIG. 5b(2)

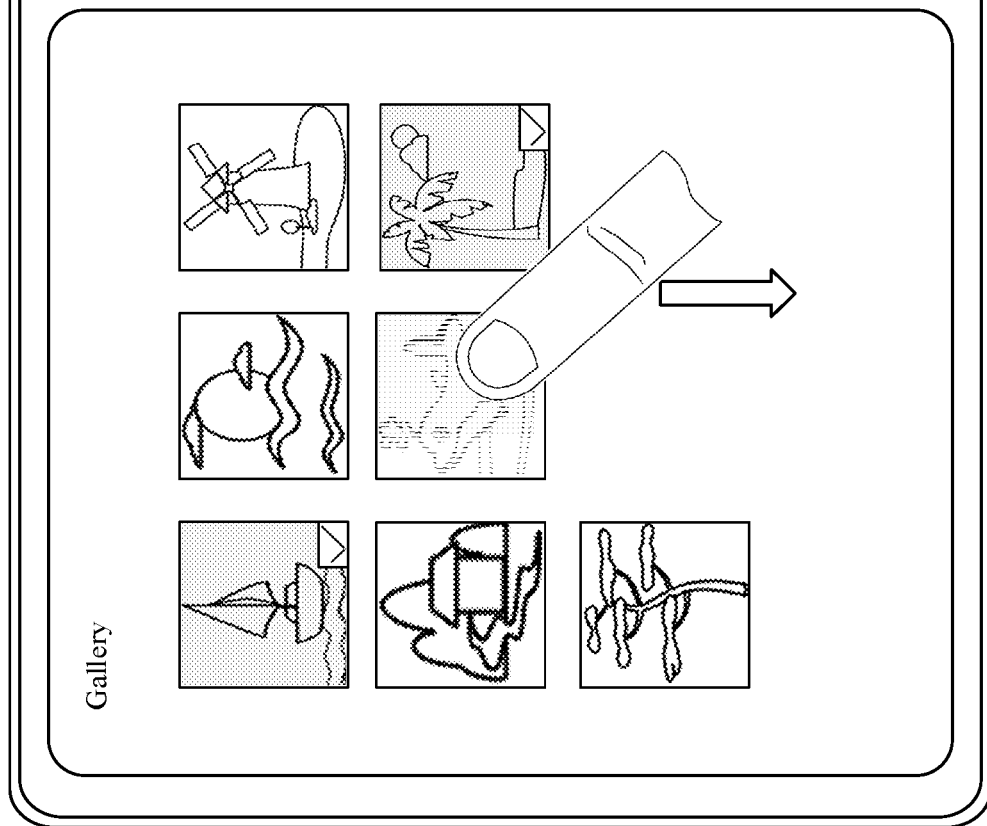
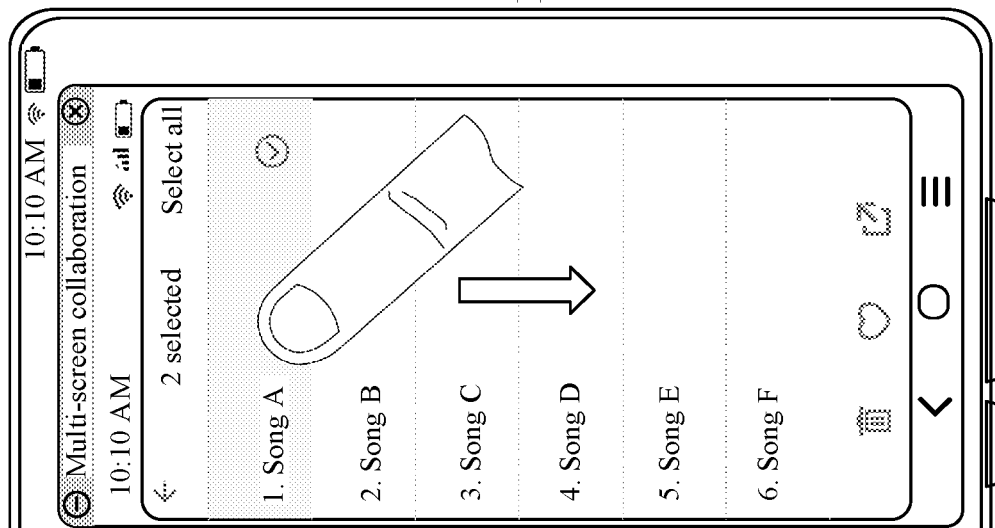
FIG. 5c(1)
TO FIG. 5c(2)

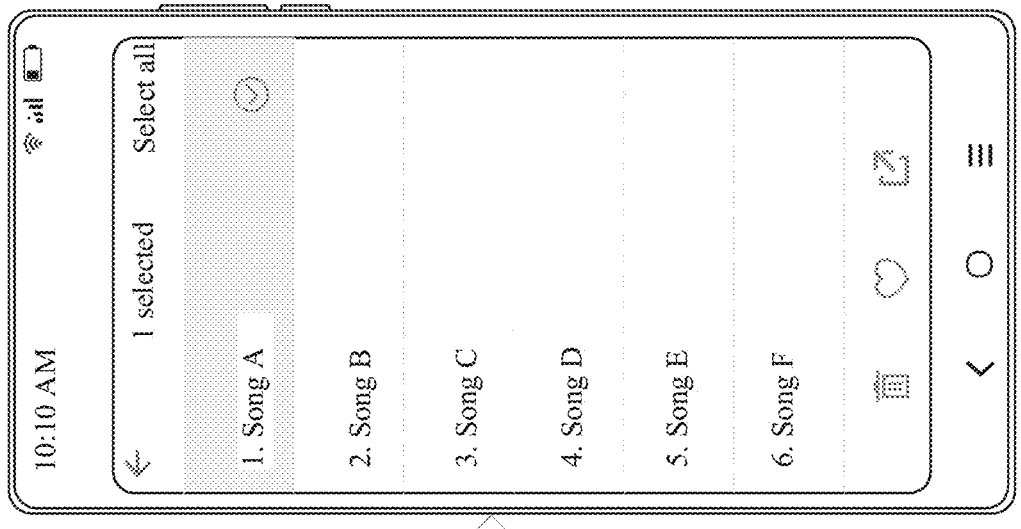
CONT.
FROM
FIG. 5c(1)
FIG. 5c(2)

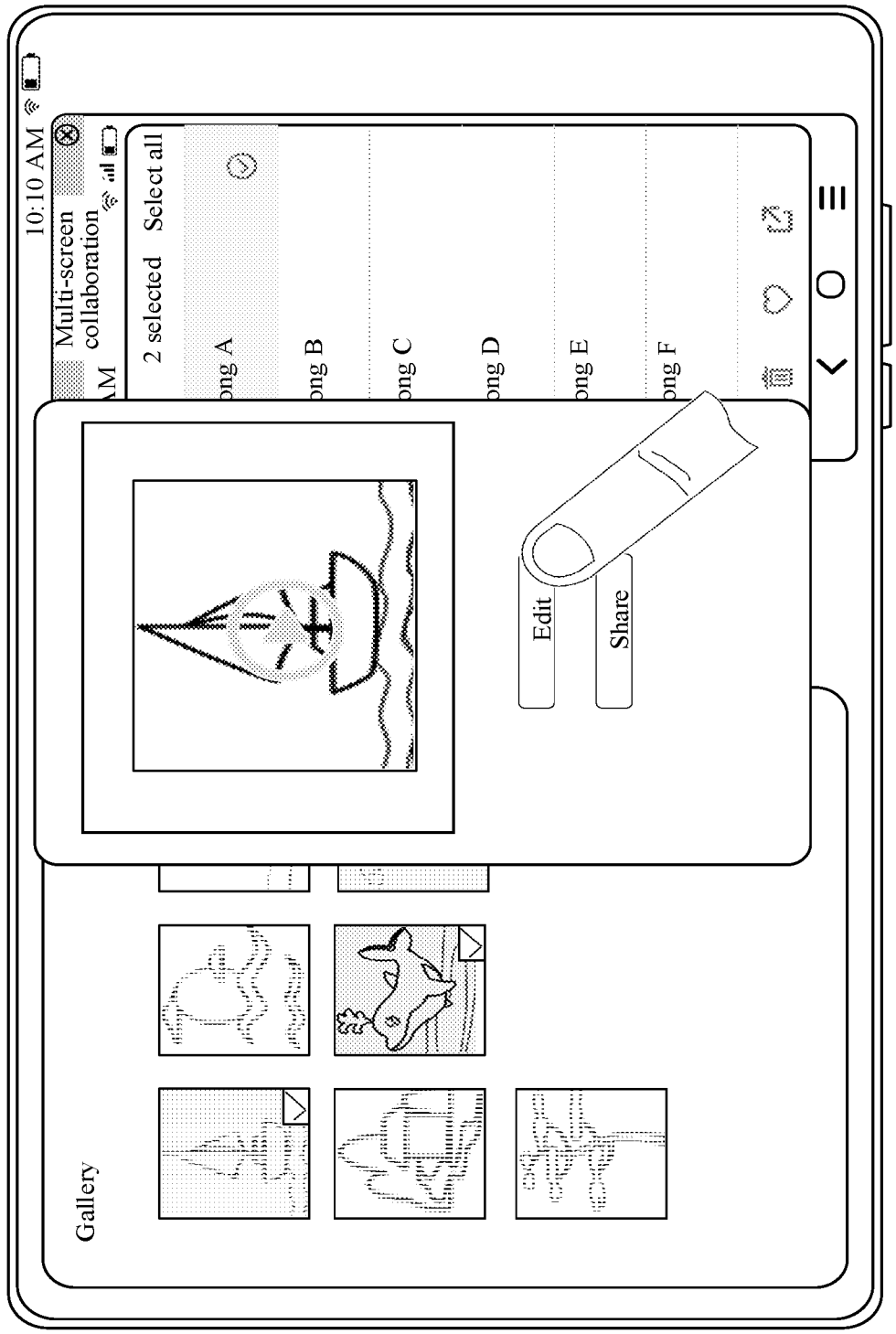

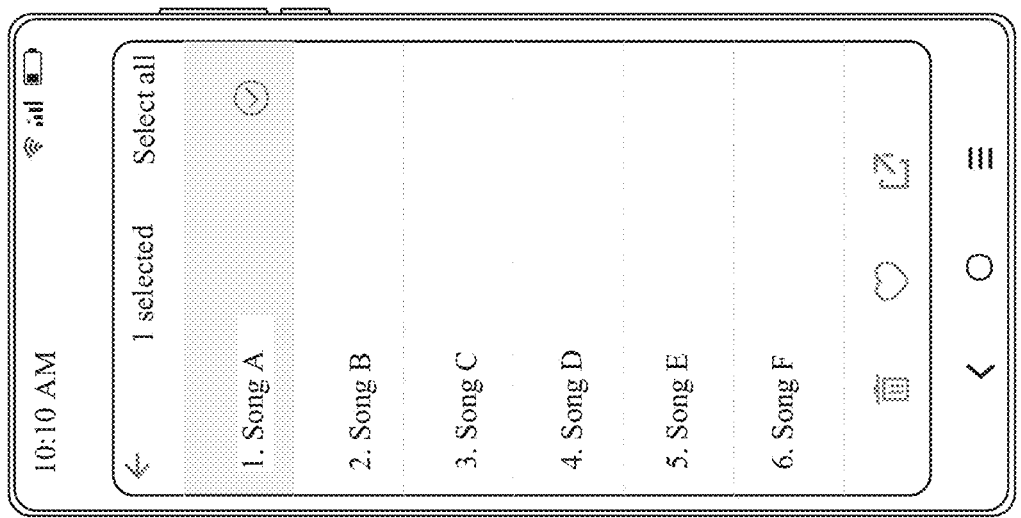
CONT.
FROM
FIG. 5d(1)
FIG. 5d(2)

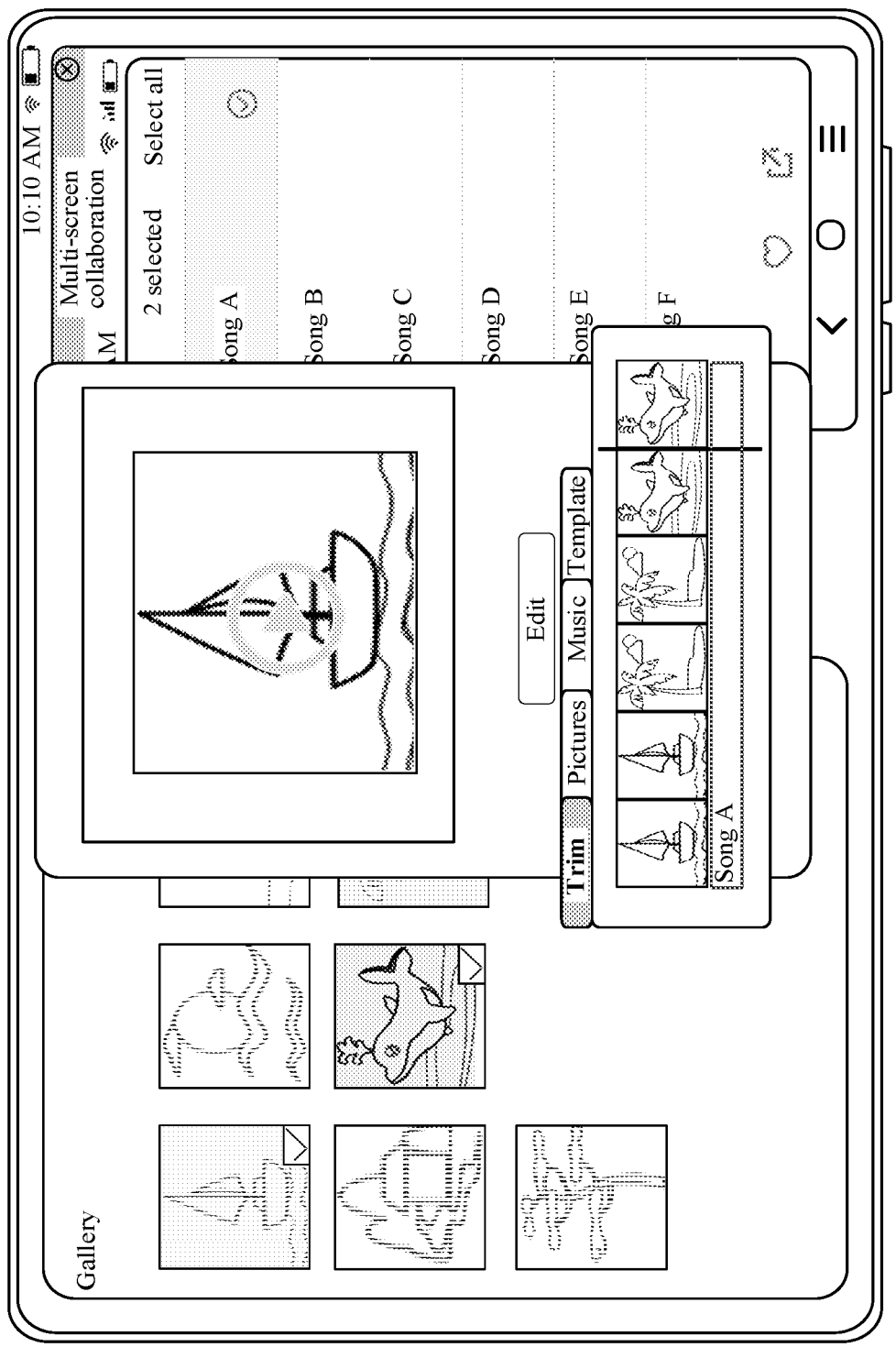

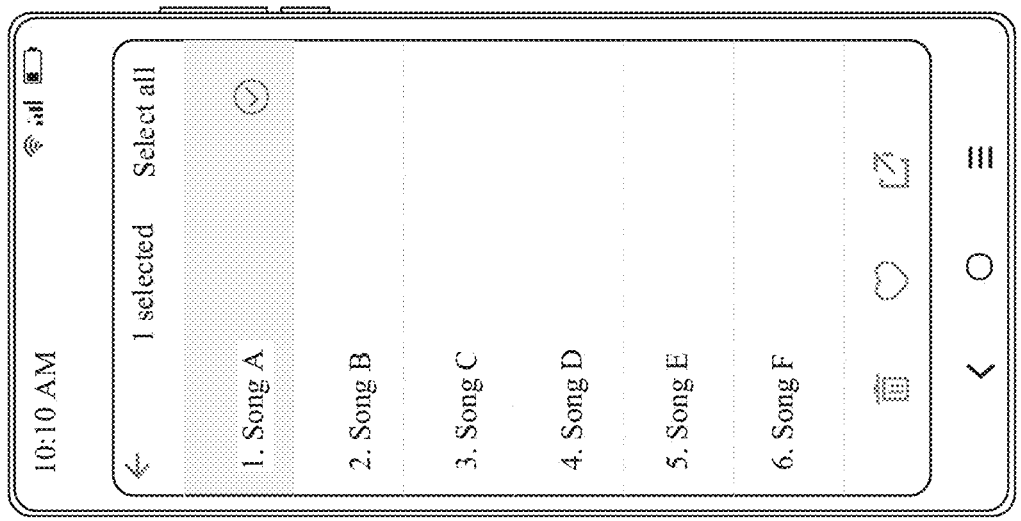
CONT.
FROM
FIG. 5e(1)
FIG. 5e(2)

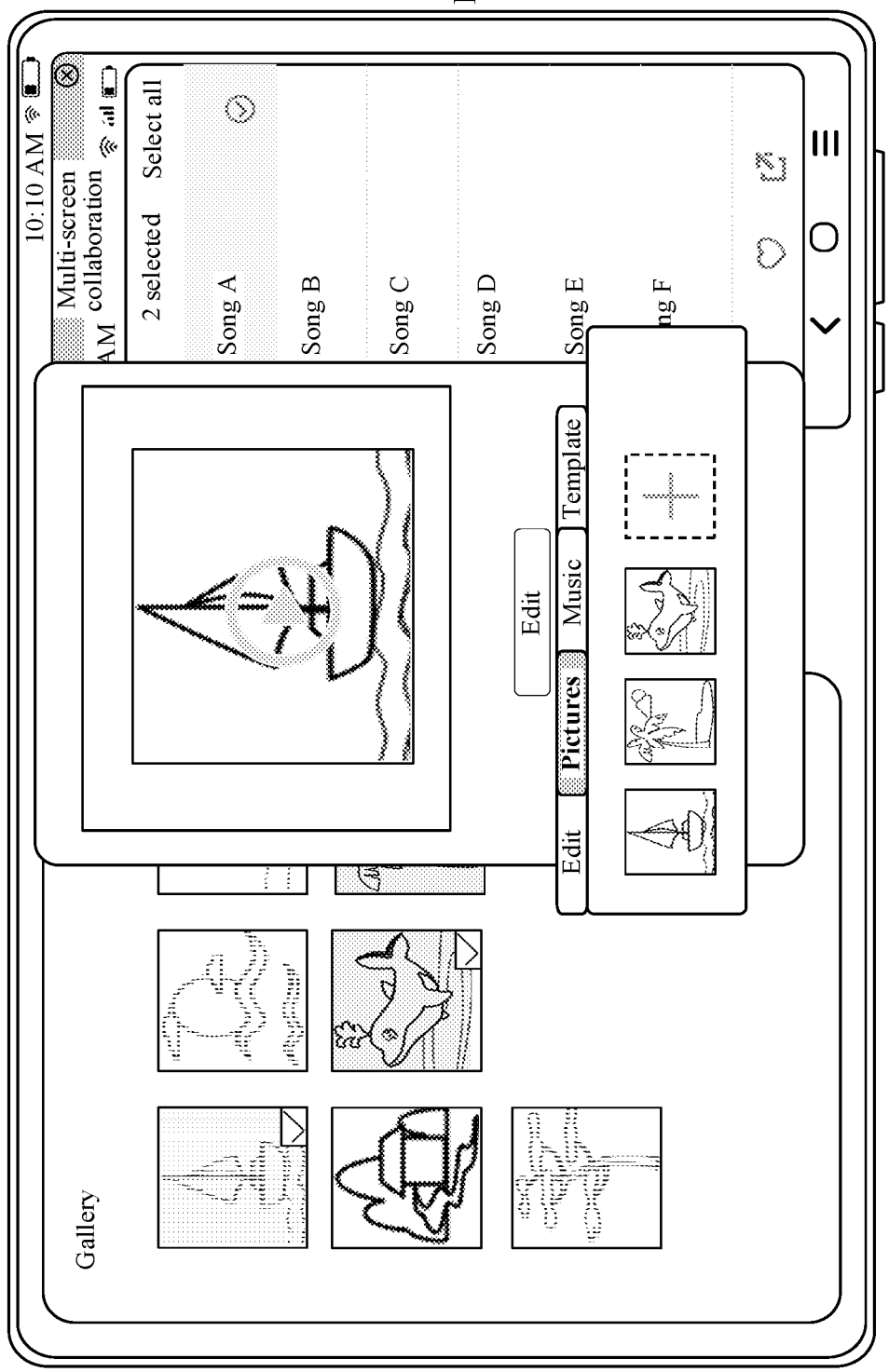
FIG. 5f(1)

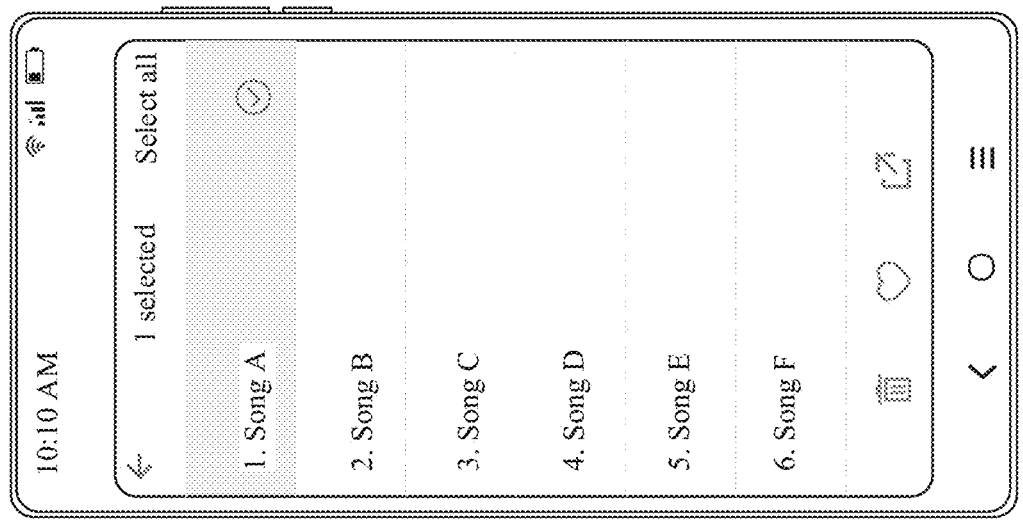
CONT.
FROM
FIG. 5f(1)
FIG. 5f(2)

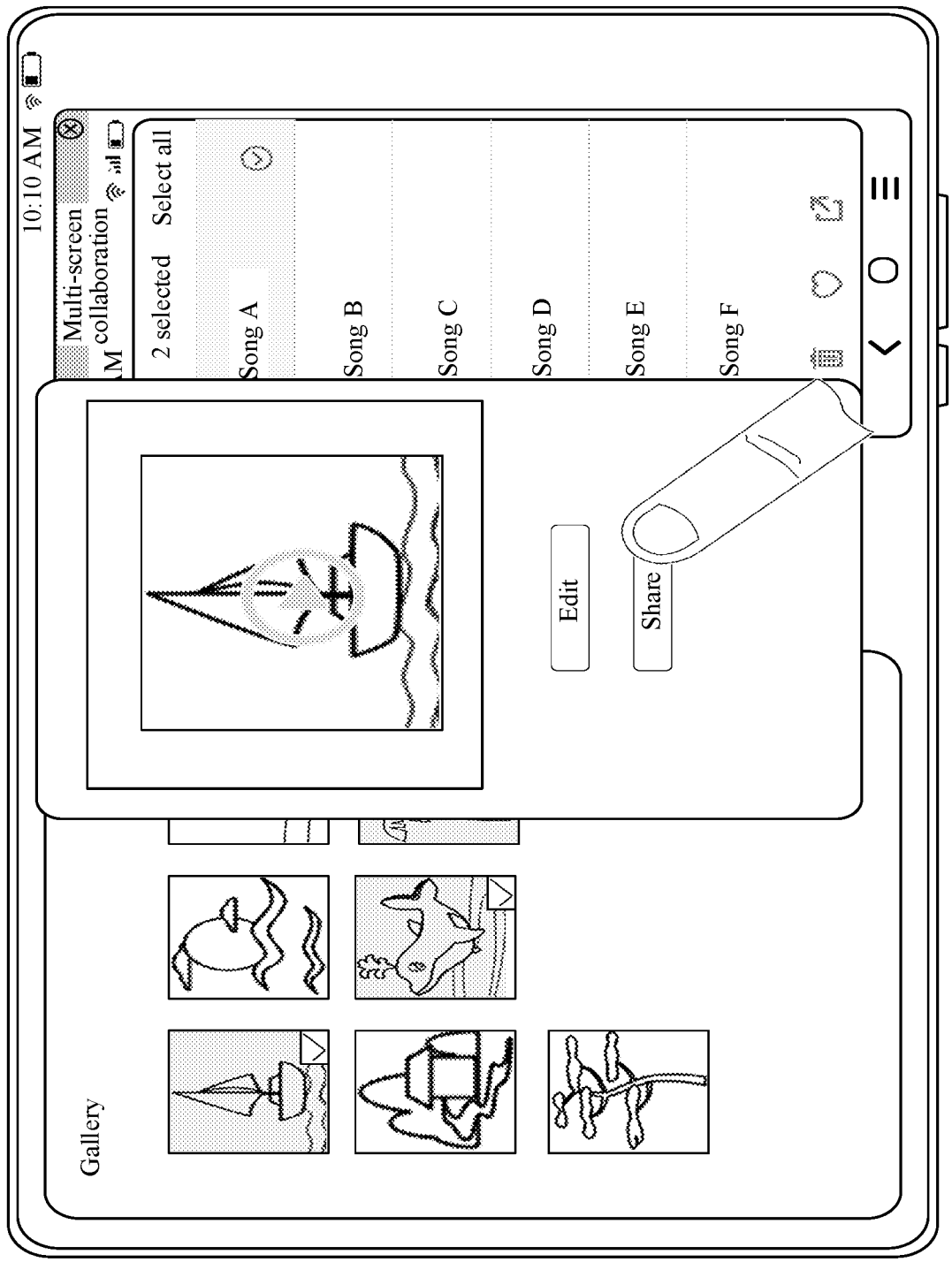

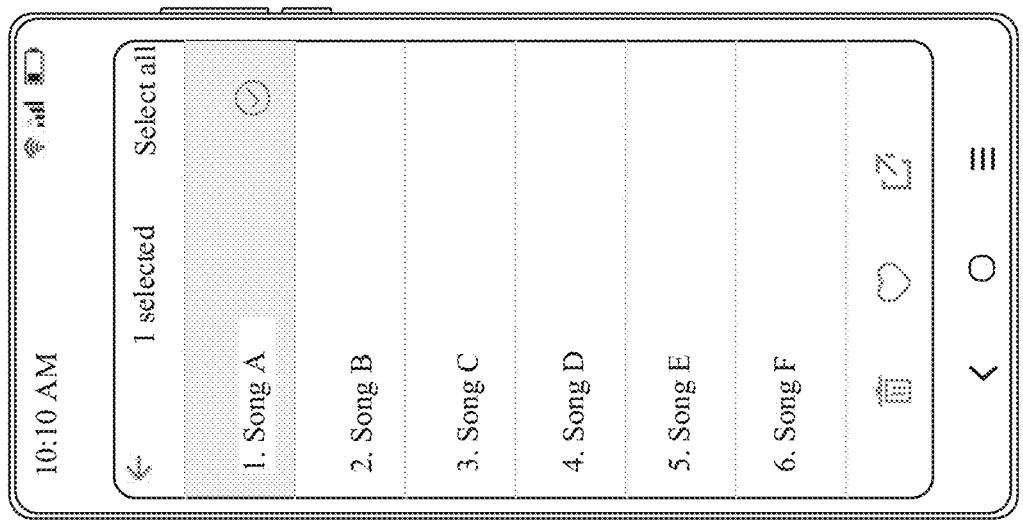
CONT.
FROM
FIG. 5g(1)
FIG. 5g(2)

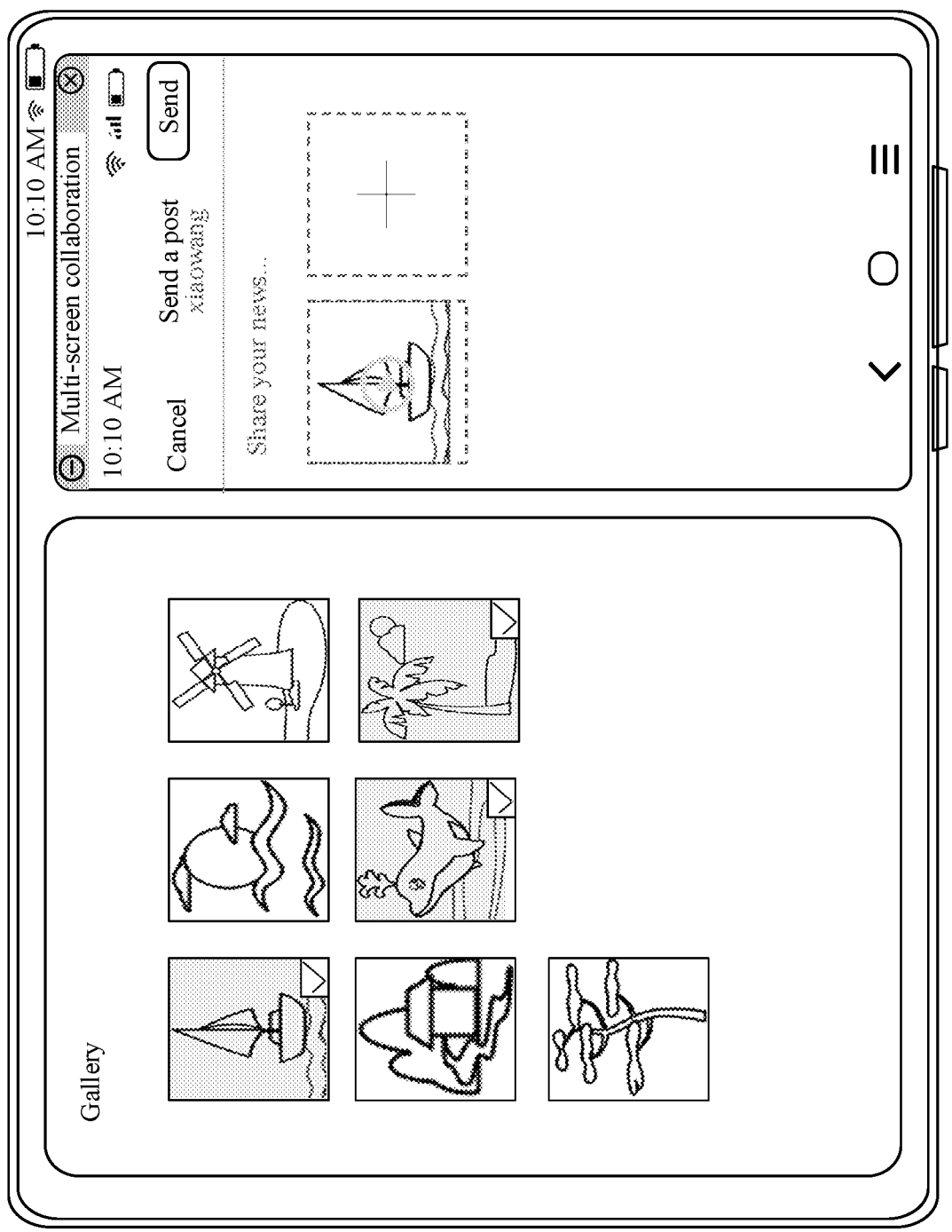
FIG. 5h(1)

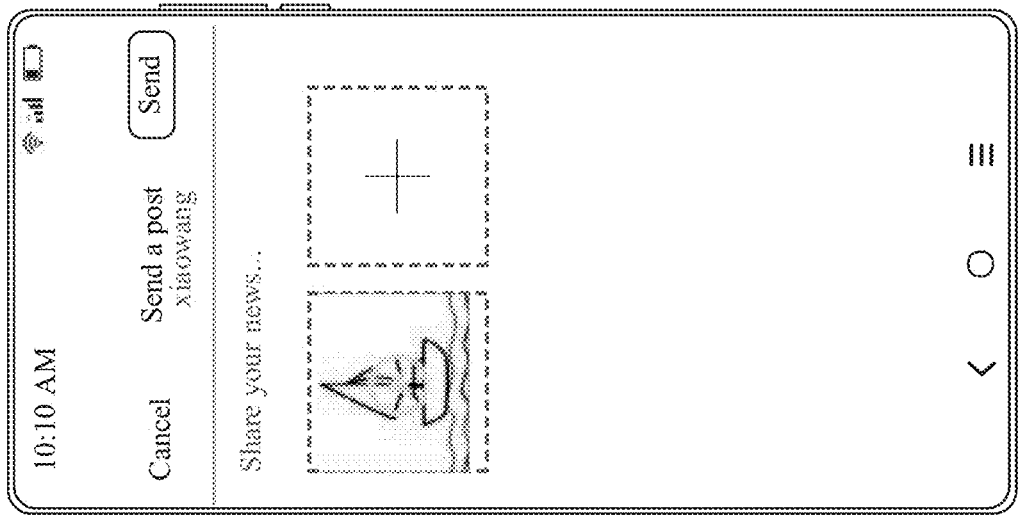
CONT.
FROM
FIG. 5h(1)
FIG. 5h(2)

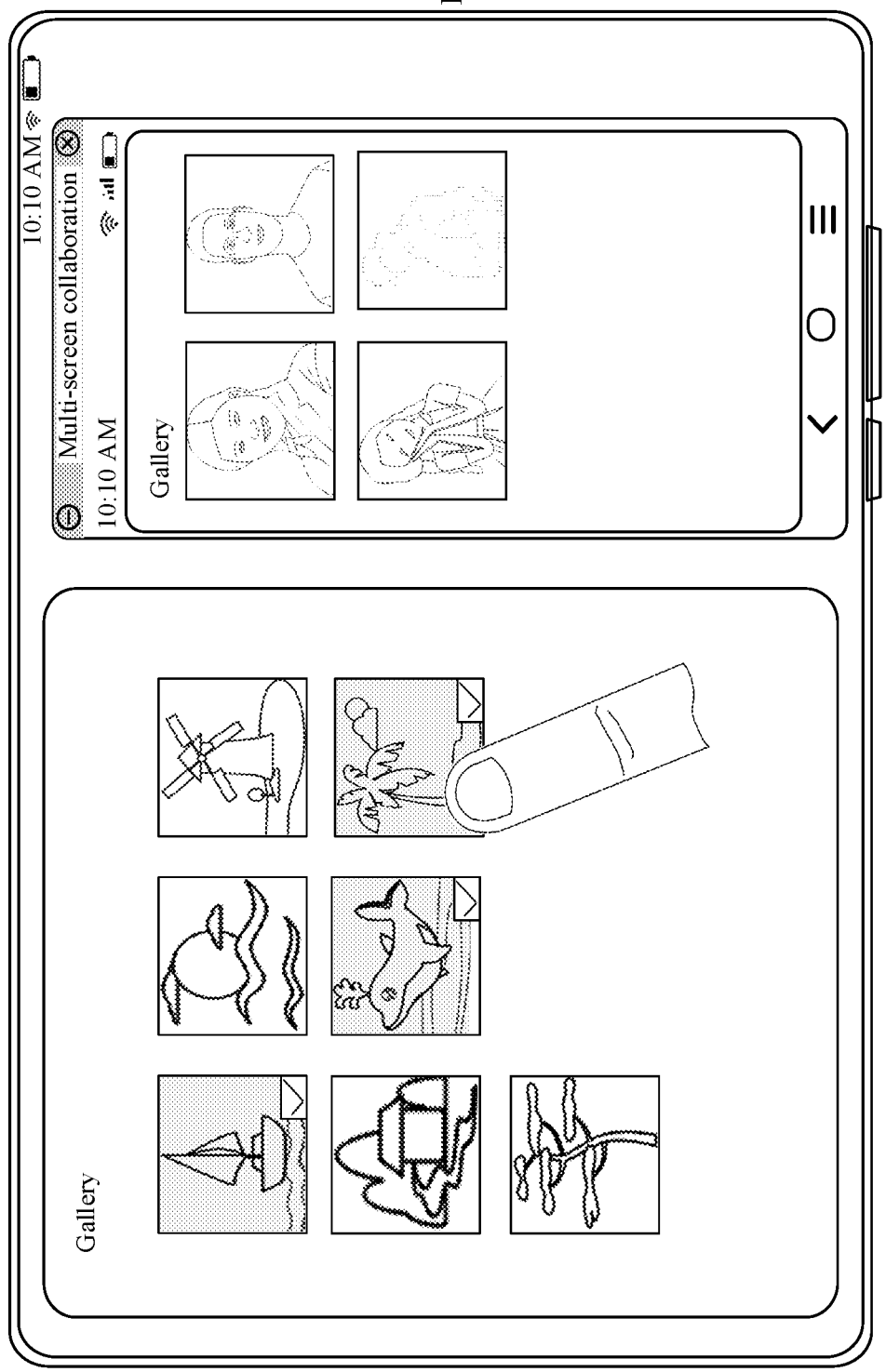
FIG. 6a(1)

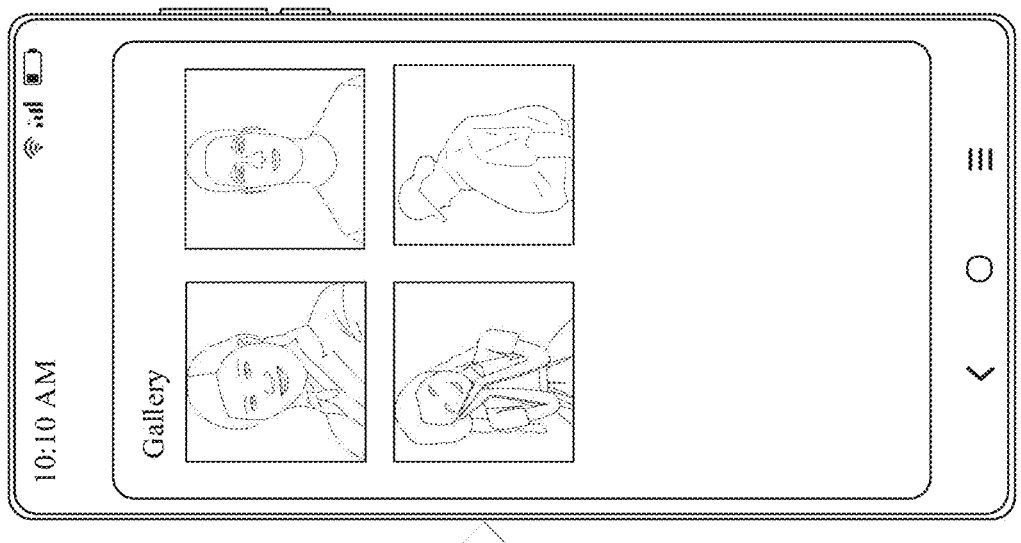
FIG. 6a(2)

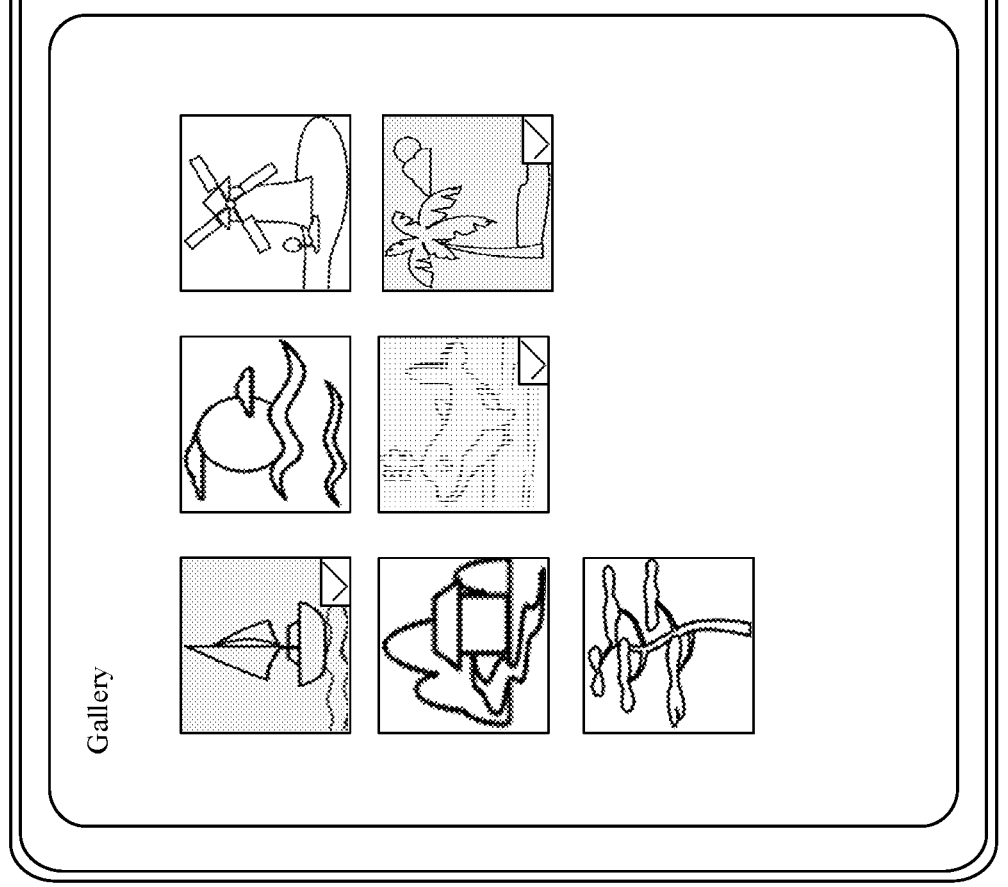
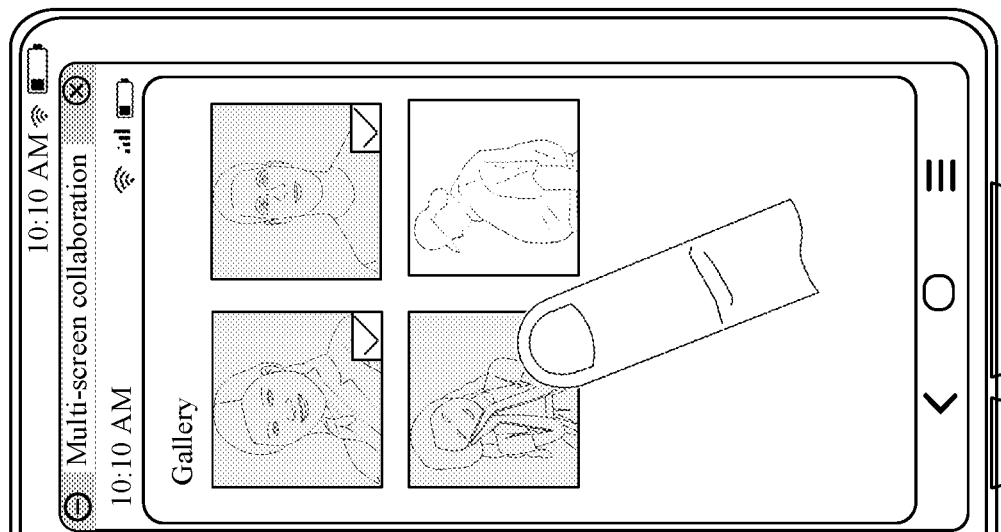
FIG. 6b(1)

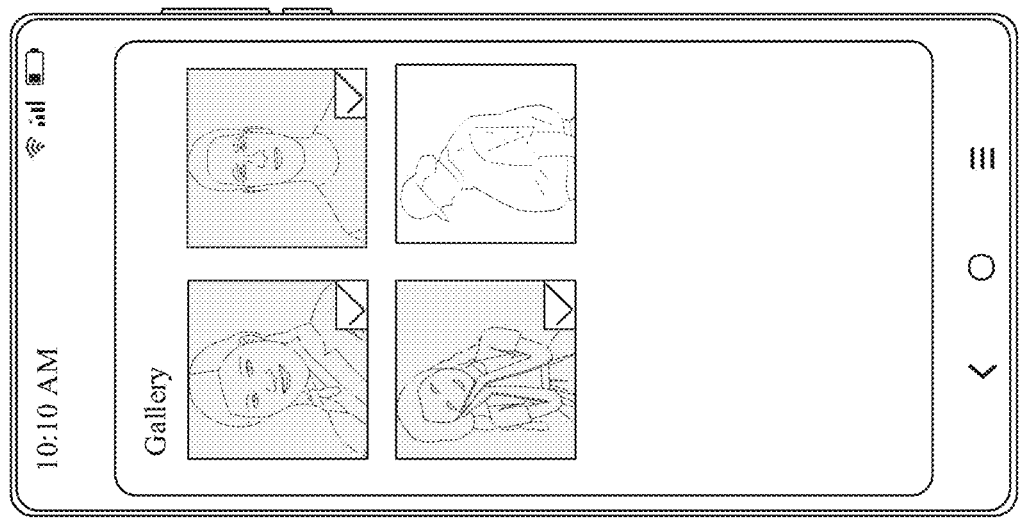
CONT.
FROM
FIG. 6b(1)
FIG. 6b(2)

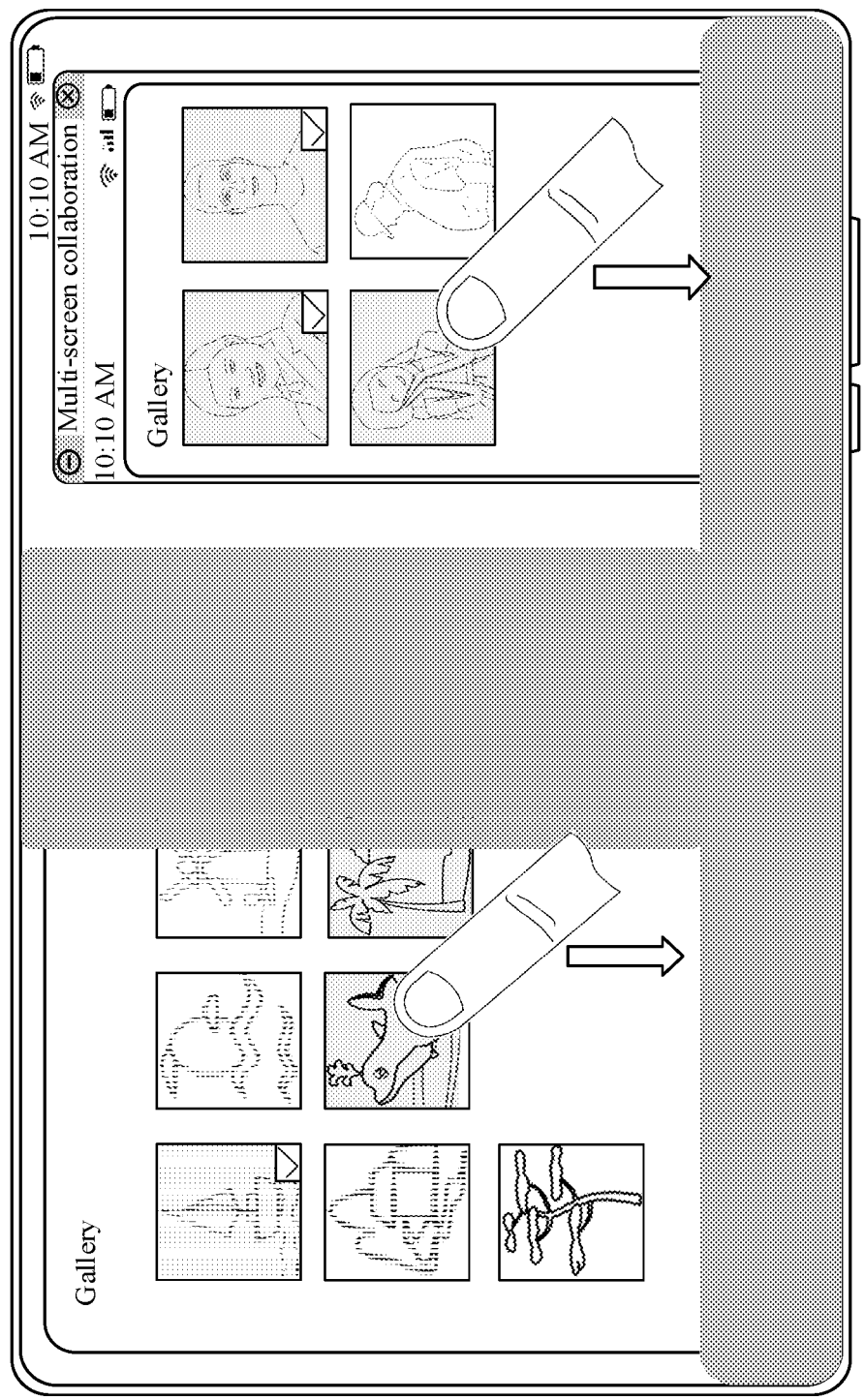

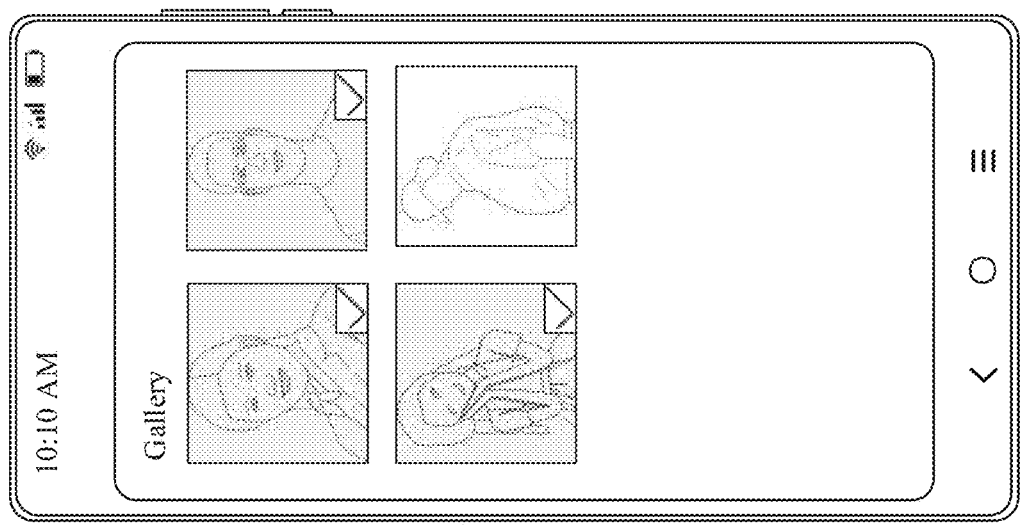
CONT.
FROM
FIG. 6c(1)
FIG. 6c(2)

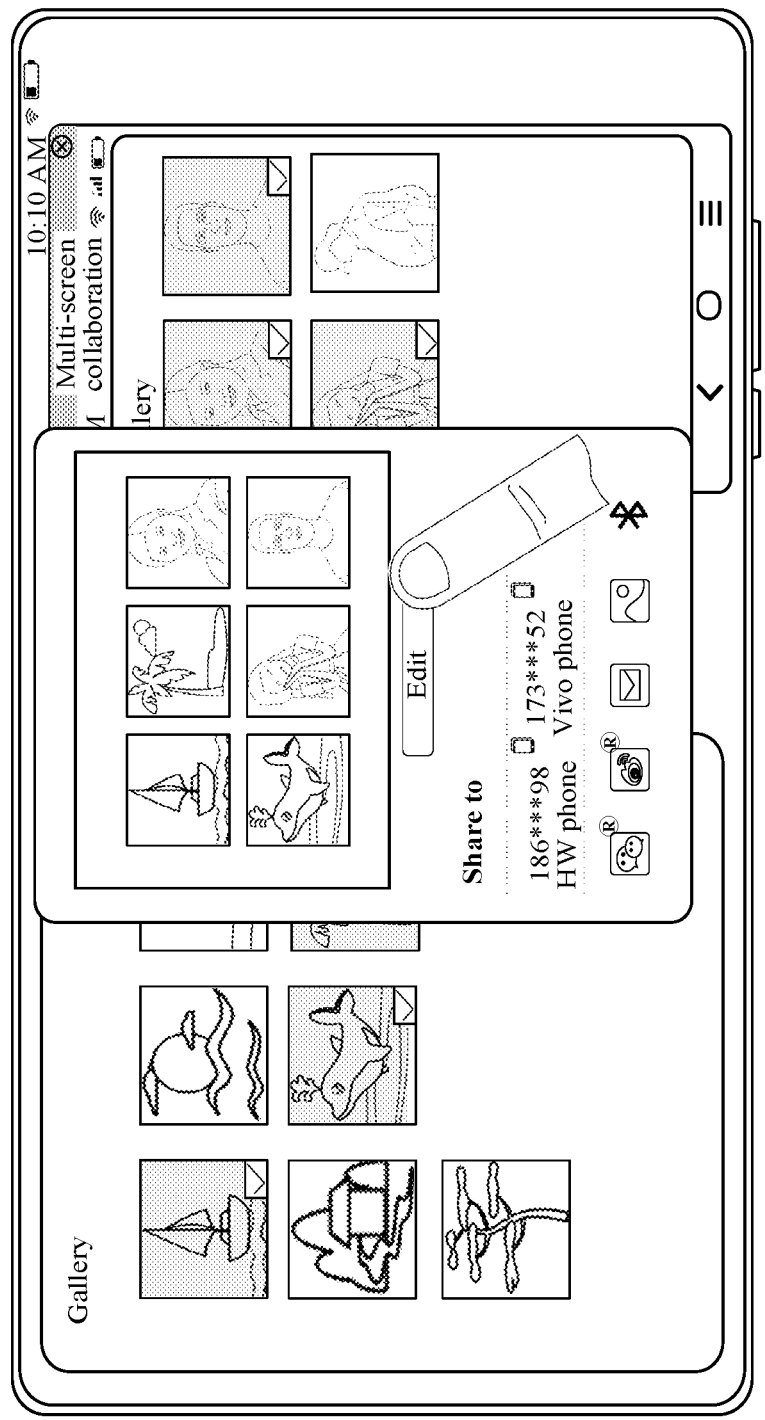
FIG. 6d(1)

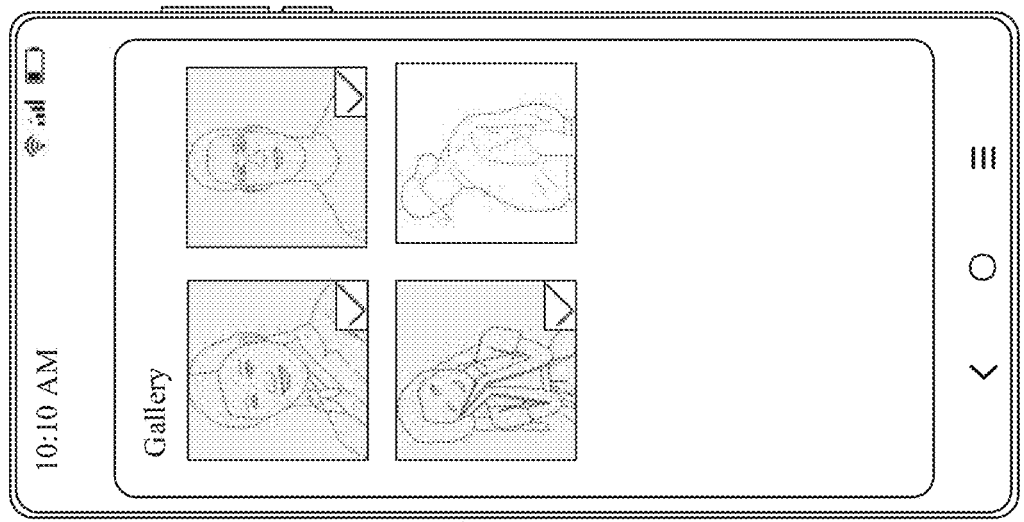
CONT.
FROM
FIG. 6d(1)
FIG. 6d(2)

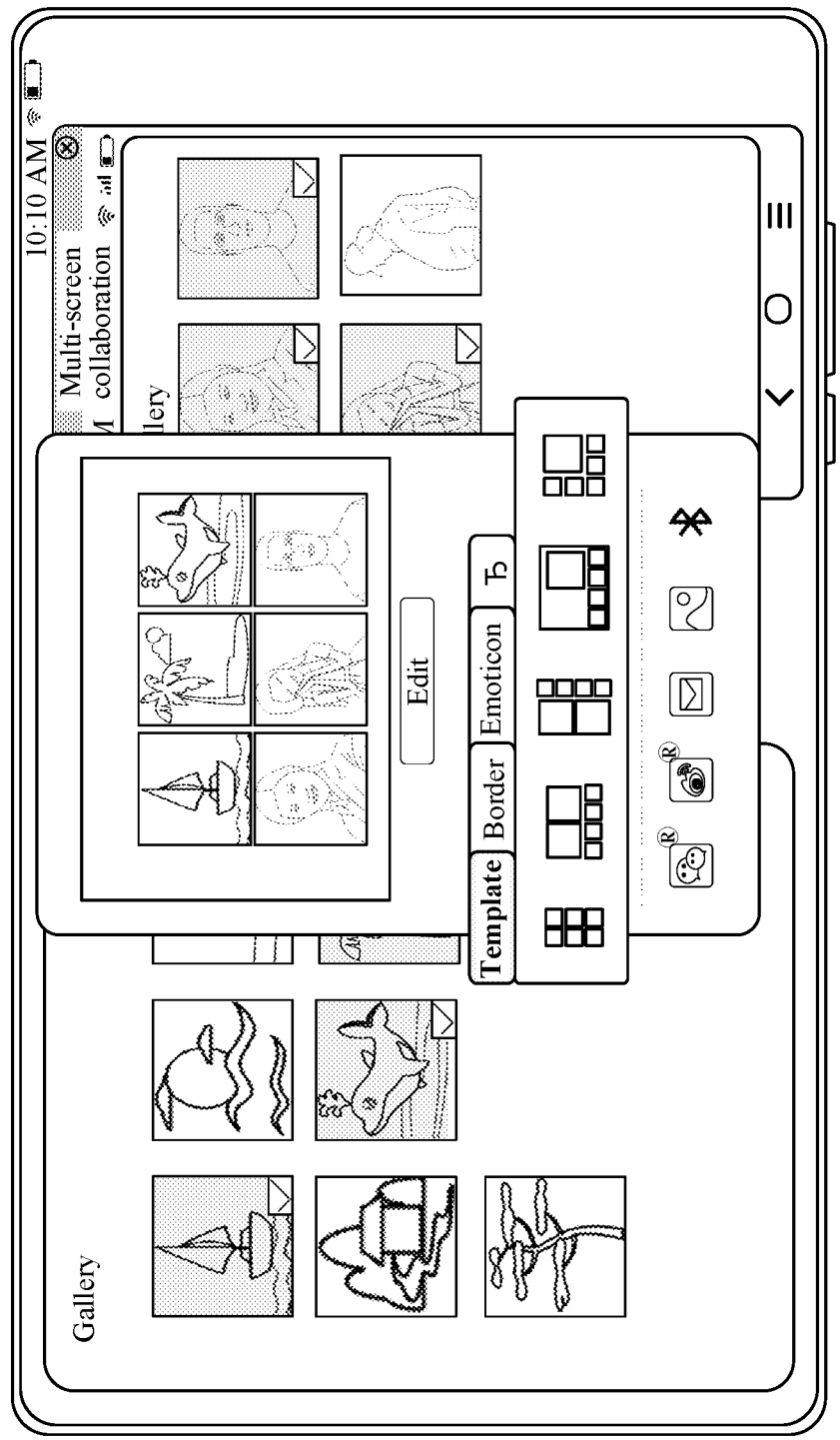
FIG. 6e(1)

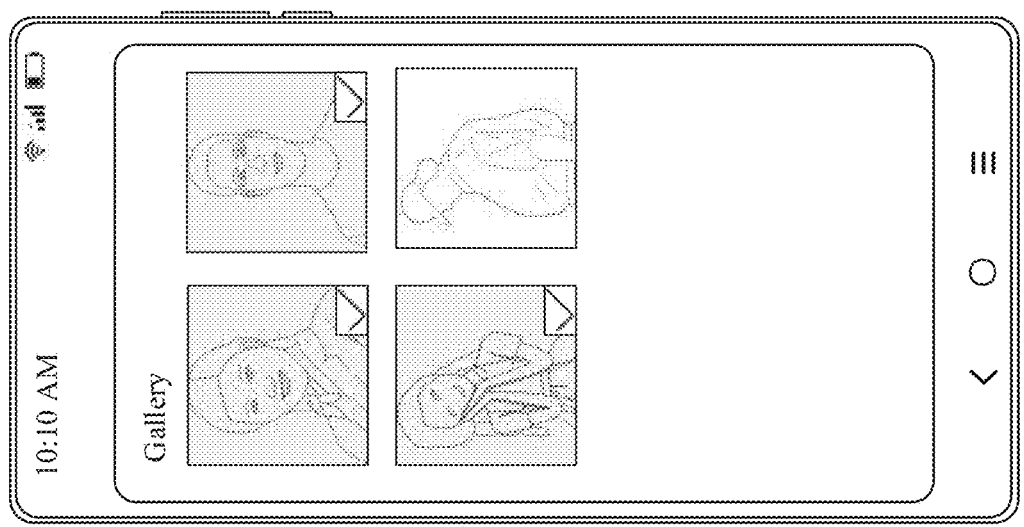
FIG. 6e(2)

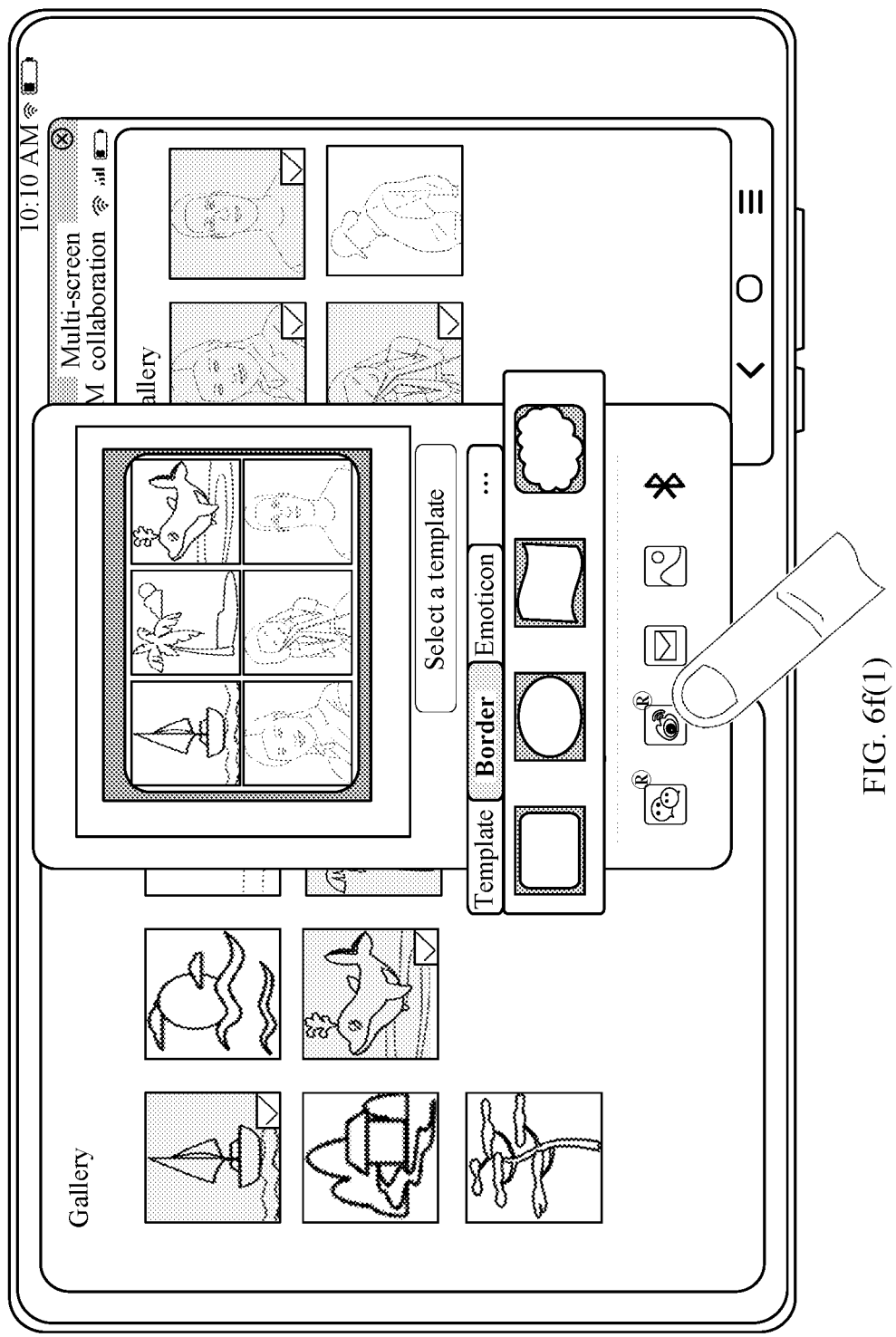

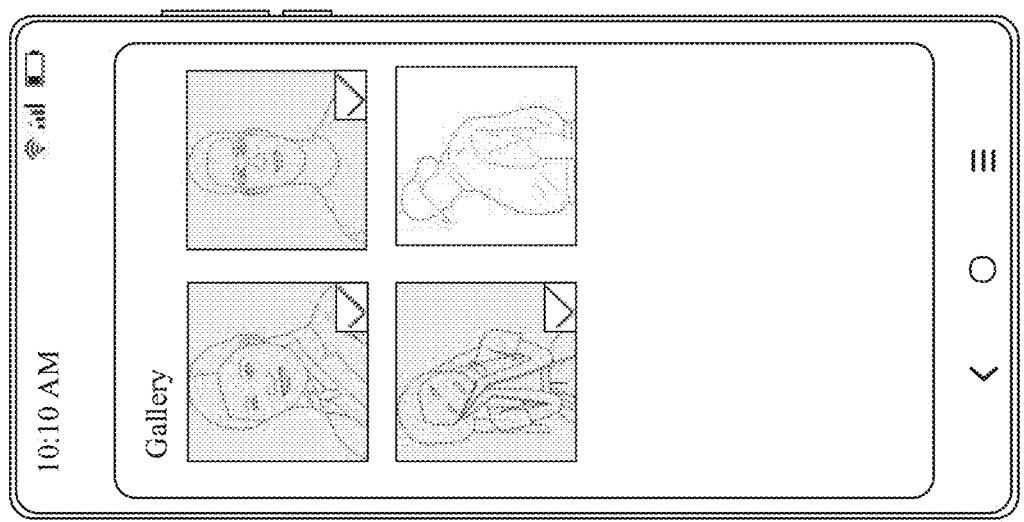
FIG. 6f(2)

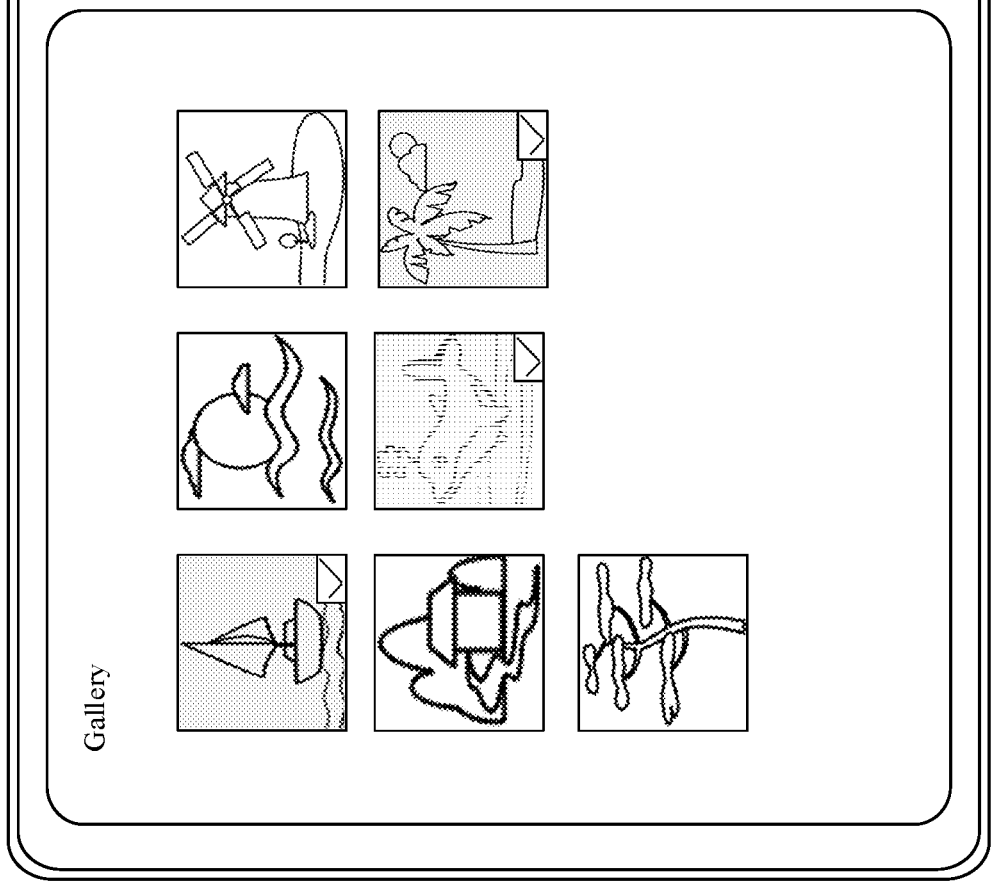
FIG. 6g(1)

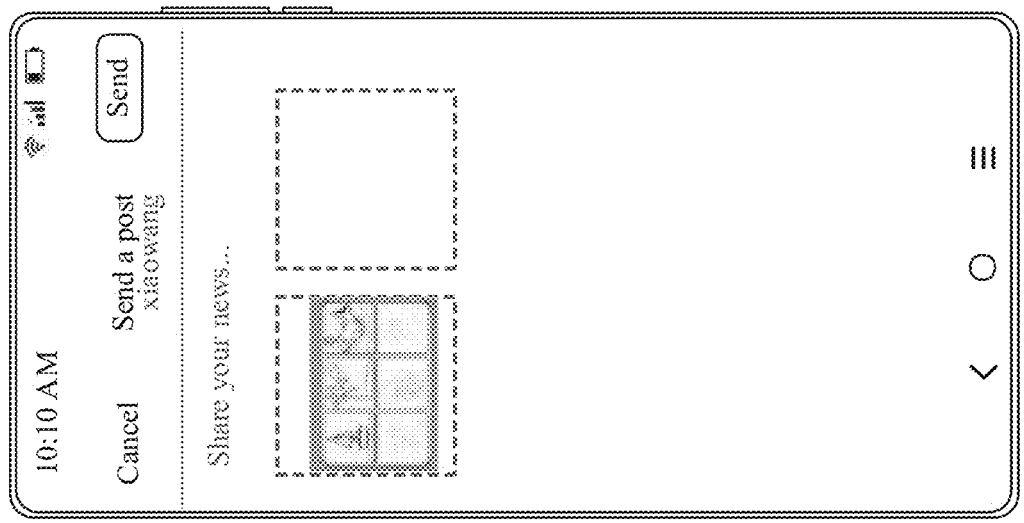
CONT.
FROM
FIG. 6g(1)
FIG. 6g(2)

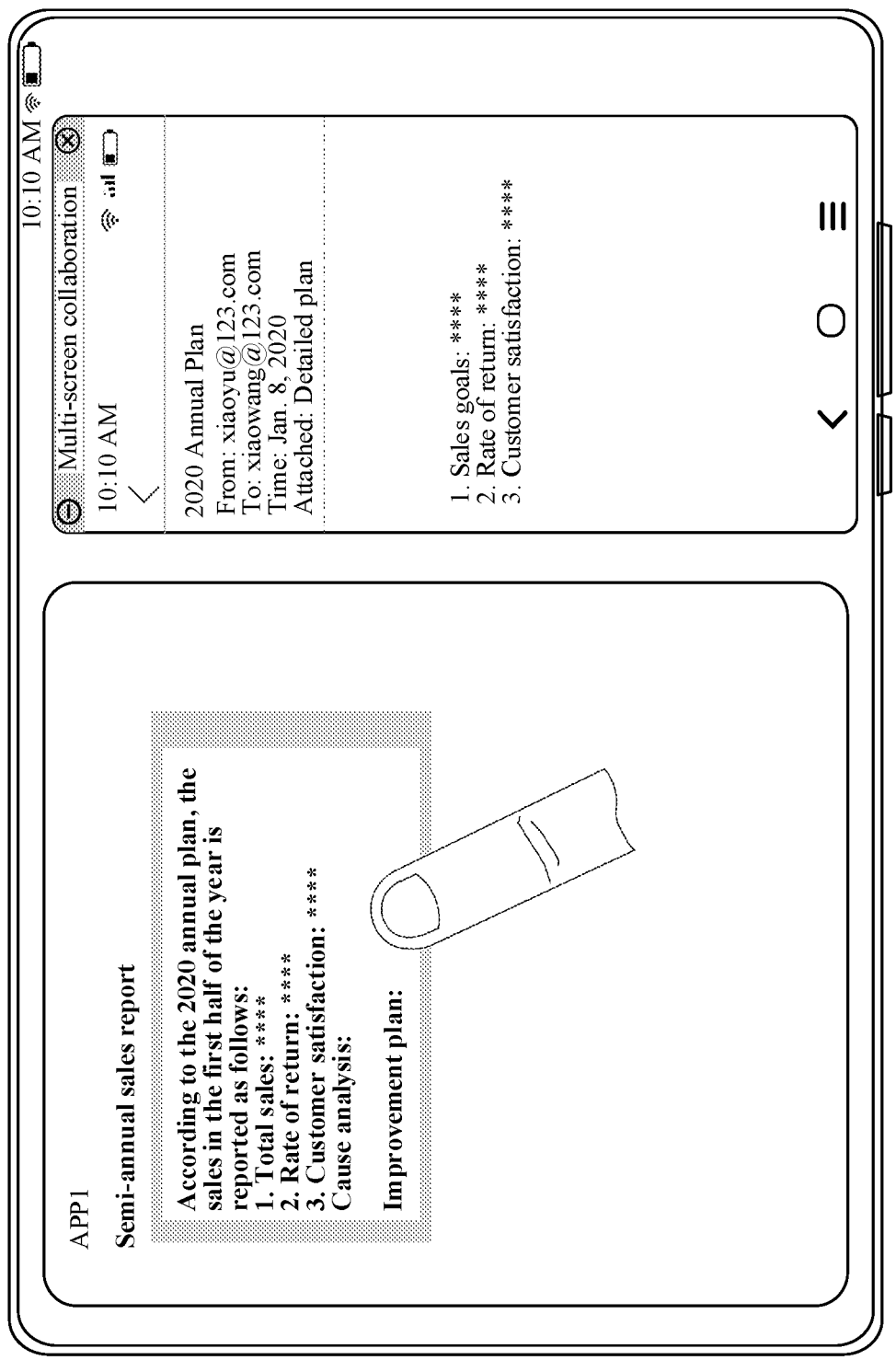
FIG. 8a(1)

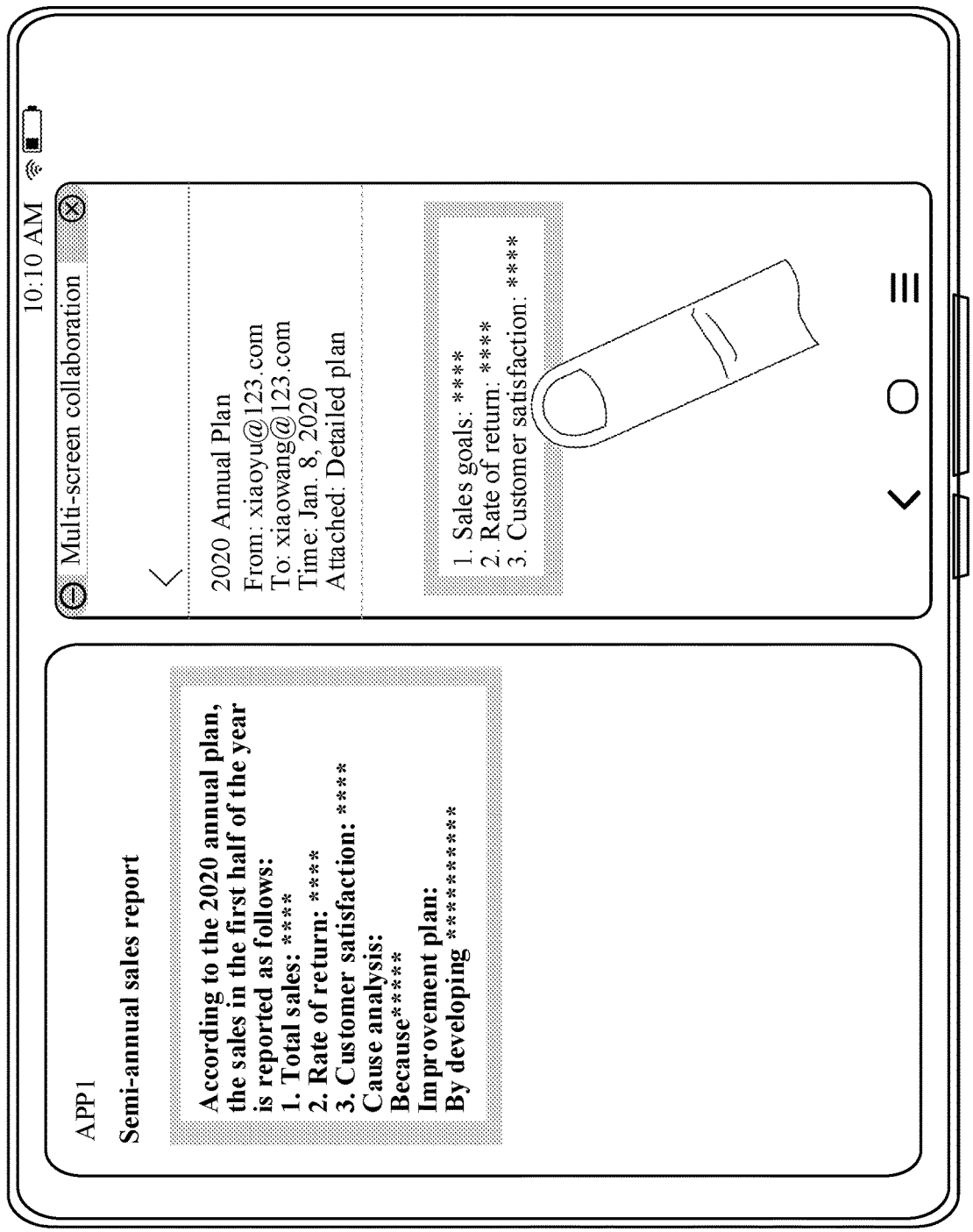
FIG. 8b(1)

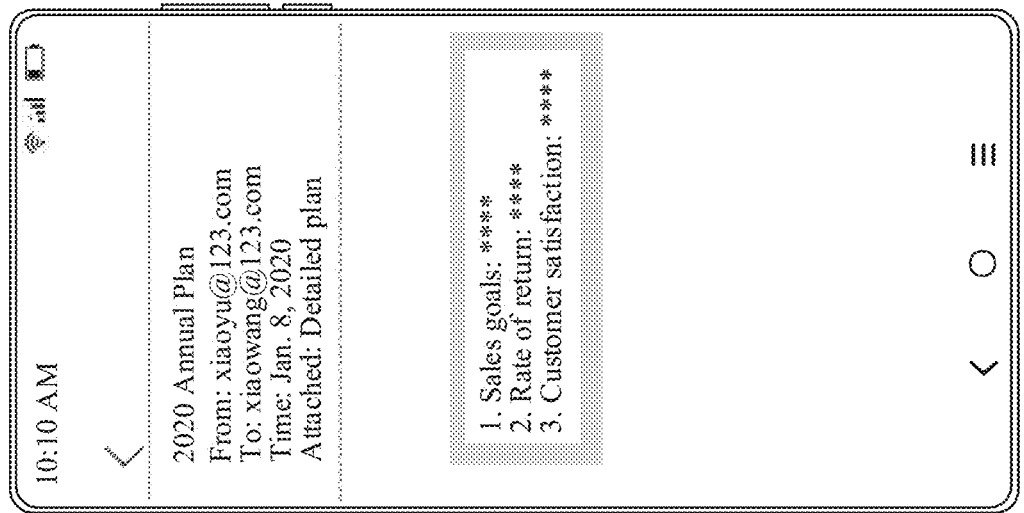
CONT.
FROM
FIG. 8b(1)
FIG. 8b(2)

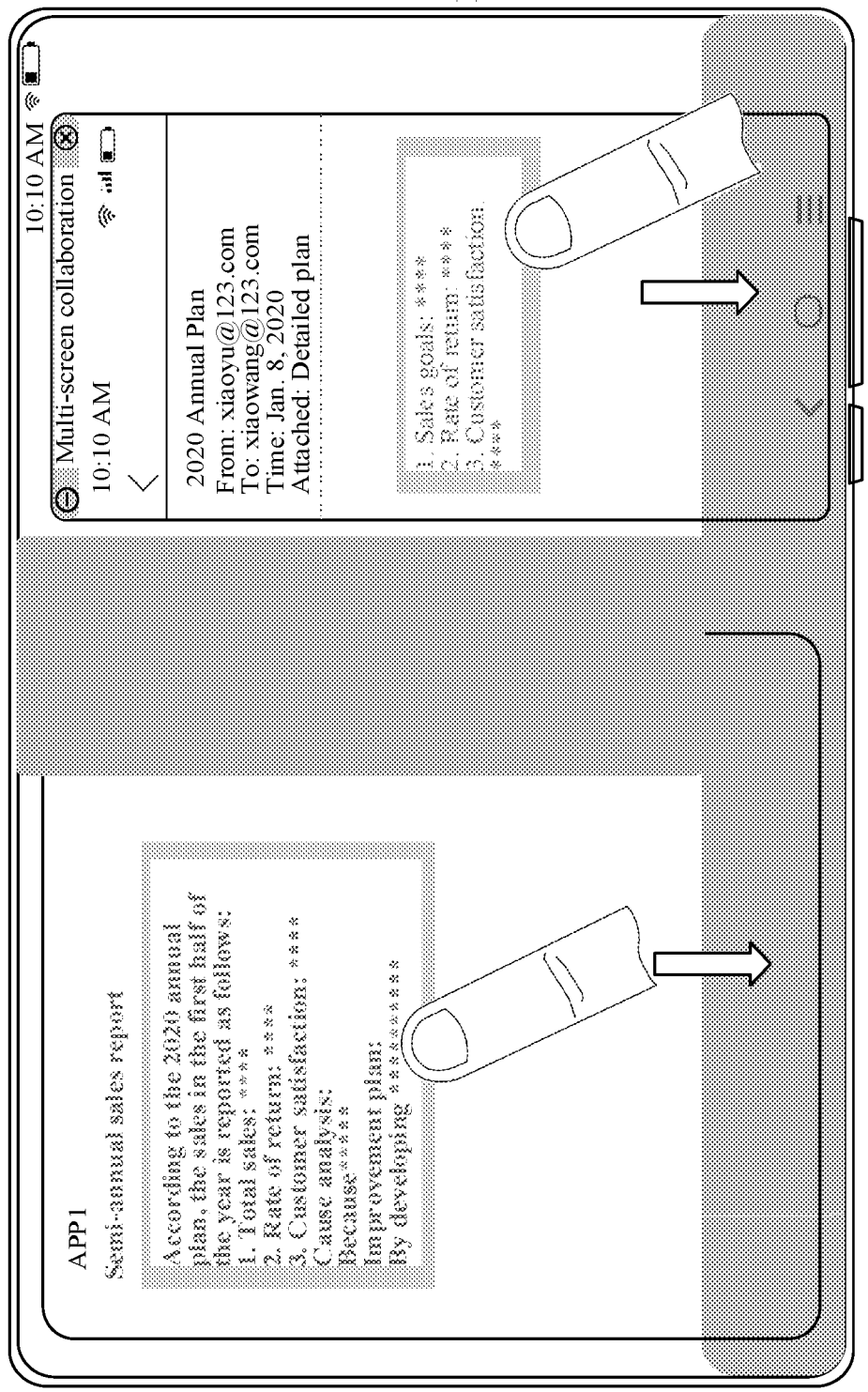
FIG. 8c(1)

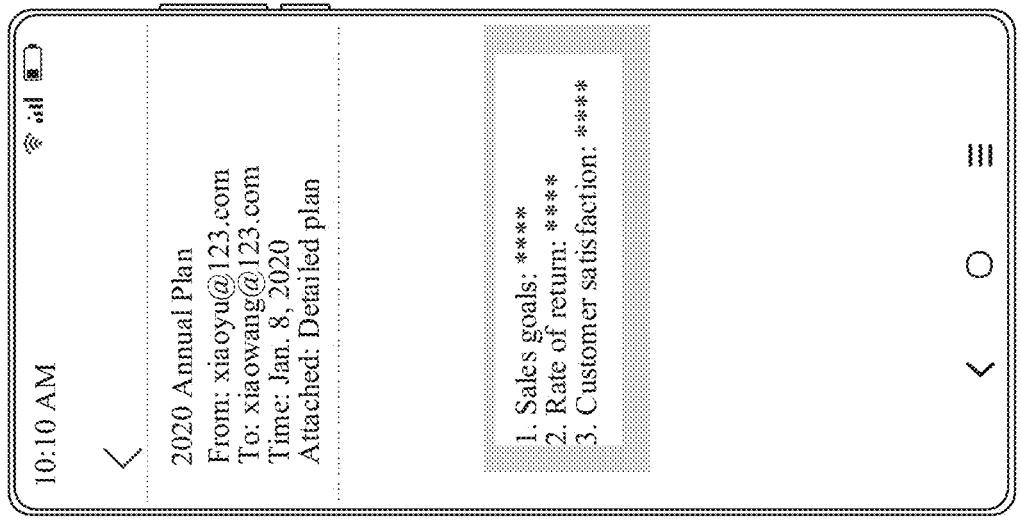
CONT.
FROM
FIG. 8c(1)
FIG. 8c(2)

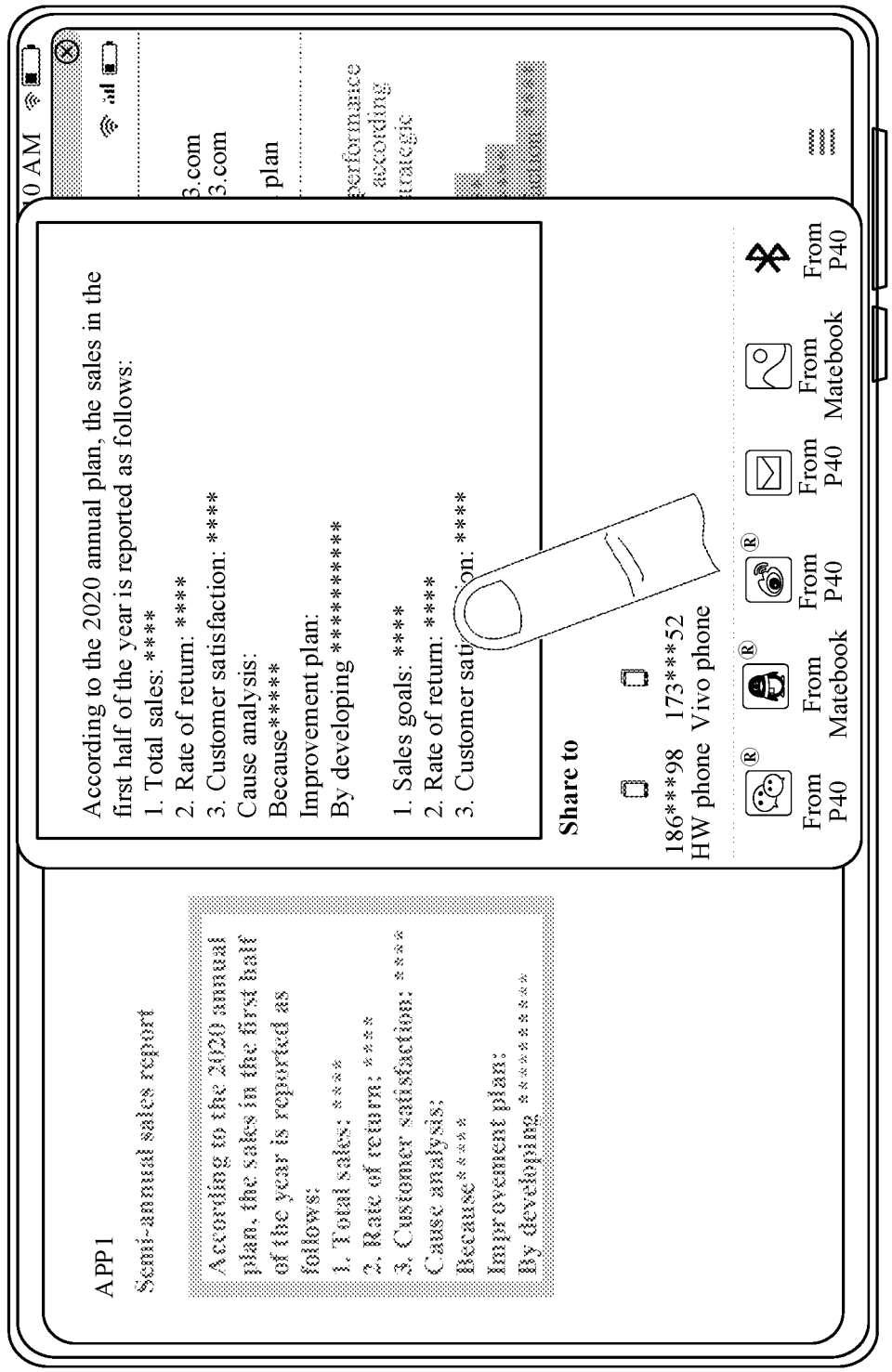

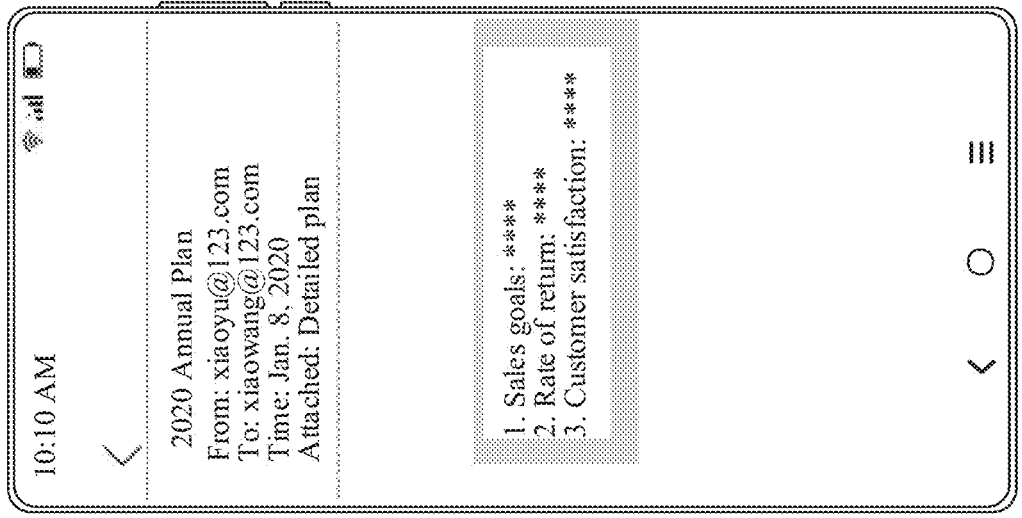
CONT.
FROM
FIG. 8d(1)
FIG. 8d(2)

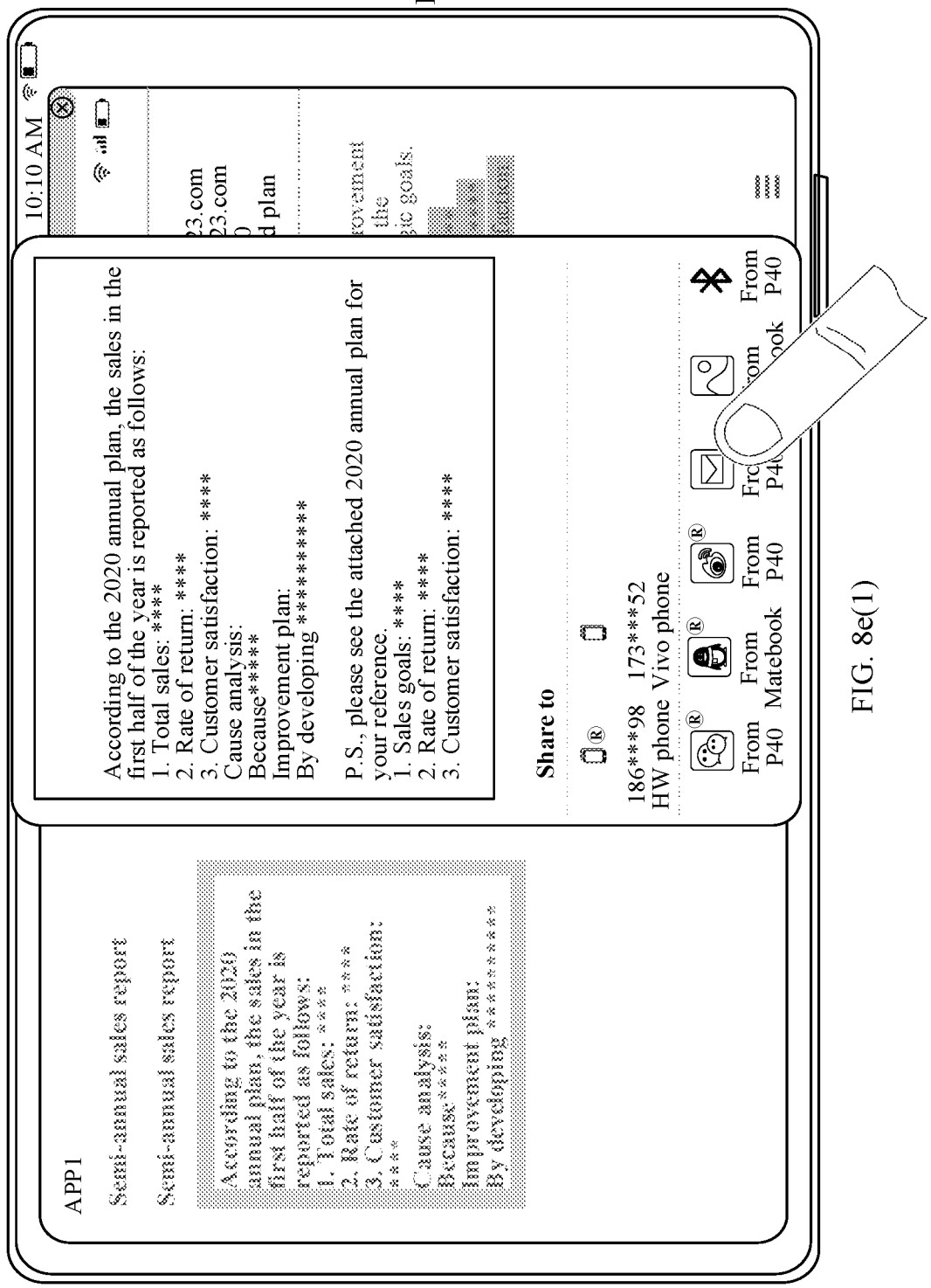
FIG. 8e(1)

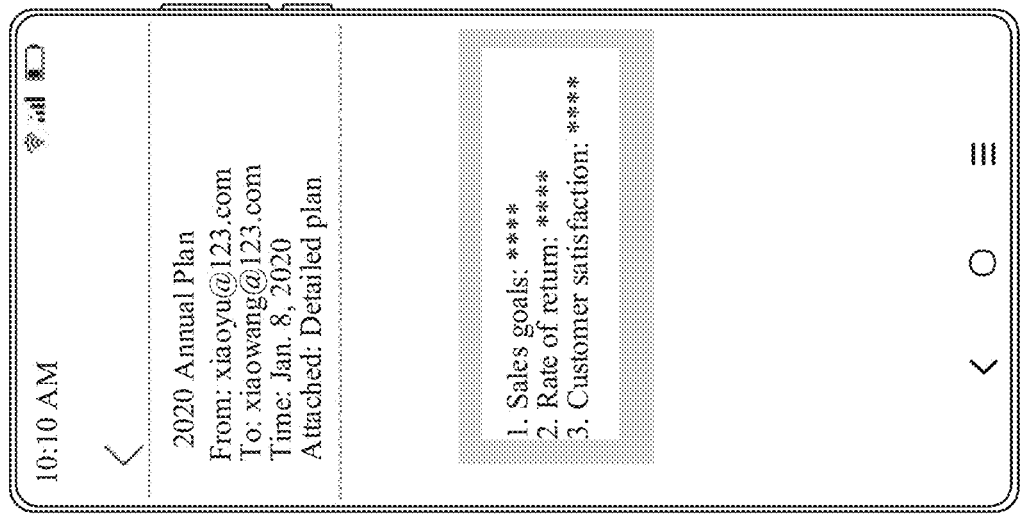
CONT.
FROM
FIG. 8e(1)
FIG. 8e(2)

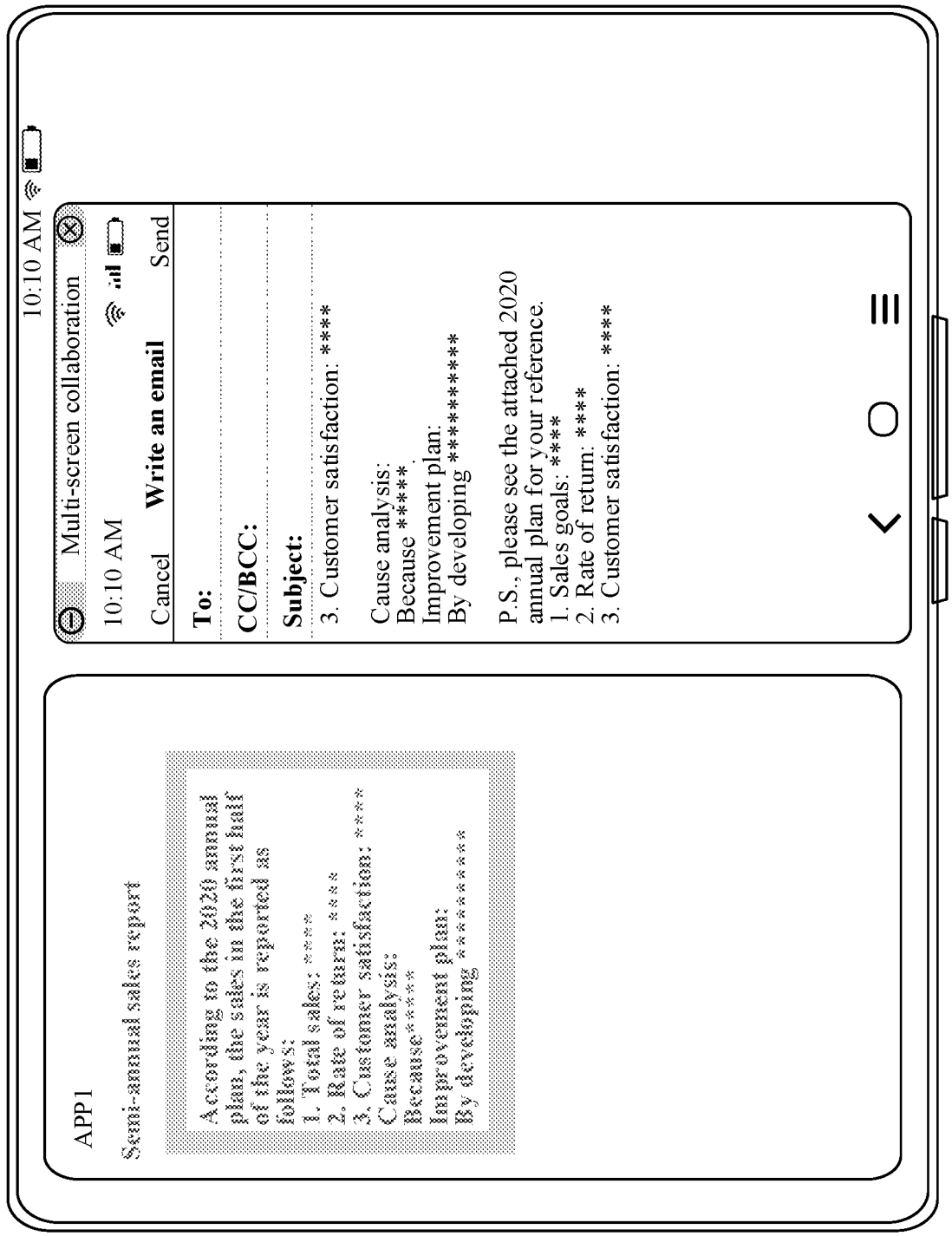
FIG. 8f(1)

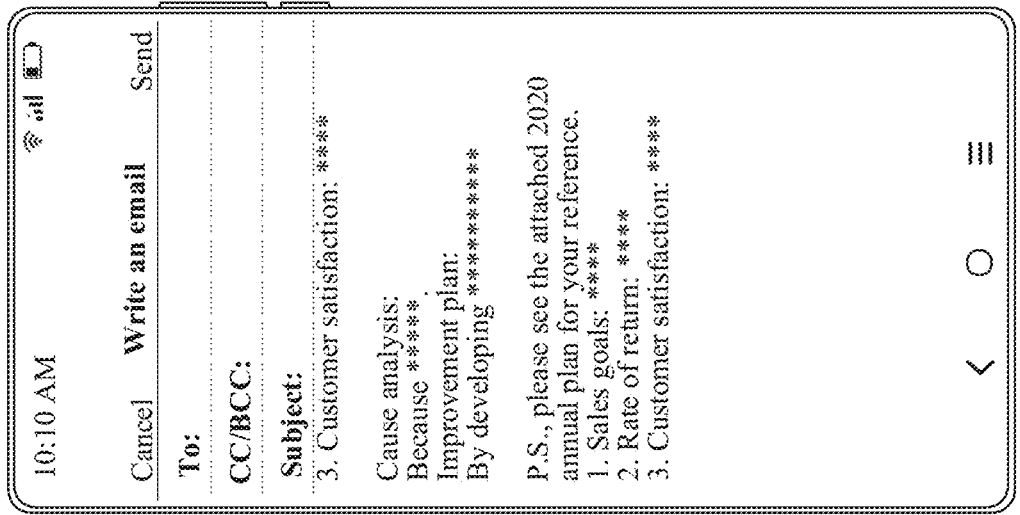
CONT.
FROM
FIG. 8f(1)
FIG. 8f(2)

MULTI-APPLICATION INTERACTION METHOD

CROSS-REFERENCE TO RELATED APPLICATIONS

This is a U.S. National Stage of International Patent Application No. PCT/CN2021/118690 filed on Sep. 16, 2021, which claims priority to Chinese Patent Application No. 202010975274.8 filed on Sep. 16, 2020. Both of the aforementioned applications are hereby incorporated by reference in their entireties.

TECHNICAL FIELD

Embodiments of the present invention relate to the technical field of terminals, and in particular, to a multi-application interaction method.

BACKGROUND

With rapid development of information science and technology and the prevalence of electronic devices, different applications, for example, news application software, chat application software, shopping application software, and office software, may be installed on an electronic device to meet different requirements of users. A user may use a plurality of applications via a touchscreen of a same electronic device simultaneously, for example, by using a multi-screen display function of the electronic device, or by using a primary screen and a secondary screen of a foldable touchscreen of an electronic device, or by displaying an application interface of one electronic device on another electronic device through projection. In these scenarios, the user has a requirement on processing content in the plurality of applications.

In a related technology, when content in the plurality of applications is processed, and as an image file is used as an example, when a user needs to share an image in an application A and an image in an application B for processing, the following steps are usually required: First, selecting an image in the application A to be processed and saving the to-be-processed image in a local folder, selecting an image in the application B to be processed and saving the image in a local folder; switching a display interface of the electronic device to a primary, touchscreen; swiping the touchscreen to find an application C, and opening an interface of the application C for sharing: and selecting to add to-be-shared content in the application C. and selecting the image from the application A and the image from the application B from the local folders. It can be learned from the foregoing method that, when content in a plurality of applications is processed, switching is involved between the plurality of applications, with a plurality of steps required to complete the processing. User experience is poor because the operation process is complex for users and operation efficiency of content processing between the plurality of applications is low.

SUMMARY

Embodiments of this application provide a multi-application interaction method to improve efficiency of an interactive operation between a plurality of applications.

A first aspect of the embodiments of this application provides a multi-application interaction method. The method includes: A first electronic device displays an interface of a first application and an interface of a second application; obtains first content in the interface of the first application in response to a first operation on the interface of the first application; obtains second content in the interface of the second application in response to a second operation on the interface of the second application; receives a third operation on the first content and a fourth operation on the second content that are performed simultaneously, where the third operation includes dragging, and the fourth operation includes dragging; and the first electronic device displays a first window after the first content and the second content are dragged to a first area on a touchscreen of the first electronic device (for example, after drag and drop, that is, after the drag operation is finished), where the first window includes third content displayed in a second area of the first window and a first option displayed in a third area of the first window, the third content is related to the first content and the second content, and the first option includes at least one option for sharing.

In this embodiment, a user may perform interactive processing on content in two applications, and share the content after the interactive processing, enjoying a more convenient sharing operation and optimized operation experience of sharing content in different applications.

In a possible implementation of the first aspect of the embodiments of this application, the first electronic device displays a second window in the first area in a first display manner during the dragging of the first content and the second content, where the first display manner is different from a manner of displaying the interface of the first application or the interface of the second application; and that the first content and the second content are dragged to the first area includes: The first content and the second content are dragged to the second window in the first area.

In this embodiment, the electronic device displays a position of a hot area window during the drag action of the user, and the user may directly see a position of a window corresponding to the first area or a fourth area on the touchscreen. This facilitates the user to drag the first content and the second content to the position of the window corresponding to the first area or the fourth area, thereby improving operating accuracy of the user.

In a possible implementation of the first aspect of the embodiments of this application, the third area of the first window further includes a second option, and a function corresponding to the second option includes combining or comparing content at least a part of the first content with at least a part of the second content to obtain the third content; and the first electronic device displays the third content in the second area in response to an operation that the second option is selected.

In a possible implementation of the first aspect of the embodiments of this application, during the dragging of the first content and the second content, the first electronic device displays a third window in the first area in a second display manner, and displays a fourth window in a fourth area in a third display manner, where the second display manner is different from a manner of displaying the interface of the first application or the interface of the second application, and the third display manner is different from a manner of displaying the interface of the first application or the interface of the second application; and a function corresponding to the third window includes a first function, a function corresponding to the fourth window includes a second function, where the first function is different from the second function; and that the electronic device displays a first window after the first content and the second content are dragged to the first area on the touchscreen of the first electronic device (for example, after drag and drop, that is, after the drag operation is finished) includes: The electronic device displays the first window after the first content and the second content are dragged and dropped to the third window on the touchscreen of the first electronic device; and the third content is content obtained by processing the first content and the second content, where the processing corresponds to the first function.

In a possible implementation of the first aspect of the embodiments of this application, the first function is to compare two pieces of content, and the second function is to combine two pieces of content; or the first function is to combine two pieces of content, and the second function is to compare two pieces of content.

In a possible implementation of the first aspect of the embodiments of this application, that the first electronic device displays the third window in the first area in the second display manner, and displays the fourth window in the fourth area in the third display manner includes: The first electronic device displays an identifier of the first function in the third window; and the first electronic device displays an identifier of the second function in the fourth window.

In this embodiment, the electronic device displays the position of the window corresponding to the first area or the fourth area and a function of the window corresponding to the first area or the fourth area during the drag action of a user, so that the user can drag, based on the identifier of the first function or the identifier of the second function, the first content and the second content to the window in which the function needs to be performed, thereby reducing costs for the user to learn about the window, and improving user operation experience.

In a possible implementation of the first aspect of the embodiments of this application, the third content is editable, and an acceptable editing operation on the third content includes at least one of the following: moving, copying, changing a format of, deleting a text from, or adding a text to text content, zooming in, zooming out, cropping, stitching, or moving image content, and applying a first background color or a first background image to the third content. The electronic device displays an identifier of at least one application in response to the option for sharing being selected; and the first electronic device sends the third content or the third content with an edit to the third application in response to an operation that an identifier of a third application is selected, where the third application is one of the at least one application.

In a possible implementation of the first aspect of the embodiments of this application, the first area is in the middle of the touchscreen of the electronic device, or the first area is on any side of the touchscreen of the electronic device.

In a possible implementation of the first aspect of the embodiments of this application, the first area is in the middle of the touchscreen of the electronic device, and the fourth area is on any side of the touchscreen of the electronic device; the first area is on any side of the touchscreen of the electronic device, and the fourth area is in the middle of the touchscreen of the electronic device; or both the first area and the fourth area are in the middle of or on any side of the touchscreen of the electronic device.

In a possible implementation of the first aspect of the embodiments of this application, the third area of the first window includes a third option, the third option includes at least one first search option, the first search option indicates the first application to perform a first search, the first search is a search based on all or a part of the second content, or the first search option indicates the second application to perform a second search, and the second search is a search based on all or a part of the first content; and in response to an operation that the first search option is selected, a result obtained by performing the first search is displayed in the interface of the first application, or a result obtained by performing the second search is displayed in the interface of the second application.

In this embodiment, a user may further perform a search function based on a result of the interactive processing of the first content and the second content, to resolve a problem in the prior art that a process of performing a search operation in different applications is cumbersome; and to simplify the process of user operation.

In a possible implementation of the first aspect of the embodiments of this application, the third area of the first window includes a fourth option. The fourth option includes at least one first editing option. The first editing option is used to indicate the first application to perform first editing processing. The first editing processing is deleting the first content, inserting the second content, or replacing the first content with the second content in the interface of the first application, or the first editing option is used to indicate the second application to perform second editing processing, and the second editing processing is deleting the second content, or inserting the first content, or replacing the second content with the first content in the interface of the second application; and in response to an operation that the first editing option is selected, content obtained by performing the first editing processing is displayed in the interface of the first application, or content obtained by performing the second editing processing is displayed in the interface of the second application.

In this embodiment, a user may further perform an editing function on the first content and the second content based on a result of the interactive processing of the first content and the second content, to resolve a problem in the prior art that an operation process of editing content in different applications is cumbersome; and to simplify the process of user operation.

In a possible implementation of the first aspect of the embodiments of this application, that the first content in the interface of the first application is obtained includes at least one of the following: obtaining, by taking a screenshot of the interface of the first application, content displayed in the interface of the first application; obtaining content selected through a drag operation in the interface of the first application; or obtaining all content of the file in the case that a file in the interface of the first application is selected.

In this embodiment, the first content or the second content may include content in a plurality of formats, and a user may perform an interactive operation on the content in the plurality of formats, to provide more diversified sharing operations and optimize user experience in sharing a plurality of types of content.

In a possible implementation of the first aspect of the embodiments of this application, the first content or the second content includes one or more texts, images, videos, or audio pieces, and the first content and the second content are of a same type or different types.

In a possible implementation of the first aspect of the embodiments of this application, the first content includes at least one text and/or at least one image, and the second content includes at least one text and/or at least one image; and an image corresponding to the third content is shared in response to an operation that the option for sharing is selected, where the image corresponding to the third content is an image obtained by combining at least the part of the first content and at least the part of the second content.

In a possible implementation of the first aspect of the embodiments of this application, that the first electronic device displays the interface of the first application and the interface of the second application includes: the first electronic device includes the first application and the second application, the interface of the first application is displayed in a fifth area on the touchscreen of the first electronic device, and the interface of the second application is displayed in a sixth area on the touchscreen of the first electronic device; or the first electronic device includes the first application, the interface of the first application is displayed in a fifth area on the touchscreen of the first electronic device, and the interface of the second application is displayed in a sixth area on the touchscreen of the first electronic device, where the interface of the second application is an interface projected from the interface of the second application on the second electronic device to the first electronic device.

In this embodiment, a user may perform interactive processing on content on the first electronic device and on the second electronic device, and the content obtained after the interactive processing may be sent to an application on any device. Interactive processing and sharing of the content on two different devices are implemented by simple operations, thereby reducing steps of file transfer between different devices and optimizing user experience of content processing.

In a possible implementation of the first aspect of the embodiments of this application, an application corresponding to one option for sharing is an application on the first electronic device or an application on the second electronic device.

In a possible implementation of the first aspect of the embodiments of this application, the first area overlaps a part of the fifth area and a part of the sixth area.

A second aspect of the embodiments of this application provides a multi-application content interaction method, including: A first electronic device displays an interface of a first application and an interface of a second application; obtains first content in the interface of the first application in response to a first operation on the interface of the first application; obtains second content in the interface of the second application in response to a second operation on the interface of the second application; receives a third operation on the first content and a fourth operation on the second content that are performed simultaneously, where the third operation includes dragging, and the fourth operation includes dragging; the first electronic device displays a fifth window on a current user interface during the dragging of the first content and the second content, where there are identifiers of a plurality of applications displayed in the fifth window; and shares third content with the third application in response to continuous dragging through the third operation and the fourth operation and drag-and-drop (that is, the drag operation is finished) near an identifier of the third application in the fifth window, where the identifier of the third application is one of the identifiers of the plurality of applications, and the third content is a result obtained after a comparison between or a combination of the first content and the second content.

In a possible implementation of the second aspect of the embodiments of this application, the fifth window is in the middle of the touchscreen of the electronic device, or the fifth window is on any side of the touchscreen of the electronic device.

In a possible implementation of the second aspect of the embodiments of this application, the first electronic device displays the fifth window in the first area in a fourth display manner, where the fourth display manner is different from a manner of displaying the interface of the first application or the interface of the second application.

In a possible implementation of the second aspect of the embodiments of this application, the fifth window overlaps a part of the interface of the first application and a part of the interface of the second application.

A third aspect of the embodiments of this application provides a computer-readable storage medium. The computer storage medium stores a computer program, the computer program includes program instructions. When the program instruction are run on an electronic device, the electronic device is enabled to perform the multi-application interaction method according to the first aspect or the second aspect.

A fourth aspect of the embodiments of this application provides an electronic device. The electronic device has a touchscreen, a memory, and a processor. The memory stores one or more computer programs. When the processor executes the one or more computer programs, the electronic device is enabled to implement the multi-application interaction method according to the first aspect or the second aspect.

In a possible implementation of the fourth aspect of the embodiments of this application, the memory stores a touchscreen driver program, an interface service program, an input manager program, a window manager program, a hot area manager program, a notification manager program, a first application, and a second application. The processor is configured to: execute the touchscreen driver program and the interface service program, to enable the electronic device to display an interface of the first application and an interface of the second application; execute the touchscreen driver program, the input manager program, and the window manager program, to enable the electronic device to obtain first content in the interface of the first application in response to a first operation on the interface of the first application, and obtain second content in the interface of the second application in response to a second operation on the interface of the second application; execute the touchscreen driver program, the input manager program, and the window manager program, to enable the electronic device to receive a third operation on the first content and a fourth operation on the second content that are performed simultaneously, where the third operation includes dragging, and the fourth operation includes dragging; and execute the hot area manager program, the window manager program, the interface service program, and the touchscreen driver program, to enable the first electronic device to display a first window after the first content and the second content are dragged to a first area on the touchscreen of the first electronic device (for example, after drag and drop, that is, after the drag operation is finished), where the first window includes third content displayed in a second area of the first window and a first option displayed in a third area of the first window, the third content is related to the first content and the second content, and the first option includes at least one option for sharing.

In addition, for any implementation of the fourth aspect of this embodiment and the corresponding technical effect, refer to the implementations of the second aspect and the corresponding technical effect and any implementation of the second aspect and the corresponding technical effect. Details are not described herein again.

A fifth aspect of the embodiments of this application provides a graphical user interface system on an electronic device. The electronic device has a touchscreen, a memory, and one or more processors. The one or more processors are configured to execute one or more computer programs stored in the memory. The graphical user interface includes a graphical user interface displayed by the electronic device when performing any multi-application interaction method according to the first aspect or the second aspect.

According to a sixth aspect, an embodiment of this application provides an apparatus. The apparatus is included in an electronic device, and the apparatus has a function for implementing behavior of the electronic device in the foregoing aspect and the possible implementations of the foregoing aspect. The function may be implemented by using hardware, or may be implemented by using hardware executing corresponding software. The hardware or the software includes one or more modules or units corresponding to the function.

A seventh aspect of the embodiments of this application provides a computer program product. When the computer program product runs on a computer, the computer is enabled to perform the card display method in any implementation of the first aspect or the second aspect.

It can be learned from the foregoing technical solutions that, in some embodiments provided in this application, a user may perform interactive processing on content in two applications, including combining the content in the two applications or comparing the content in the two applications. The content in the applications may be a web page screenshot, text, image, audio, or video. The user may perform interactive processing on content in a plurality of applications and share a result, enjoying a more convenient sharing operation and optimized user operation experience of sharing content in different applications.

BRIEF DESCRIPTION OF DRAWINGS

To describe the technical solutions in embodiments of the present invention or in the prior art more clearly, the following briefly describes the accompanying drawings for describing embodiments or the prior art. It is clear that the accompanying drawings in the following descriptions show some embodiments of the present invention, and a person of ordinary skill in the art may still derive other drawings from these accompanying drawings.

FIG. 3a to FIG. 3m are schematic diagrams of a touchscreen of an electronic device for a multi-application interaction method according to an embodiment of this application;

FIG. 4a to FIG. 4l are schematic diagrams of a touchscreen of an electronic device for a multi-application interaction method according to an embodiment of this application;

FIG. 5a(1) to FIG. 5h(2) are schematic diagrams of a touchscreen of an electronic device for a multi-application interaction method according to an embodiment of this application;

FIG. 6a(1) to FIG. 6g(2) are schematic diagrams of a touchscreen of an electronic device for a multi-application interaction method according to an embodiment of this application;

FIG. 8a(1) to FIG. 8f(2) are schematic diagrams of a touchscreen of an electronic device for a multi-application interaction method according to an embodiment of this application:

DESCRIPTION OF EMBODIMENTS

To make the objectives, technical solutions, and advantages of embodiments of the present invention clearer, the following clearly and completely describes the technical solutions in a possible implementation with reference to the accompanying drawings in the possible implementation. It is clear that the described embodiments are some but not all of embodiments of the present invention.

Figure 1:
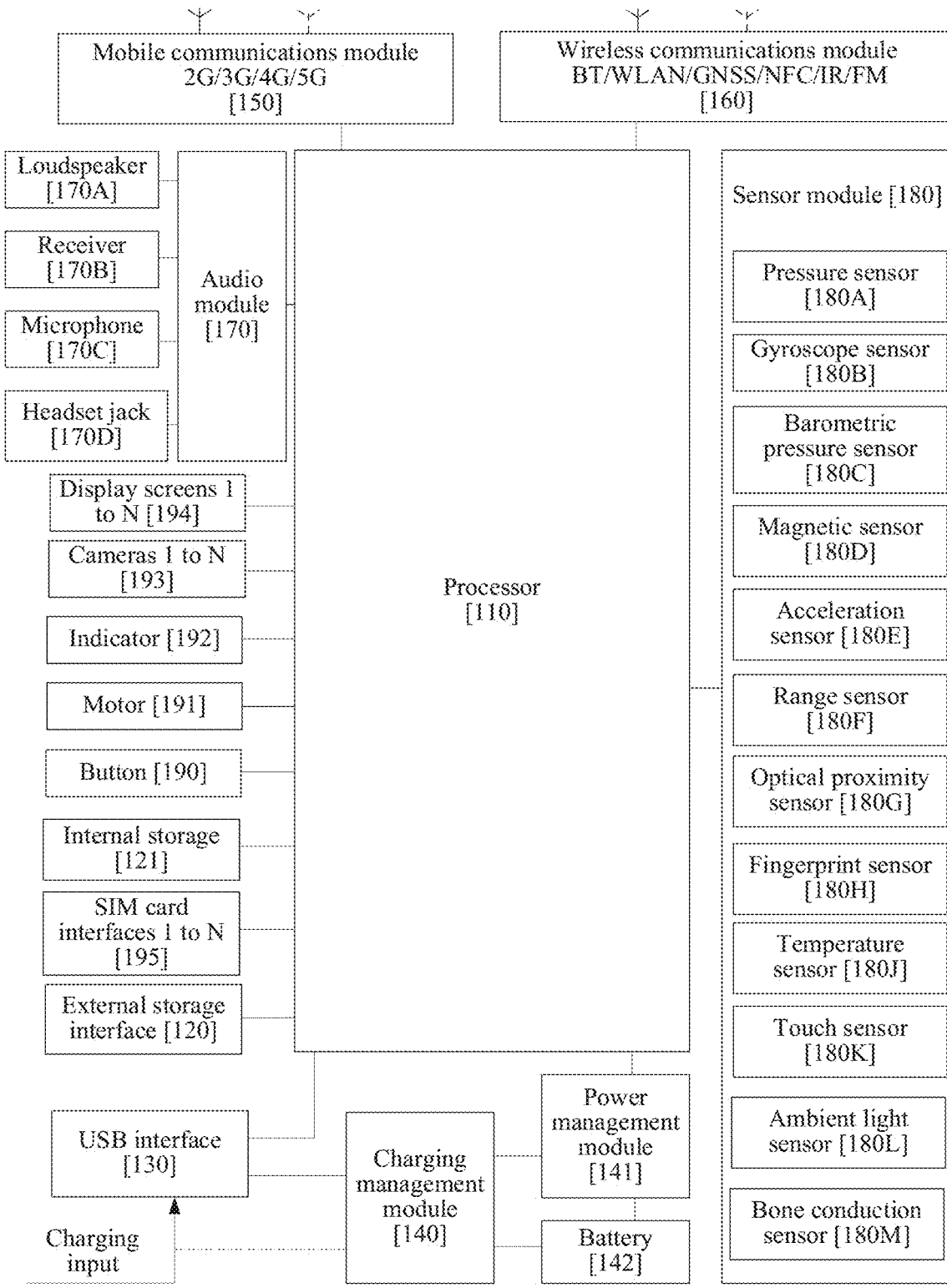
FIG. 1 is a schematic diagram of a structure of an electronic device according to an embodiment of this application.

The following first describes an example of an electronic device 100 provided in the following embodiments of this application. FIG. 1 is a schematic diagram of a structure of an electronic device 100. The electronic device 100 may include a processor 110, an external storage interface 120, an internal storage 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a receiver 170B, a microphone 170C, a headset jack 170D, a sensor module 180, a button 190, a motor 191, an indicator 192, a camera 193, a touchscreen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on an instruction operation code and a time sequence signal, to complete control of instruction fetching and instruction execution.

A memory may be further disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or the data again, the processor may directly invoke the instruction or the data from the memory. This avoids repeated access, reduces a time for waiting of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound. I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function for answering a call by using a Bluetooth headset.

The PCM interface may also be used for audio communication, with analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function for answering a call by using a Bluetooth headset. Both the I2S interface and the PCM interface may be used for audio communication.

The UART interface is a universal serial data bus, and is used for asynchronous communication. The bus may be a two-way communications bus. The bus converts between serial communication and parallel communication for data to be transmitted. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function for playing music by using a Bluetooth headset.

The MIPI interface may be used to connect the processor 110 to a peripheral component, for example, the touchscreen 194 or the camera 193. The MIPI interface includes a camera serial interface (camera serial interface, CSI), a display serial interface (display serial interface. DSI), and the like. In some embodiments, the processor 110 communicates with the camera 193 through the CSI, to implement a photographing function of the electronic device 100. The processor 110 communicates with the touchscreen 194 through the DSI, to implement a display function of the electronic device 100.

The GPIO interface may be configured by using software. The GPIO interface may be configured with a control signal, or may be configured with a data signal. In some embodiments, the GPIO interface may be used to connect the processor 110 to the camera 193, the touchscreen 194, the wireless communications module 160, the audio module 170, the sensor module 180, and the like. The GPIO interface may be further configured as an I2C interface, an I2S interface, a UART interface, a MIPI, or the like.

The USB interface 130 is an interface that conforms to a USB standard specification, and may be specifically a mini USB interface, a micro USB interface, a USB Type C interface, or the like. The USB interface 130 may be used to connect to a charger to charge the electronic device 100, or may be used to transmit data between the electronic device 100 and a peripheral device, or may be used to connect to a headset, to play audio by using the headset. The interface may be further used to connect to another electronic device, for example, an AR device.

It can be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device via the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal storage 121, the touchscreen 194, the camera 193, the wireless communications module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are used to transmit and receive an electromagnetic wave signal. Each antenna in the electronic device 100 may be used to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communications solution including 2G/3G/4G/5G that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least a part of functional modules of the mobile communications module 150 may be disposed in the processor 110. In some embodiments, at least a part of functional modules of the mobile communications module 150 and at least a part of modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal that is then transferred to the application processor. The application processor outputs a sound signal by using an audio device (which is not limited to the loudspeaker 170A, the receiver 170B, and the like), or displays an image or a video through the touchscreen 194. In some embodiments, the modem processor may be an independent component. In some other embodiments, the modem processor may be independent from the processor 110, and is disposed with the mobile communications module 150 or another functional module in the same device.

The wireless communications module 160 may provide a wireless communications solution that is applied to the electronic device 100 and that includes a wireless local area network (wireless local area network, WLAN) (for example, a wireless fidelity (wireless fidelity, Wi-Fi) network). Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, and the like. The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system. GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the touchscreen 194, the application processor, and the like. The GPU is a microprocessor for image processing, and is connected to the touchscreen 194 and the application processor. The GPU is configured to: perform mathematical and geometric calculation, and render an image. The processor 110 may include one or more GPUs that execute a program instruction to generate or change display information.

The touchscreen 194 is configured to display an image, a video, and the like. The touchscreen 194 includes a display panel. The display panel may use a liquid crystal display (liquid crystal display, LCD), an organic light-emitting diode (organic light-emitting diode. OLED), an active-matrix organic light-emitting diode (active-matrix organic light-emitting diode, AMOLED), a flexible light-emitting diode (flex light-emitting diode, FLED), a Mini-LED, a Micro-LED, a Micro-OLED, a quantum dot light-emitting diode (quantum dot light-emitting diode, QLED), and the like. In some embodiments, the electronic device 100 may include one or N touchscreens 194, and N is a positive integer greater than 1.

The electronic device 100 may implement a photographing function by using the ISP, the camera 193, the video codec, the GPU, the touchscreen 194, the application processor, and the like.

The ISP is configured to process data fed back by the camera 193. For example, during photographing, a shutter is opened, and light goes into a photosensitive element of the camera through a lens. An optical signal is converted into an electrical signal, and the photosensitive element of the camera transmits the electrical signal to the ISP for processing, to convert the electrical signal into a visual image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency point energy.

The video codec is configured to compress or decompress a digital video. The electronic device 100 may support one or more types of video codecs. Therefore, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented by using the NPU.

The external storage interface 120 may be used to connect to an external storage card, for example, a micro SD card, to extend a storage capability of the electronic device 100. The external storage card communicates with the processor 110 through the external storage interface 120, to implement a data storage function. For example, files such as music and a video are stored in the external storage card.

The internal storage 121 may be configured to store a computer-executable program code. The executable program code includes an instruction. The internal storage 121 may include a program storage area and a data storage area. The program storage area may store an operating system, an application required for at least one function (for example, a sound playback function or an image play function), and the like. The data storage area may store data (for example, audio data and an address book) and the like that are created during use of the electronic device 100. In addition, the internal storage 121 may include a high-speed random access memory, and may further include a nonvolatile memory, for example, at least one magnetic disk storage device, a flash memory device, or a universal flash storage (universal flash storage, UFS). The processor 110 runs the instruction stored in the internal storage 121 and/or an instruction stored in the memory disposed in the processor, to implement various function applications and data processing of the electronic device 100.

The electronic device 100 may implement an audio function through the audio module 170, the loudspeaker 170A, the receiver 170B, the microphone 170C, the headset jack 170D, the application processor, and the like, for example, to play music, record sounds, or the like.

The audio module 170 is configured to convert digital audio information into an analog audio signal for outputting, and is further configured to convert an analog audio input into a digital audio signal. The audio module 170 may be further configured to encode and decode an audio signal. In some embodiments, the audio module 170 may be disposed in the processor 110, or a part of functional modules of the audio module 170 are disposed in the processor 110.

The loudspeaker 170A, also referred to as a "speaker", is configured to convert an electrical audio signal into a sound signal. The electronic device 100 may receive music or receive a hands-free call by using the loudspeaker 170A.

The receiver 170B, also referred to as an "earpiece", is configured to convert an electrical audio signal into a sound signal. When a call or audio information is received by the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may move the mouth close to the microphone 170C and make a sound, to input a sound signal to the microphone 170C. At least one microphone 170C may be disposed in the electronic device 100. In some other embodiments, two microphones 170C may be disposed in the electronic device 100, to collect a sound signal and further reduce noises. In some other embodiments, three, four, or more microphones 170C may alternatively be disposed in the electronic device 100, to collect a sound signal, reduce noises, and identify a sound source, to implement a directional sound recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association, CTIA of the USA) standard interface.

The pressure sensor 180A is configured to sense a pressure signal, and may convert the pressure signal into an electrical signal. In some embodiments, the pressure sensor 180A may be disposed in the touchscreen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a pressure is applied to the pressure sensor 180A, capacitance between electrodes changes. The electronic device 100 determines pressure intensity based on a capacitance change. When a touch operation is performed on the touchscreen 194, the electronic device 100 detects strength of the touch operation by using the pressure sensor 180A. The electronic device 100 may calculate a touch position based on a detection signal from the pressure sensor 180A. In some embodiments, touch operations that are performed at a same touch position but have different touch operation intensity may correspond to different operation instructions. For example, when a touch operation with touch operation intensity less than a first pressure threshold is performed on an icon Messages, an instruction for viewing an SMS message is executed. When a touch operation with touch operation intensity greater than or equal to the first pressure threshold is performed on the icon Messages, an instruction for creating a new SMS message is executed.

The gyroscope sensor 180B may be configured to determine a motion posture of the electronic device 100. In some embodiments, an angular velocity of the electronic device 100 around three axes (that is, axes x, y, and z) may be determined by using the gyroscope sensor 180B. The gyroscope sensor 180B may be configured to implement image stabilization during photographing. For example, when the shutter is clicked, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in navigation or a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to help with positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature, for example, automatic unlocking, upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in, for example, switching between landscape mode and portrait mode or a pedometer.

The distance sensor 180F is configured to measure a distance. The electronic device 100 may measure a distance using infrared or laser. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user is holding the electronic device 100 close to the ear when making a call, so as to automatically perform touchscreen-off for power saving. The optical proximity sensor 180G may be further used in a leather case mode or a pocket mode to automatically unlock or lock the screen.

The ambient light sensor 180L is configured to sense ambient light brightness. The electronic device 100 may adaptively adjust luminance of the touchscreen 194 based on the sensed ambient light brightness. The ambient light sensor 180L may be further configured to automatically adjust a white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when a temperature reported by the temperature sensor 180J exceeds a threshold, the electronic device 100 lowers performance of a processor near the temperature sensor 180J, to reduce power consumption and provide thermal protection. In some other embodiments, when the temperature is less than another threshold, the electronic device 100 heats up the battery 142 to prevent the electronic device 100 from being shut down anomalously due to a low temperature. In some other embodiments, when the temperature is less than still another threshold, the electronic device 100 boosts an output voltage of the battery 142 to avoid anomalous shutdown due to a low temperature.

The touch sensor 180K may also be referred to as a "touchscreen device". The touch sensor 180K may be disposed on the touchscreen 194. The touch sensor 180K and the touchscreen 194 form a touchscreen, which is also referred to as a "touch screen". The touch sensor 180K is configured to detect a touch operation performed on or near the touch sensor. The touch sensor may transfer a detected touch operation to the application processor to determine a type of the touch event. The application processor may provide a visual output related to the touch operation by using the touchscreen 194. In some other embodiments, the touch sensor 180K may be alternatively disposed on a surface of the electronic device 100, and is located at a position different from that of the touchscreen 194.

The bone conduction sensor 180M may obtain a vibration signal. In some embodiments, the bone conduction sensor 180M may obtain a vibration signal of a vibration bone of a human vocal-cord part. The bone conduction sensor 180M may be further in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt, and may be configured to provide touch vibration feedback. For example, touch operations performed on different applications (for example, taking an image and playing audio) may correspond to different vibration feedback effects. For touch operations performed on different areas of the touchscreen 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 simultaneously. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system on the electronic device 100 may use a layered architecture, an event-driven architecture, a microkernel architecture, a micro service architecture, or a cloud architecture. In this embodiment of the present invention, an ANDROID® operating system with a layered architecture is used as an example to describe a software structure of the electronic device 100. The operating system is a Linux-based mobile device operating system, and implements various functions in combination with the foregoing hardware in the electronic device. The stored software architecture of the ANDROID® operating system is described in detail below. It should be noted that in this embodiment of this application, the ANDROID®, operating system is used merely as an example to describe a software environment required by the electronic device to implement the technical solution in this embodiment. A person skilled in the art may understand that this embodiment of this application may alternatively be implemented by using another operating system, for example, an iOS operating system.

Figure 2:
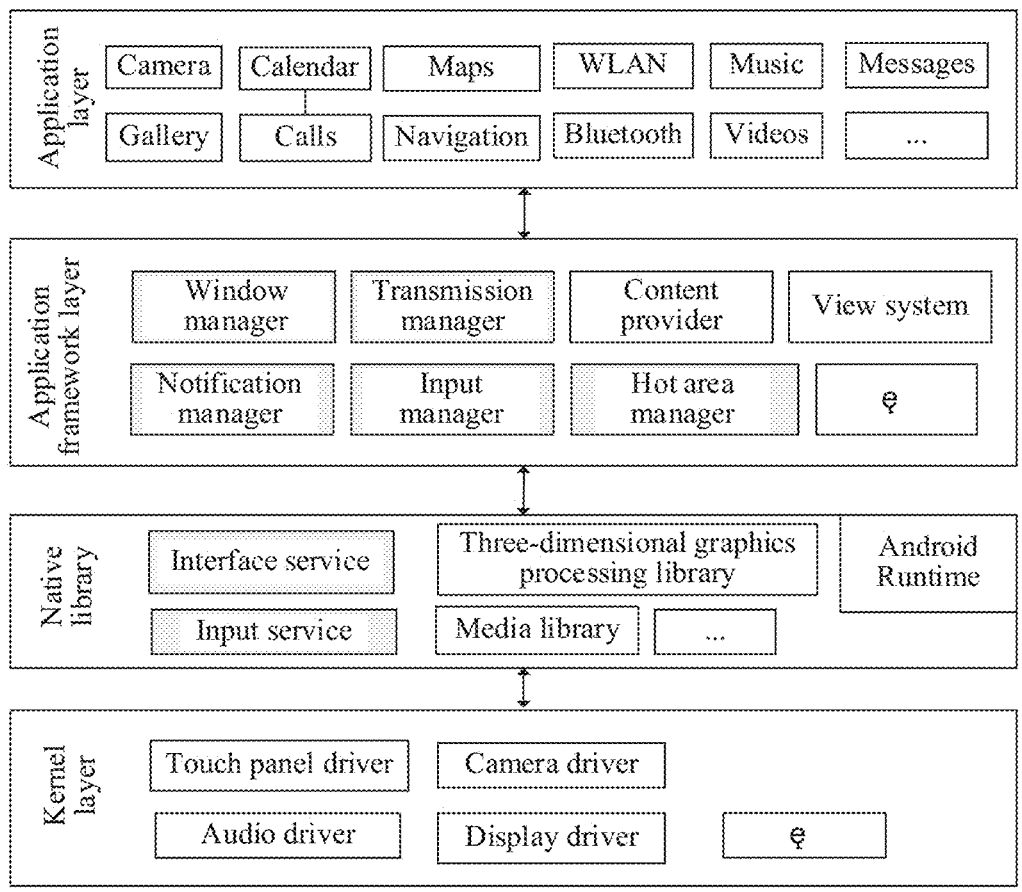
FIG. 2 is a block diagram of a software structure of an electronic device according to an embodiment of this application.

For example, FIG. 2 is a schematic diagram of the software architecture of the ANDROID® operating system that can run in the foregoing electronic device. In the layered architecture, software is divided into several layers, and each layer has a clear-cut role and task. The layers communicate with each other through a software interface. In some embodiments, the Android system is divided into four layers: an application layer, an application framework layer, Android Runtime (Android Runtime) and a native library, and a kernel layer, from top to bottom.

Application Layer (Applications)

The application layer is an uppermost layer of the operating system. Generally, an application is developed with Java, and is completed by invoking an application programming interface (application programming interface, API) provided by the application framework layer. As shown in FIG. 2, an application package may include applications such as Camera, Gallery, Calendar, Phone, Maps, Navigation, WLAN, Bluetooth, Music, Videos, and Messages.

Generally, the applications are developed with Java, and are completed by invoking an application programming interface (application programming interface, API) provided by the application framework layer.

In some embodiments of this application, in a case in which a terminal includes both an application and a twin application of the application, the application layer may invoke a corresponding API and programming framework provided by the application framework layer, to display one entry icon of the twin application on a sub-touchscreen of a primary touchscreen of the terminal (the entry icon may be an icon of the application, may be an icon of the twin application of the application, or may be an icon different from the icon of the application and the icon of the twin application of the application).

2. Application Framework Layer (Application Framework)

As shown in FIG. 2, the application framework layer mainly provides various APIs that can be used by a developer to access an application. The developer may interact with a bottom layer (for example, a function library or a Linux kernel) of the operating system via an application framework, to develop an application as desired. The application framework is mainly a series of service and management systems of the Android operating system. The application framework mainly includes the following basic services:

a window manager, an input manager, a content provider, a view system, a notification manager, a hot area manager, a transmission manager, and the like.

The window manager (Windows Manager) is configured to manage a window of an application. The window manager may be configured to obtain a size and a position of the application window. The window manager may be configured to associate a position of a touch point with a window and a corresponding application. The window manager may be configured to control window display, determine whether there is a status bar, lock a touchscreen, capture the touchscreen, and the like.

The input manager (Input Manager) is configured to process various input operations, collect a touch event, complete touch event dispatching, and the like, for example, dispatch a touch event to the window manager.

The content provider (Content Providers) is configured to store and obtain data, and allow the data to be accessed by an application. The data may include a video, an image, audio, outcoming and incoming calls, a browsing history and bookmarks, contacts, and the like.

The view system (View) includes a visual control with a rich and extensible collection of views that can be used to build an application. Specifically, the system includes a plurality of types such as a list (list), a grid (grid), a text (text), a button (button), and an image (image). A main function of the image view is to display an image, and the image view is usually shown in a GUI in a form of a non-editable control. A main function of the text view is to display a character string, and the text view is usually shown in the GUI in a form of an editable control.

The notification manager (Notification Manager) is configured to broadcast a message to an object of the electronic device, where the object includes an application, a window, an internal module of the electronic device, and the like. The notification manager enables an application to display notification information in a status bar, and may be configured to transmit a message of a type of notification. The displayed information may automatically disappear after a short pause without user interaction. For example, the notification manager is configured to notify download completion, provide a message notification, and the like. The notification manager may alternatively be a notification that appears in a status bar at the top of the system in a form of a graph or a scroll bar text, for example, a notification from an application run in the background, or may be a notification that appears on the touchscreen in a form of a dialog window. For example, text information is prompted in the status bar, a prompt tone is played, the electronic device vibrates, or the indicator light blinks.

The hot area manager includes a listening module, an algorithm module, and a processing module. The processing module includes a first hot area and a second hot area. The listening module is configured for a parameter of a touch point; the algorithm module is configured to compare or combine content in applications; and the first hot area and the second hot area are used to execute a corresponding area function based on a position of the touch point.

The transmission manager is configured for data receiving and sending between the electronic device and another electronic device, where the another electronic device establishes a communication connection in a wired or wireless manner. For example, the electronic devices are located in a same local area network.

3. Native Library (Libraries)

The native library supports an application framework and plays an important role in linking the application framework layer to the Linux kernel layer. The native library includes some function libraries compiled with the C computer programming language or C++ language. These native libraries can be used by different components in the operating system, and provide services for developers via the application framework layer.

Android Runtime is a runtime environment used by the ANDROID® operating system and a type of new virtual machine used by the ANDROID® operating system. The AOT (Ahead-Of-Time) technology is used in Android Runtime. When an application is installed for a first time, a bytecode of the application is pre-compiled into a machine code, so that the application becomes a local application. Then, a compilation step is omitted when the application runs again, so that both startup and execution become faster. Android Runtime plays a part in scheduling and management in the Android system. The application layer and the application framework layer run in the virtual machine. The virtual machine executes the Java files of the application layer and the application framework layer as binary files. The virtual machine is used to perform functions such as content life cycle management, stack management, thread management, safety and exception management, and garbage collection.

The native library may include a plurality of functional modules, for example, an interface service (SurfaceFlinger), an input service (InputFlinger), a media library (Media Libraries), and a three-dimensional graphics processing library (for example, OpenGL ES).

As a service provided by an Android native library, the interface service (SurfaceFlinger) manages access to a display system, and is specifically used to manage a display subsystem when a plurality of applications are executed, and provide blending of 2D and 3D image layers for the plurality of applications. After completing various graphical operations on the surface of each application, the application requests SurfaceFlinger for display on the touchscreen.

The input service (InputFlinger) is set between a driver and the input manager, and the input service is used to dispatch a touch event detected by the driver of an input device to the input manager (input manager) in the application framework layer.

The media framework library (Media Framework) supports playback and recording of audio or videos in a plurality of encoding formats, and supports static image files and common audio or video encoding formats. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, composition, layer processing, and the like.

4. Linux Kernel Layer (Linux Kernel)

The layer provides a core system service of the operating system. For example, safety, memory management, process management, a network protocol stack, and a driver model are all based on the Linux kernel. The Linux kernel is also used as an abstraction layer between hardware and software stacks. In this layer, that are many driver programs related to a mobile device, and the main drivers include a display driver; frame buffer driver based on Linux; a touch panel driver used as an input device; an audio driver; a camera driver; and the like.

In some embodiments, interfaces of two applications are displayed on a touchscreen of a first electronic device. In some embodiments, the interfaces of the two applications are displayed on the touchscreen of the first electronic device. The two applications are described as a first application and a second application, and the first electronic device displays an interface of the first application in a fifth area on the touchscreen of the first electronic device, displays an interface of the second application in a sixth area on the touchscreen of the first electronic device; and the fifth area is a left-side area on the touchscreen of the first electronic device in FIG. 3 to FIG. 9, and the sixth area is a right-side area on the touchscreen of the first electronic device in FIG. 3 to FIG. 9. The names and positions are used to describe the solution, and are not intended to limit the technical solution.

In some embodiments, the first electronic device is in a split-screen state, and a user may trigger the first electronic device to enable a split-screen function by showing a split-screen gesture, selecting a split-screen option, or in another manner, so that the touchscreen of the first electronic device displays the interfaces of the two applications in the first electronic device. In some embodiments, this application further includes a second electronic device. The second electronic device projects and displays the second application on a touchscreen of the second electronic device onto the touchscreen of the first electronic device in a screen projection manner. The first electronic device displays the first application on the first electronic device and the second application on the second electronic device. In this embodiment of the present invention, unless otherwise specified, the first application and the second application on the first electronic device may be displayed in a split-screen manner or a screen projection manner, as long as the two applications are displayed on the touchscreen of the first electronic device.

In some embodiments, as shown in FIG. 3a to FIG. 3m, the first application and the second application may be a shopping application, a browser, or another application that can display a product introduction, and the touchscreens of the first application and the second application each display an introduction of products. In some embodiments, the first application and the second application may be a same application or different applications, and the products may be a same product or different products. In this embodiment, the first application and the second application are different applications, and the products are different products. The first application displays an introduction of a product A, and the second application displays an introduction of a product B, where the content includes a text and an image.

Figure 3A:
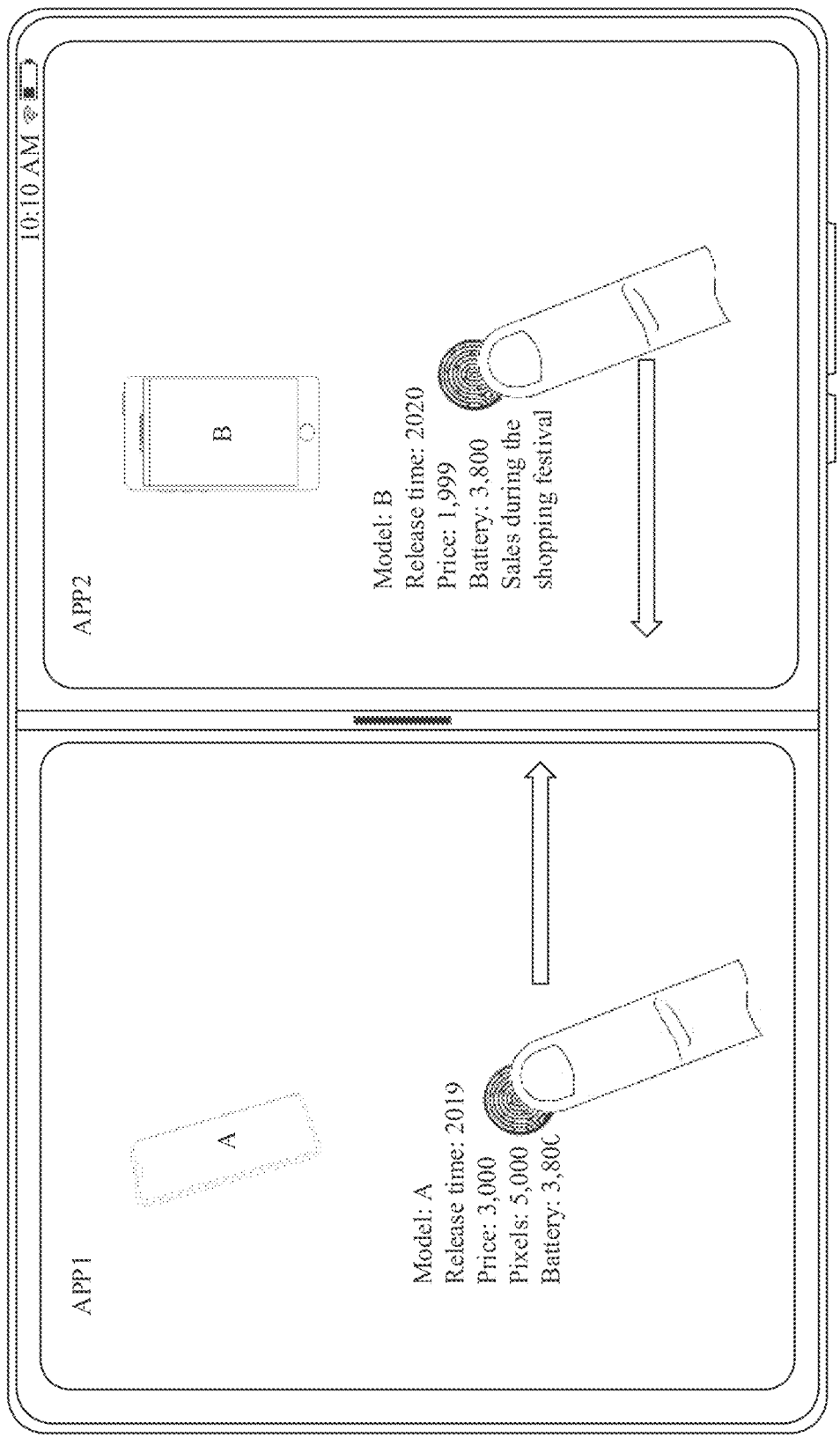

S301: As shown in FIG. 3a, in some embodiments, first content in the interface of the first application is obtained in response to a first operation on the interface of the first application; and second content in the interface of the second application is obtained in response to a second operation on the interface of the second application.

In the embodiment shown in FIG. 3a, the first operation may be a preset gesture, and is used to trigger the first electronic device to take a screenshot of the currently displayed first application, to obtain content in a current interface of the first application. The preset gesture may be a long press, a double-click, or the like. The first content is the content in the current interface of the first application. In this embodiment, the second operation is similar to the first operation, and details are not described again.

In some embodiments, a user may select content in an interface of an application with another gesture. The content includes a text, an image, and/or the like. An operation of selecting content may be that the user may move a position of a cursor by touching a screen, so that the cursor moves from a position where content starts to a position where content ends, and a part of content is selected. In some embodiments, the user may double-click on a touchscreen to select all content in the current interface; select one or more files in the current interface by clicking on the touchscreen; or select all or a part of the content with a custom gesture.

Figure 3B:
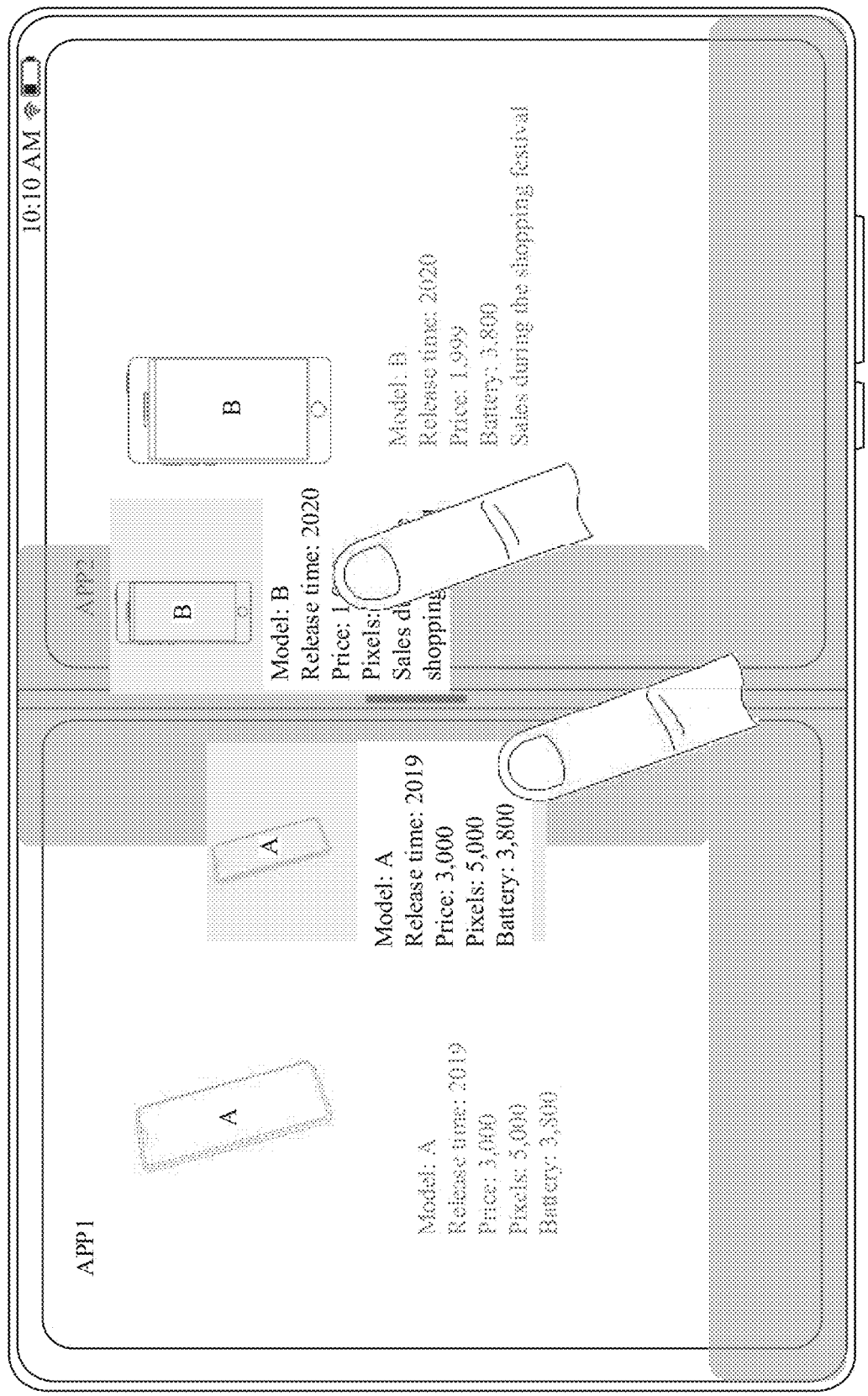

S302: In some embodiments, as shown in FIG. 3b, a third operation on the first content and a fourth operation on the second content that are performed simultaneously are received, and during dragging of the first content and the second content, the first electronic device displays a third window in the first area in a second display manner, and displays a fourth window in the fourth area in a third display manner, where the third operation includes dragging, and the fourth operation includes dragging.

In some embodiments, the first operation and the third operation performed on the first application may be continuous operations, for example, dragging after a long press. Alternatively, the first operation and the third operation performed on the first application may be separate operations. For example, the first operation may be double-clicking, and the third operation may be dragging. A specific operational gesture may be set as required. The second operation is similar to the fourth operation, and details are not described again.

Figure 13A:
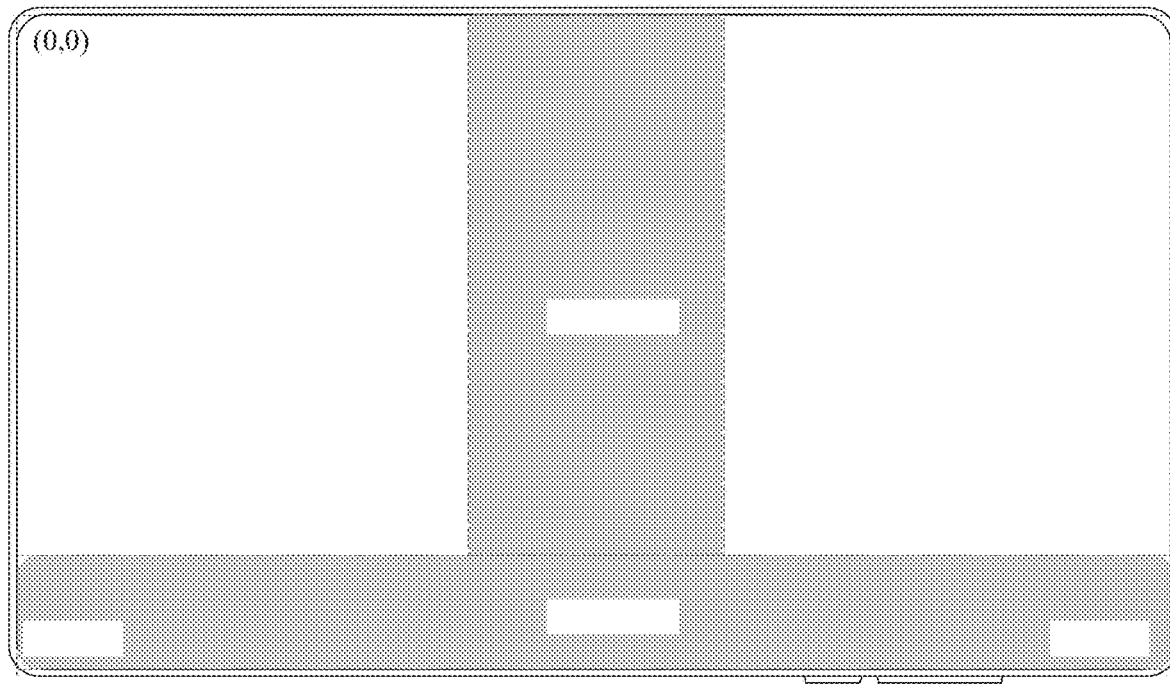
FIG. 13a to FIG. 13c are schematic diagrams of an area of an electronic device according to an embodiment of this application.

In this embodiment, the third window is in the middle of the touchscreen. As shown in FIG. 13a, a shape of the third window (window1) is a rectangle, and coordinate values of the four endpoints of the rectangle are respectively [x1,0], [x2,0], [x1,y1], and [x2,y1]. The fourth window (window2) is on a side of the touchscreen, a shape of the fourth window is a rectangle, and coordinate values of the four endpoints of the rectangle are respectively [0,y1], [x3,y1], [0,H], and [W,H].

In some embodiments, that the third window is displayed in the first area includes: A size of the third window is the same as a size of the first area, or a size of the third window is less than a size of the first area. The second display manner for the third window includes highlighting, for example, highlighting with a color, opaque display, or translucent display, and the second display manner is different from a manner of displaying the first application and the second application, so that a user can quickly notice the third window that has just appeared. In this embodiment, the third window may be translucently displayed.

In some embodiments, after the third window appears, masks are added in the interface of the first application and the interface of the second application on the first electronic device, or a window snapshot may be displayed in the interface of the first application and the interface of the second application. Gaussian blur rsBlur( ) may be performed on the window snapshot with a blur threshold ranging from 0 to 25. A larger value indicates a higher degree of blur.

In some embodiments, the third window or the fourth window may be a view control, for example, a common window, a floating window, a sidebar, or a slider.

In some embodiments, when the third operation on the first content and the fourth operation on the second content that are performed simultaneously are received, the third window and the fourth window may be displayed on the touchscreen simultaneously. In some embodiments, the first electronic device may display, after pre-determining a dragging direction, a corresponding window based on the dragging direction. For example, when the dragging direction indicates dragging towards the middle, the touchscreen displays only the third window.

In some embodiments, the first area or the fourth area overlaps a part of the fifth area and a part of the sixth area. In this embodiment, the first area overlaps a left part of the fifth area and a right part of the sixth area; and the fourth area overlaps a bottom part of the fifth area and a bottom part of the sixth area. The third window and the fourth window are displayed in an area including the overlapped part.

When the touchscreen displays the third window, the third window overlaps at least a part of the interface of the first application or at least a part of the interface of the second application, and a manner of displaying the third window is different from a manner of displaying the interface of the first application or the interface of the second application; or, sizes of the interface of the first application and the interface of the second application are adaptively reduced, so that the touchscreen can display the interface of the first application, the interface of the second application, and the third window simultaneously. In this case, the manner of displaying the third window is the same as (for example, both are non-transparent display) or different from the manner of displaying the interface of the first application or the interface of the second application. In some embodiments, a manner of displaying the fourth window is similar to that of the third window, and details are not described herein again.

As shown in FIG. 3b, in some embodiments, during dragging of the first content by a user, a screenshot of the interface of the first application is displayed near a point where a finger of the user contacts with the first content on the touchscreen. In a process in which the user uses a finger to move the first content, the screenshot of the interface of the first application moves as the finger moves. Similarly, during dragging of the second content by a user, a screenshot of the interface of the second application is displayed near a point where a finger of the user contacts with the second content on the touchscreen. In a process in which the user uses a finger to move the second content, the screenshot of the interface of the second application moves as the finger moves.

In some embodiments, that the third operation and the fourth operation are performed simultaneously includes at least one of the following cases: In a first case, a user performs the third operation and the fourth operation at a same moment by using at least two fingers; in a second case, the user first starts the third operation, and then starts the fourth operation during the third operation, so that the third operation and the fourth operation may be performed simultaneously at at least one moment; and in a third case, the user first starts the fourth operation, and then starts the third operation during the fourth operation, so that the third operation and the fourth operation may be performed simultaneously at at least one moment.

In some embodiments, a function corresponding to the third window includes a first function, and a function corresponding to the fourth window includes a second function. The first function may be comparing the first content with the second content, or combining the first content with the second content. The second function may be comparing the first content with the second content, or combining the first content with the second content. In this embodiment, the first function of the third window is to compare the first content with the second content, and the second function of the fourth window is to combine the first content with the second content.

Figure 3C:
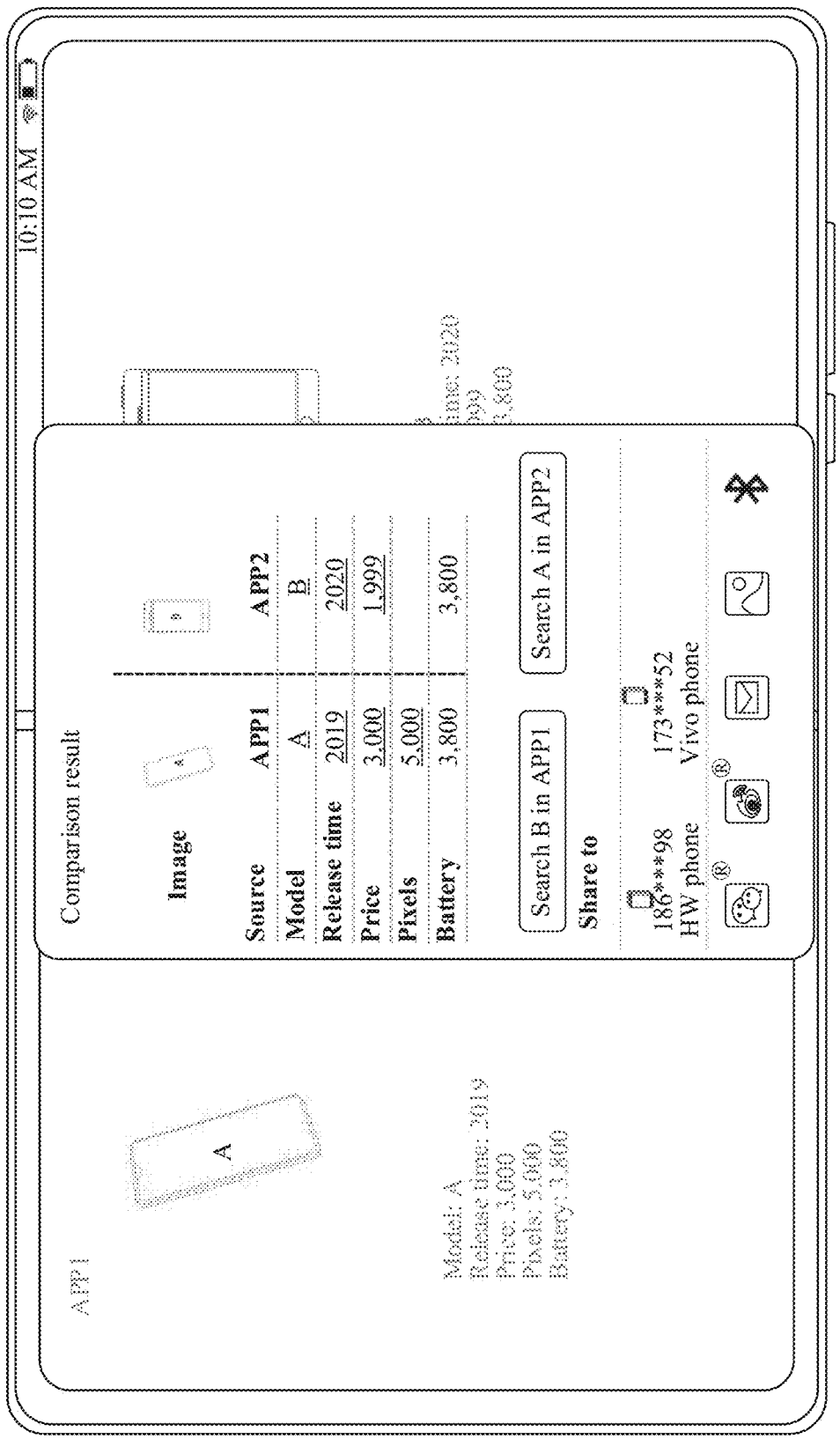

S303: As shown in FIG. 3c, after the first content and the second content are dragged and dropped to the third window on the touchscreen of the first electronic device, the electronic device displays the first window, where the first window includes third content displayed in a second area of the first window and a first option displayed in a third area of the first window, the first option includes an option for sharing, and the third content is content obtained after the first content and the second content are processed correspondingly through the first function.

Figure 3D:
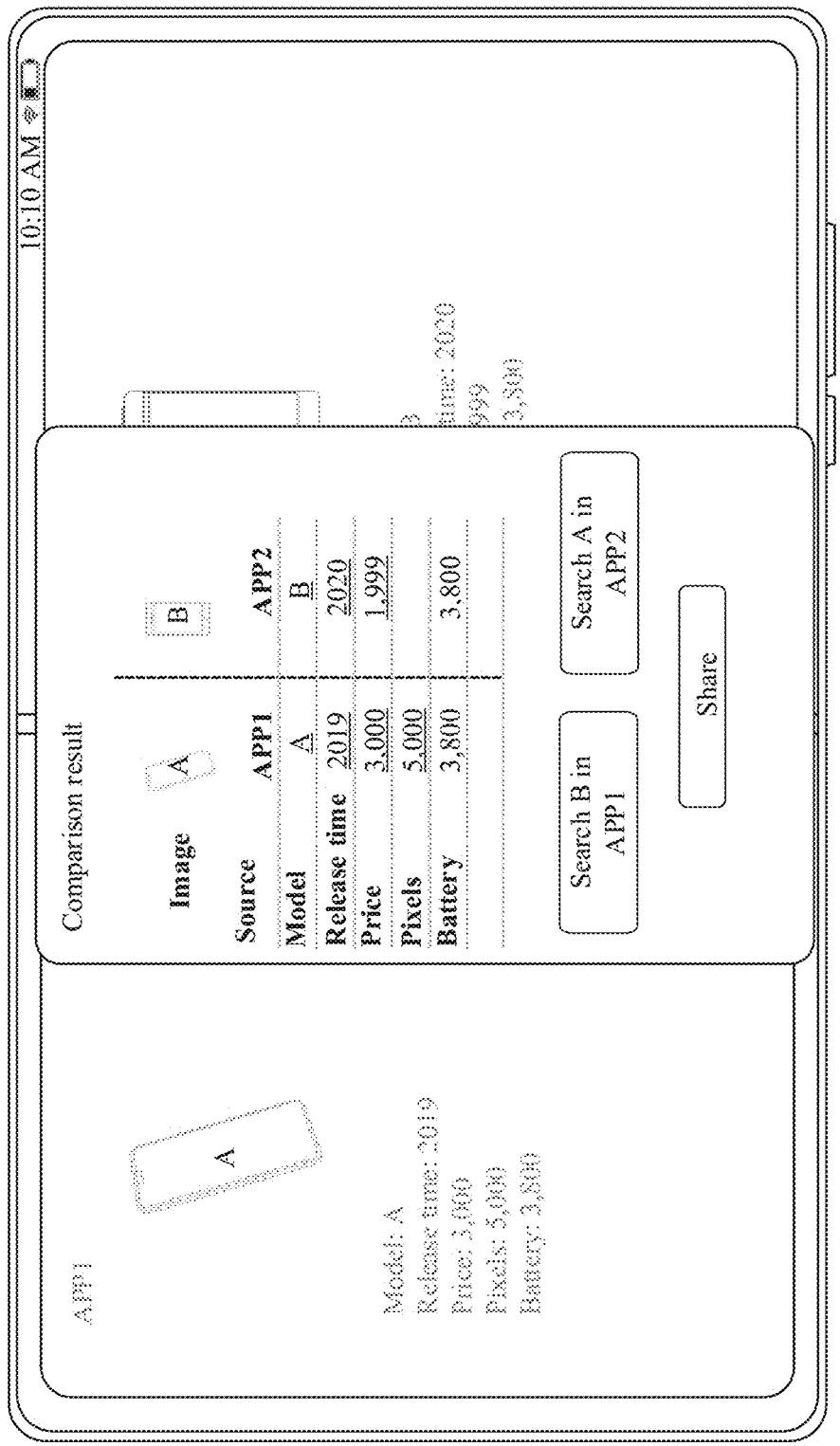

In this embodiment, the third content may be preview content, and the preview content is a result of comparing the first content with the second content. In some embodiments, the option for sharing may include identifiers of a plurality of electronic devices or applications configured to receive shared content. As shown in FIG. 3c, in some embodiments, the option for sharing may be a "share" button. As shown in FIG. 3d, after a user selects the "share" button, the touchscreen displays an identifier of an electronic device or application that can receive shared content, as shown in FIG. 3c.

In some embodiments, the identifier of the electronic device or the identifier of the application may be a name of the electronic device or the application, an icon of the electronic device or the application, and may further include information about a device to which the electronic device or the application belongs or other related information.

In some embodiments, a user may set, in the first electronic device, the applications to be included in the option for sharing, or an application with which the shared content can be shared may be set in a system on the electronic device based on a type of shared content. For example, the shared content is an image, an application A and an application C can process an image-type file, and the system sets the application A and the application C as the option for sharing; or the shared content is a text, the application A, the application B. and an application C can process text content, and the system sets the application A, the application B, and the application C as the option for sharing. In some embodiments, the system may select, based on user habits or a quantity of times of use, an application that may be listed as the option for sharing. The application in the option for sharing includes the first application, the second application, or another application.

In some embodiments, the electronic device includes an electronic device found via Bluetooth, NFC, application sharing (for example, Huawei Share), or in another transmission manner, an electronic device with a record of sharing, or an electronic device in a same local area network.

In some embodiments, the option in the first window includes a third option, and the third option includes at least one search option. In this embodiment, the search option includes "search the product B in the first application" and "search the product A in the second application". The "product A" and the "product B" are related information extracted by the first electronic device based on the first content and the second content, and the related information may further include other information.

In this embodiment, for the options "search in the first application" and "search in the second application", content of the options is determined by the first electronic device based on a function provided by the first application and the second application, and product information for "search the product B" and "search the product A" is determined by the first electronic device by analyzing the first content or the second content.

In some embodiments, the third content may be preview content of a comparison result, and a more detailed comparison result may be viewed by zooming in with a click. Alternatively, the third content may be a preview of a part of content of the comparison result, and more content of the comparison result may be viewed by moving on the slider.

In this embodiment, the comparison result includes a parameter type of a product and a parameter value of each product, and the parameter type includes "image", "source", "model", "release time", and the like. Parameter values of the same type are displayed in the same row, and different parameter values of the same type are highlighted. For example, since prices of two products are different, the prices of the two products are highlighted. The parameter type and the parameter value that are of the products and a comparison therebetween are determined by the first electronic device by analyzing the first content and the second content.

In some embodiments, the first window may be a common window, a floating window, a sidebar, or the like. In some embodiments, the first window is displayed in the first area or the fourth area on the touchscreen of the first electronic device.

S304: In some embodiments, the first electronic device receives a fifth operation of the user, where the fifth operation includes selecting a third application, and the first electronic device sends the shared content to the third application in response to the fifth operation; and after receiving the shared content, the third application jumps to an interface that runs to receive the shared content, where the third application is one application selected from the at least one application in the option for sharing, and the shared content may be the third content or the third content with an edit.

Figure 3E:
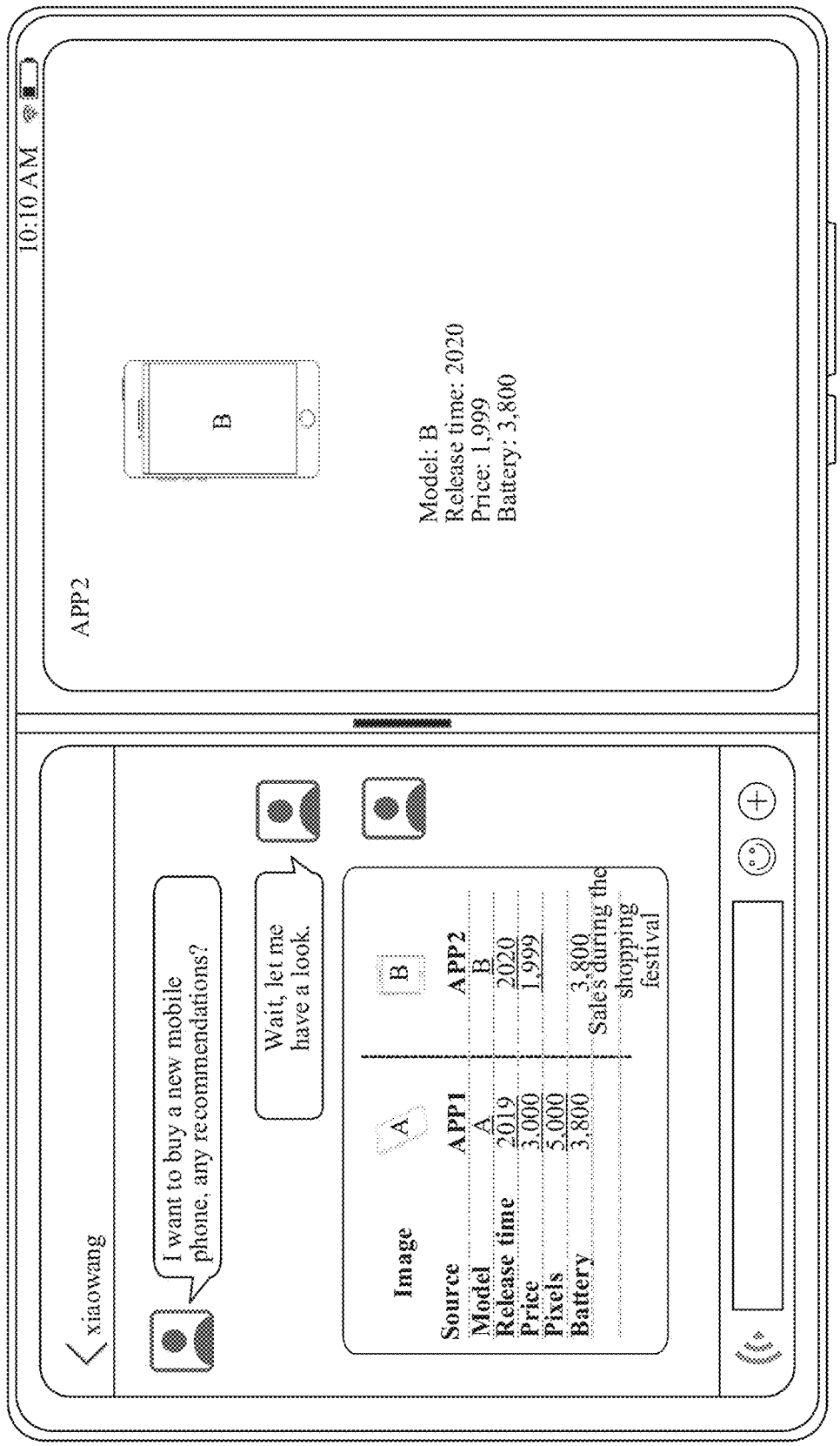

In this embodiment, as shown in FIG. 3e, the third application is WeChat, the first electronic device sends the shared content to the WeChat APP, and a dialog window in the WeChat APP receives the shared content. The application WeChat jumps to an interface of the dialog window, and displays, in the interface of the dialog window, a new message that is sent, where the new message includes the shared content.

In some embodiments, after receiving the shared content, the application WeChat jumps to an interface for selecting a contact, where a corresponding dialog window is set for the contact; and after the selection, jumps to the dialog window for the selected contact.

In some embodiments, the first electronic device sends the shared content to the WeChat APP, and a running program for posting moments in the WeChat APP receives the shared content. The application WeChat jumps to an interface for posting moments, and displays the shared content in the interface for posting moments.

Figure 3F:
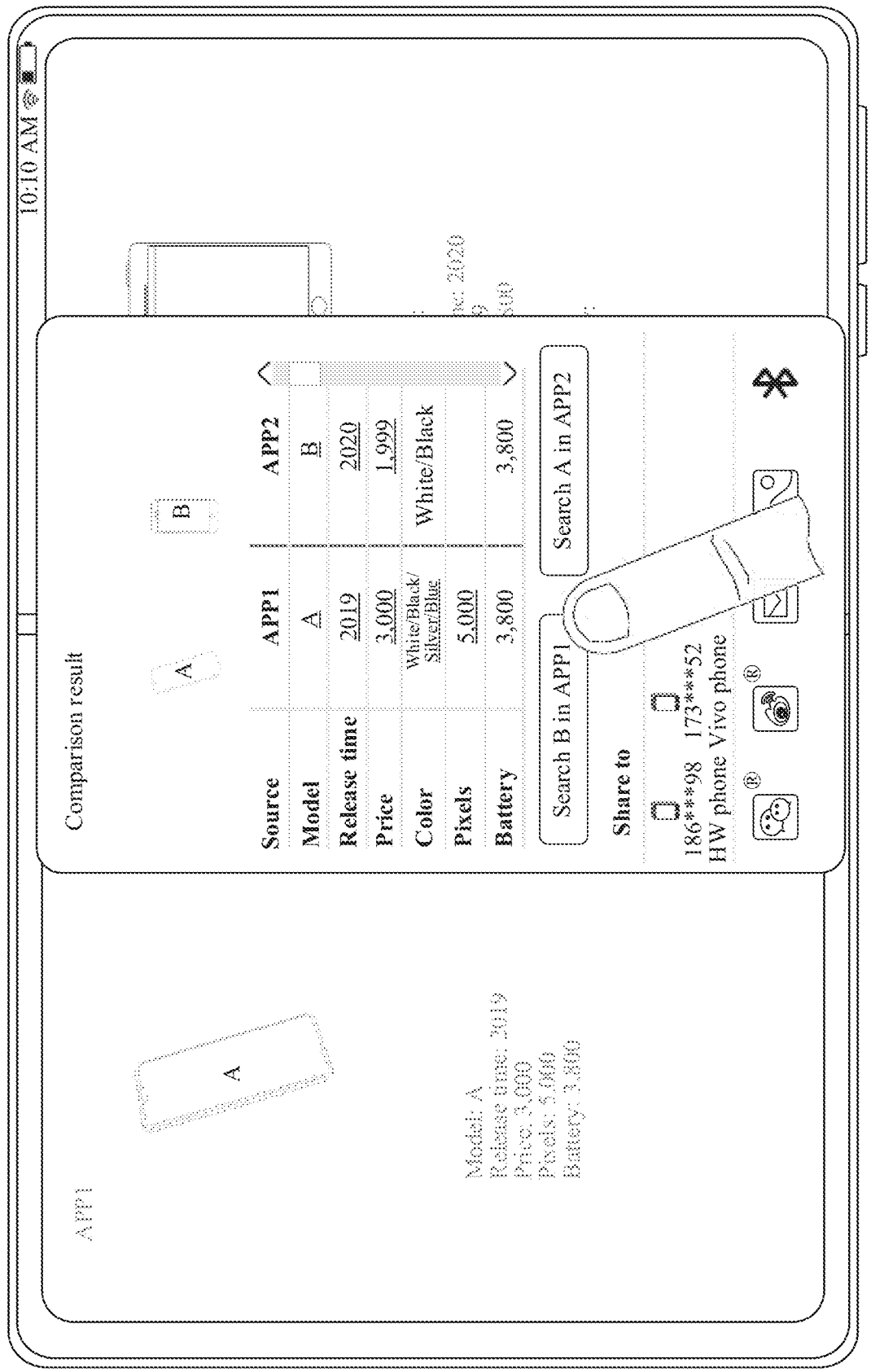
Figure 3G:
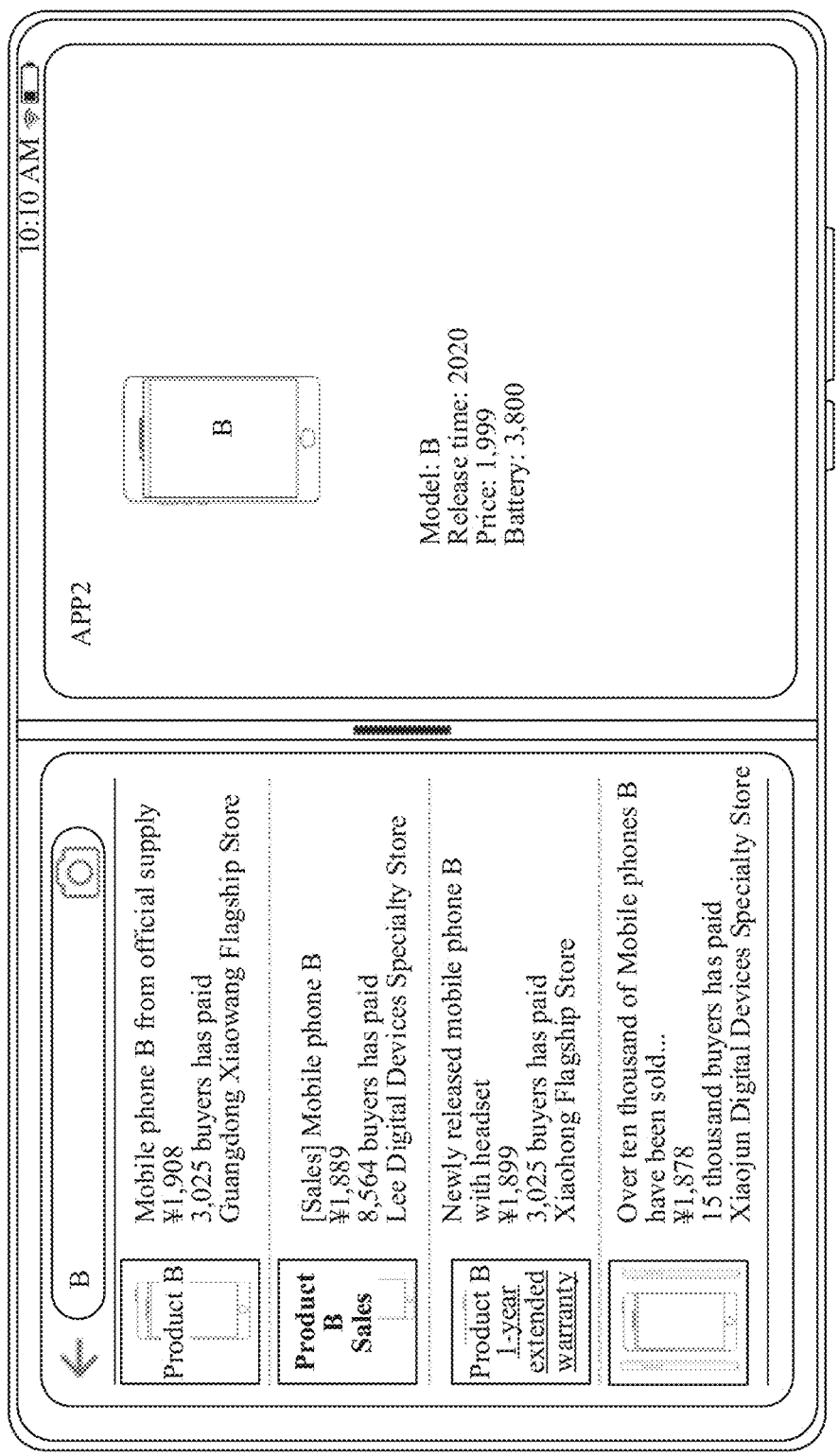
Figure 3H:
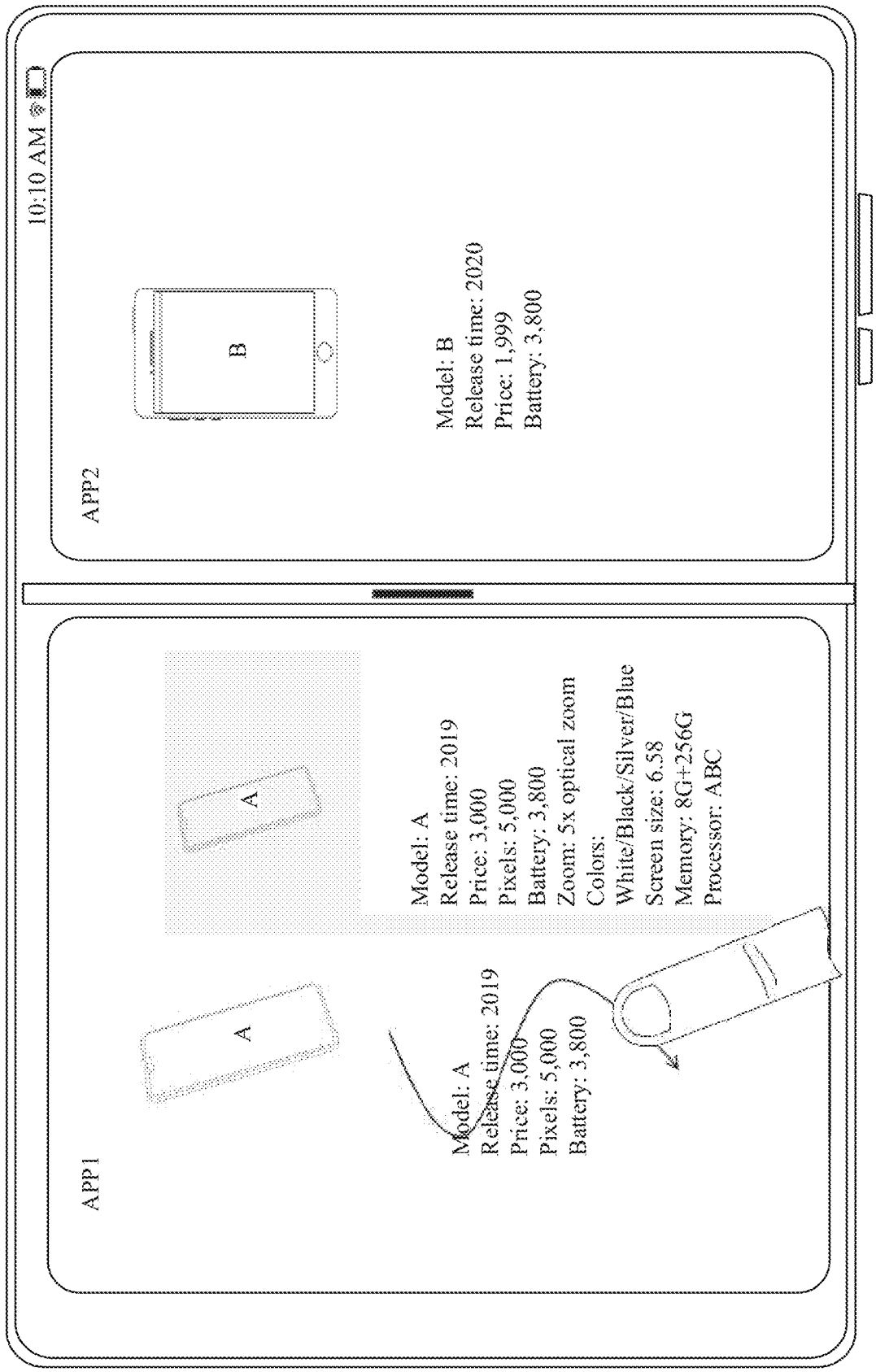
Figure 3I:
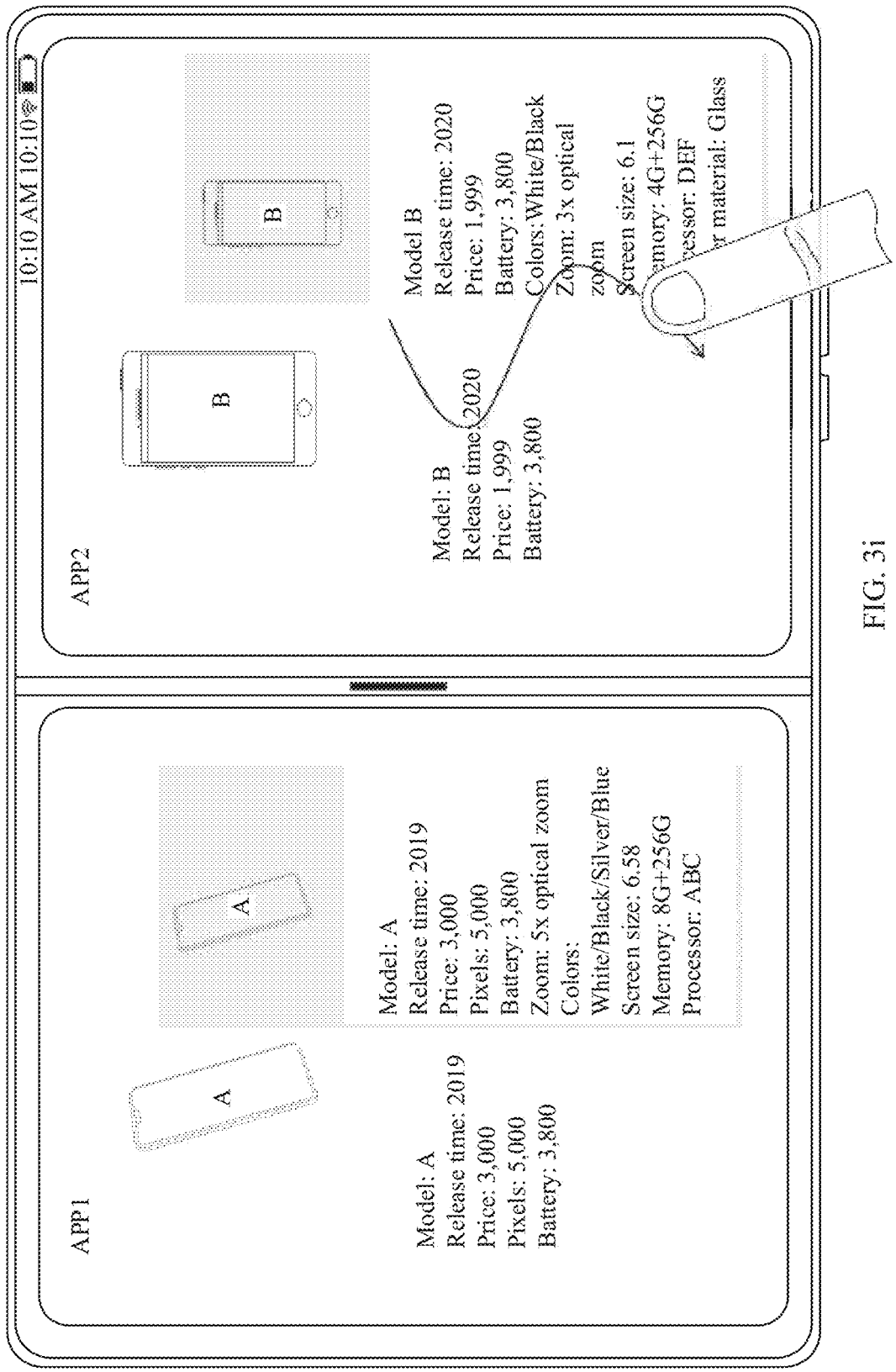
Figure 3J:
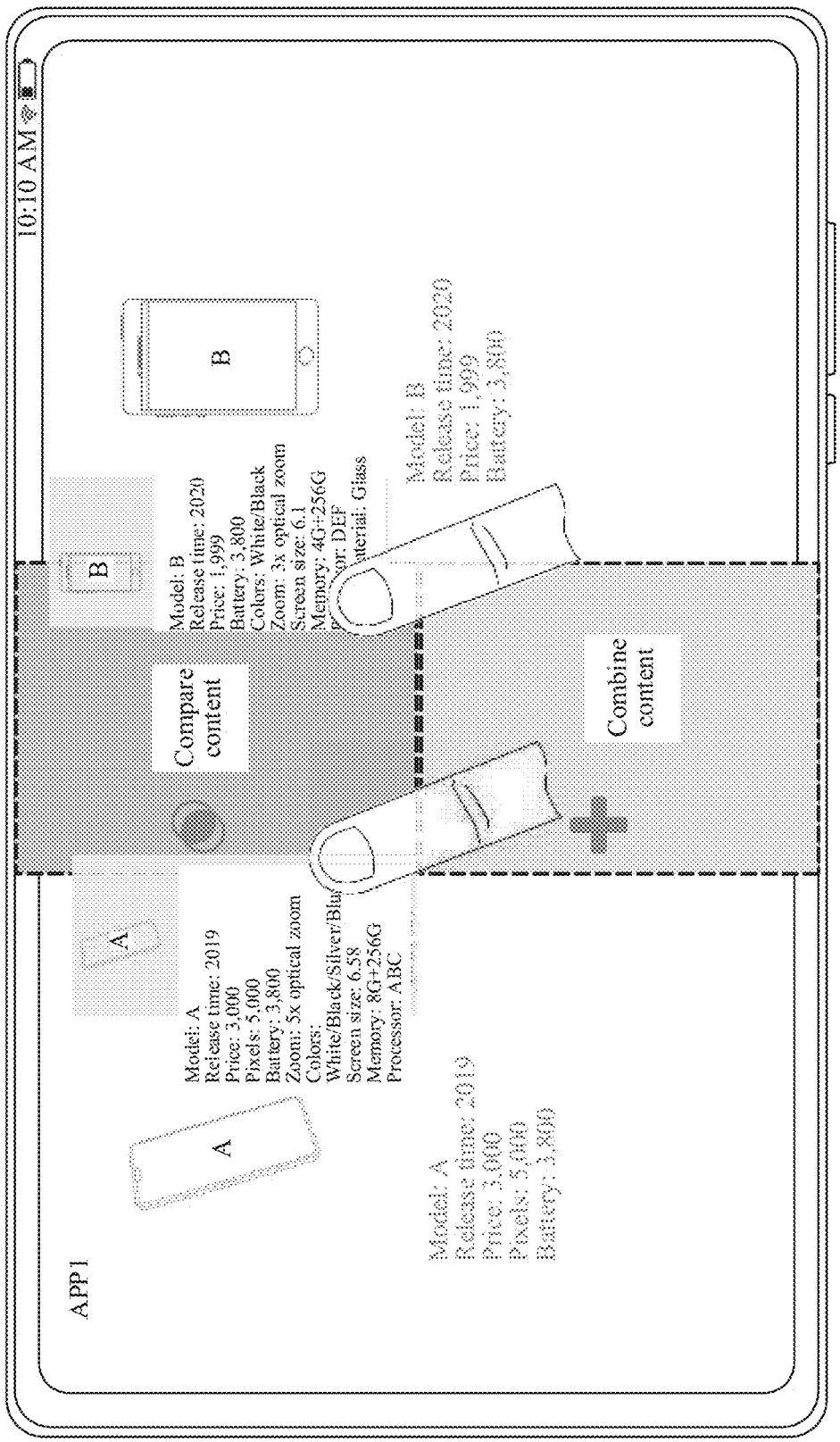
Figure 3K:
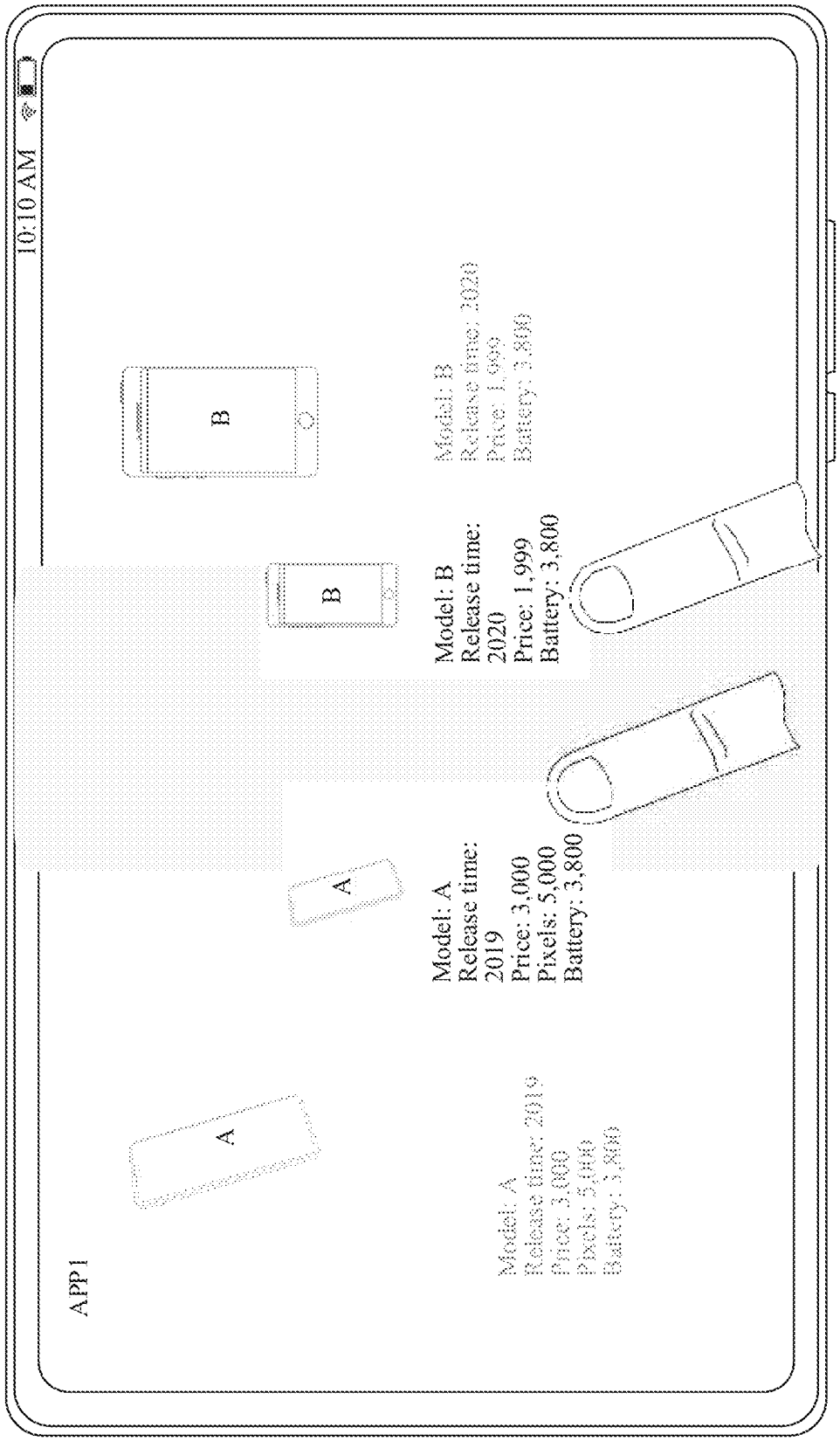
Figure 31:
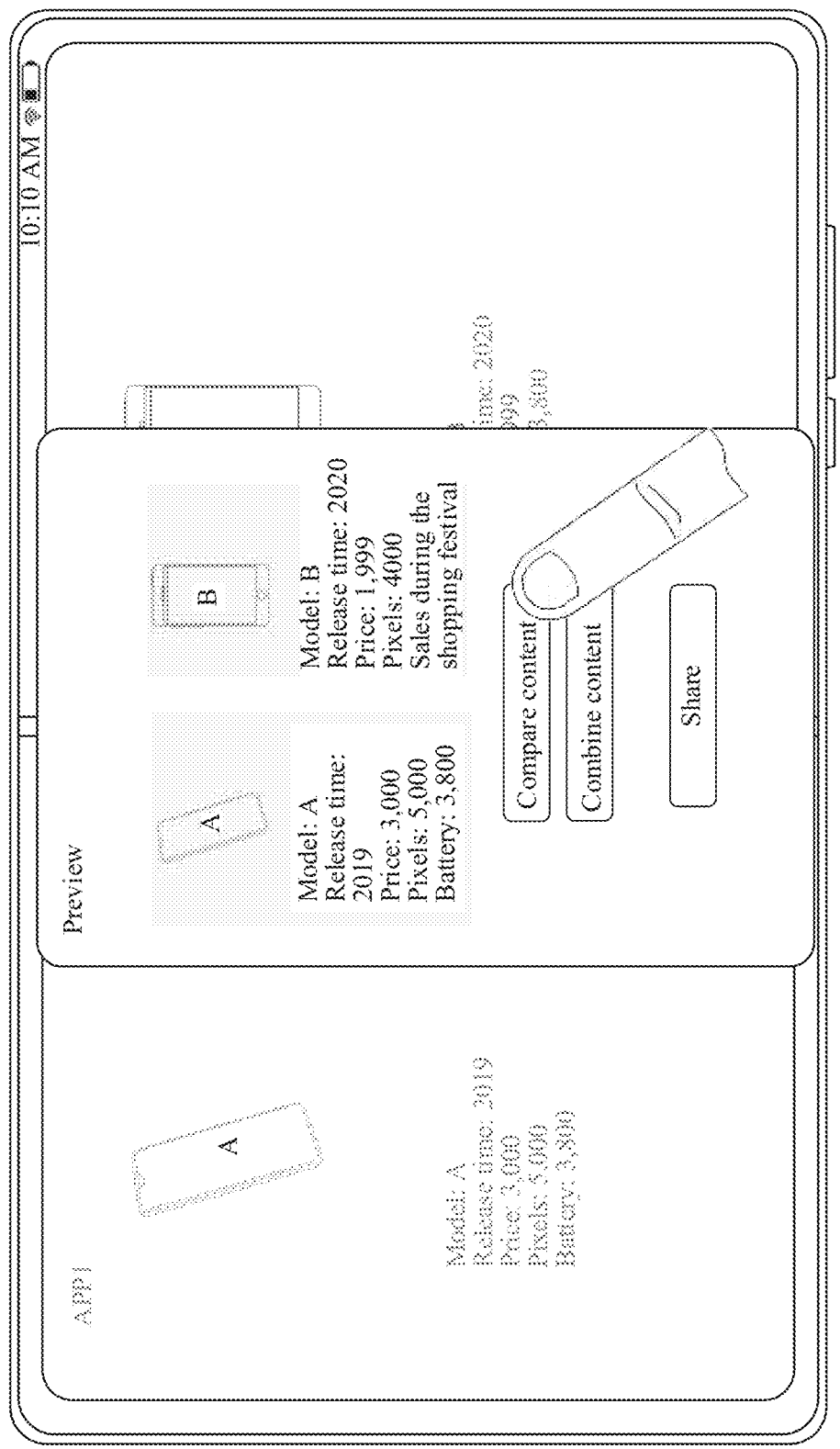
Figure 3M:
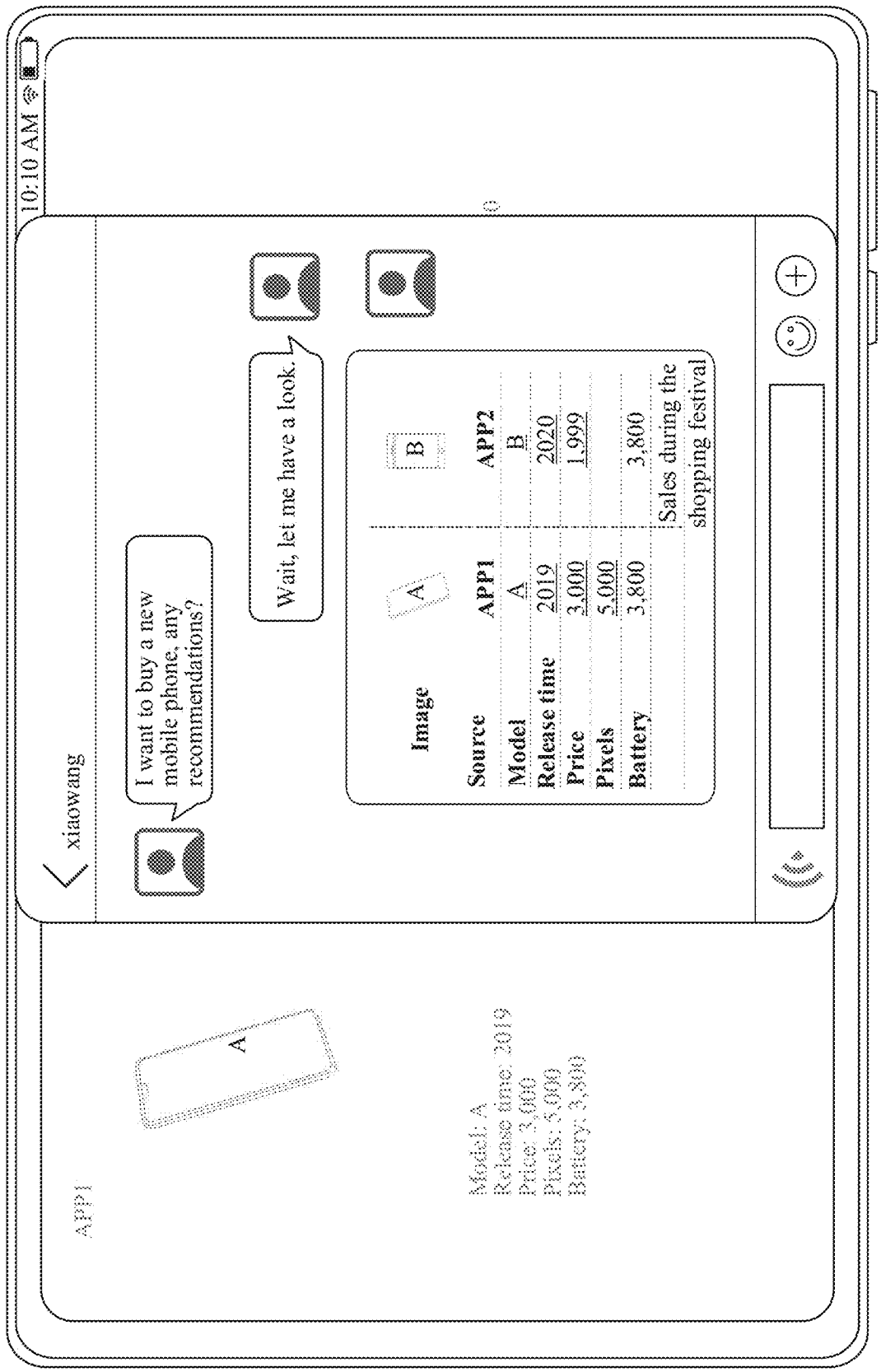

In some embodiments, an interface of the third application covers the previous interface of the first application and is displayed in the fourth area, as shown in FIG. 3e, or covers the previous interface of the second application and is displayed in the fifth area, or an interface of the application WeChat is displayed in a sixth window that has just been displayed, as shown in FIG. 3m, where the sixth window and the fourth area cover a part of the interface of the first application and/or cover a part of the interface of the second application.

In some embodiments, after receiving the shared content, the third application pops up a new window on the touchscreen. In some embodiments, options such as "show a new status", "search the product B", or "send a new Weibo post" are displayed in the new window. After an operation of a user of selecting an option is received, a function corresponding to the option is performed. For example, the shared content is sent out as content of a new Weibo post in response to the user selecting the option "send a new Weibo post".

In some embodiments, most of steps are similar to the foregoing corresponding steps, but the method further includes step S305.

S305: As shown in FIG. 3f, in some embodiments, the first electronic device receives a sixth operation of the user, where the sixth operation may be selecting an option "search the product B in the first application" in the first window. The system sends the search content "the product B" to the first application, and the first application searches "the product B" and jumps to an interface of a search result, for which, refer to FIG. 3g.

The solution in this embodiment enables a user to search related information about the product B in the first application, so that the user can compare the product B in the first application and the second application for making a better choice to buy.

In some embodiments, most of steps are similar to the foregoing corresponding steps, but steps S301 and S302 may be replaced with steps S306 and S307.

S306: As shown in FIG. 3h and FIG. 3i, in some embodiments, first content in the interface of the first application is obtained in response to a first operation on the interface of the first application; and second content in the interface of the second application is obtained in response to a second operation on the interface of the second application.

In this embodiment, the first operation is performed on the first application, and the first operation is used to trigger the first application to take a long screenshot. The second operation is performed on the second application, and the second operation is used to trigger the second application to take a long screenshot. The first operation and the second operation may be a pre-specified gesture on the touchscreen, for example, a gesture of drawing an S or moving a plurality of fingers on the touchscreen. After obtaining a long screenshot, the application may display a thumbnail of the long screenshot on the touchscreen.

S307: In some embodiments, as shown in FIG. 3j, a third operation on the first content and a fourth operation on the second content that are performed simultaneously are received, and during dragging of the first content and the second content, the first electronic device displays a third window in the first area in a second display manner, and displays a fourth window in the fourth area in a third display manner, where the third operation includes dragging, and the fourth operation includes dragging.

Figure 13B:
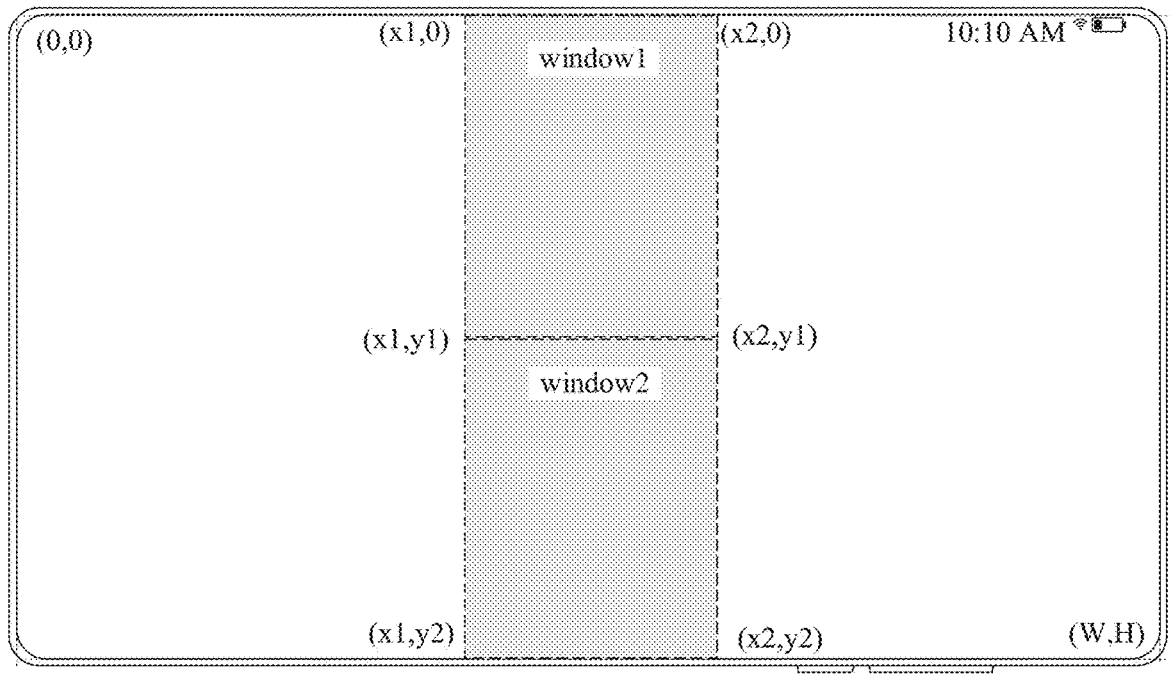

In some embodiments, as shown in FIG. 13b, both the third window and the fourth window are in a middle area of the electronic device that may be a middle-left-side area on the touchscreen, an area right in the middle of the touchscreen, or a right-side area on the touchscreen, and is not limited to the 1/2 area on the touchscreen. Shapes of the third window and the fourth window may be rectangular, square, or the like. In this embodiment, the third window is a rectangle, and coordinate values of the four endpoints are respectively [x1,0], [x2,0], [x1,y1], and [x2,y1]. The fourth window is a rectangle, and coordinate values of the four endpoints of the rectangle are respectively [x1,y1], [x2,y1], [x1,y2], and [x2,y2]. In some embodiments, both the third window and the fourth window are on a side of the electronic device, and the side area is an area adjacent to a side of the touchscreen.

In some embodiments, the first electronic device displays an identifier of the first function in the third window, and displays an identifier of the second function in the fourth window. In this embodiment, an identifier of "content comparison" is displayed in the third window, and an identifier of "content combination" is displayed in the fourth window.

In some embodiments, most of steps are similar to the foregoing corresponding steps, but steps S302 and S303 may be replaced with steps S308 to S310.

In step S308, as shown in FIG. 3k, a third operation on the first content and a fourth operation on the second content that are performed simultaneously are received. The first electronic device displays a second window in the first area in a first display manner, where the first display manner is different from a manner of displaying the interface of the first application or the interface of the second application.

When the touchscreen displays the second window, the second window overlaps at least a part of the interface of the first application or at least a part of the interface of the second application, and a manner of displaying the second window is different from a manner of displaying the interface of the first application or the interface of the second application; or sizes of the interface of the first application and the interface of the second application are adaptively reduced, so that the touchscreen can display the interface of the first application, the interface of the second application, and the second window simultaneously. In this case, the manner of displaying the second window is the same as (for example, both are non-transparent display) or different from the manner of displaying the interface of the first application or the interface of the second application.

In some embodiments, that the second window is displayed in the first area includes: A size of the second window is the same as a size of the first area, or a size of the second window is less than a size of the first area. The second display manner for the second window includes highlighting, for example, highlighting with a color, opaque display, or translucent display, and the second display manner is different from the manner of displaying the first application and the second application, so that a user can quickly notice the second window that has just appeared. In this embodiment, the second window may be translucently displayed.

Figure 13C:
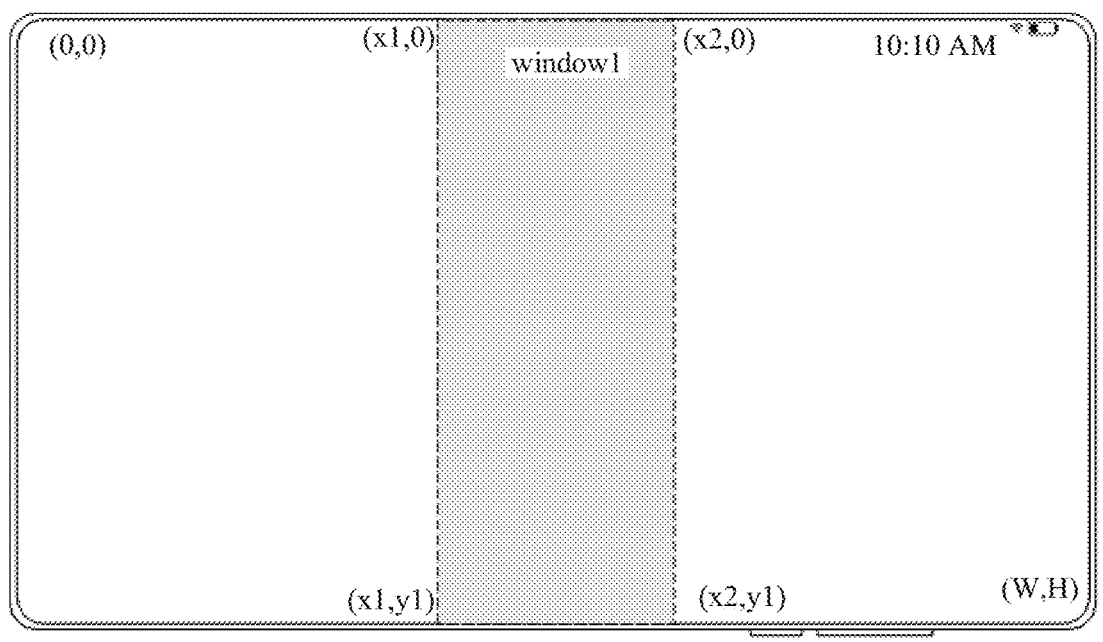

In some embodiments, as shown in FIG. 13c, the second window is in the middle of the touchscreen, a shape of the second window may be set to a rectangle, and coordinate values of the four endpoints of the rectangle may be respectively set to [x1,0], [x2,0], [x1,y1], and [x2,y1].

S309: As shown in FIG. 3l, the electronic device displays a first window in response to continuous dragging through the third operation and the fourth operation and drag-and-drop to the first area, where the first window includes preview content of the first content and preview content of the second content that are displayed in a second area of the first window, and a first option and a second option displayed in a third area of the first window.

The preview content of the first content and the preview content of the second content are displayed in the second area of the first window. The preview content of the first content includes at least a part of the first content, and the preview content of the second content includes at least a part of the second content. The preview content is used to enable a user to preview content selected in the first application and the second application. The user may click to zoom in to view a more detailed combination result, or may view a more detailed comparison result by moving on a slider.

In some embodiments, the preview content of the first content or the second content is editable, and a user may edit the content. For example, the user may delete, move, copy, or change a format of, delete a text from, or add a text to text content, and zoom in, zoom out, crop, stitch, or move image content.

The first option includes at least one option for sharing, and specific implementation of the option for sharing is the same as that in the foregoing embodiment. Details are not described again. A function corresponding to the second option includes combining or comparing content at least a part of the first content with at least a part of the second content to obtain the third content. In this embodiment, the second option includes options "content comparison" and "content combination".

S310: The first electronic device displays the third content in the second area of the first window in response to a selected operation in the second option, where the third content is content obtained after the first content and the second content are correspondingly processed through the first function.

In this embodiment, in response to an operation that the option "content comparison" is selected, the first window includes the third content displayed in the second area of the first window, where the third content is a comparison result obtained after the first content is compared with the second content.

In some embodiments, most of steps are similar to the foregoing corresponding steps, but steps S309 and S310 may be replaced with step S311.

S311: The electronic device displays a first window in response to continuous dragging through the third operation and the fourth operation and drag-and-drop to the first area, where the first window includes the third content displayed in a second area of the first window, and a first option displayed in a third area of the first window, where the first option includes at least one option for sharing, and the third content is content obtained after the first content and the second content are correspondingly processed through the first function in the first window. In some embodiments, the first electronic device determines the first function based on types of the first content and the second content; and if the types of the first content and the second content are the same, determines that the first function in the first area is to compare the first content with the second content; or if the types of the first content and the second content are different, determines that the first function in the first area is to combine the first content with the second content.

In some of the foregoing embodiments, a user may obtain related information about the product A in the first application, obtain related information about the product B in the second application, and compare the information about the product A and the product B in different applications, thereby simplifying a procedure of user operations, and solving the problem in the prior art that an operation process of comparing different products in different applications is complicated. Based on the understanding of a comparison result, the user may search the second application for a product in the first application, or search the first application for a product in the second application, to obtain specific information about a same product in different applications, so that the user may select an application suitable for shopping.

In some embodiments, the first application and the second application are different applications, and the product is a same product. A user may obtain specific information about the same product in different applications, so that the user may select an application suitable for shopping.

In some embodiments, the first application and the second application may be a same application. For example, both are Taobao programs. By using a function for cloning an application, two Taobao programs can be opened in different windows on a same device. In this embodiment, the user may compare related information about different products in a same application.

The function for cloning an application is to run a plurality of same applications simultaneously on a same electronic device. In some embodiments, the function for cloning an application may be used by enabling a built-in function "App Twin" of the electronic device. The function for cloning an application may be implemented by using APIs and programming frameworks corresponding to a plurality of applications provided by the application framework layer. In some embodiments, a plurality of applications of a cloned application may be further installed via a third-party application.

In some embodiments, the first electronic device is a terminal device, for example, a mobile phone or a Pad, content in the first application may be news or information displayed in an information-based application. The second application may be a gallery application that displays an image. In this scenario, when browsing the first application and the second application, a user needs to combine content from the two applications for sharing.

Figure 4A:
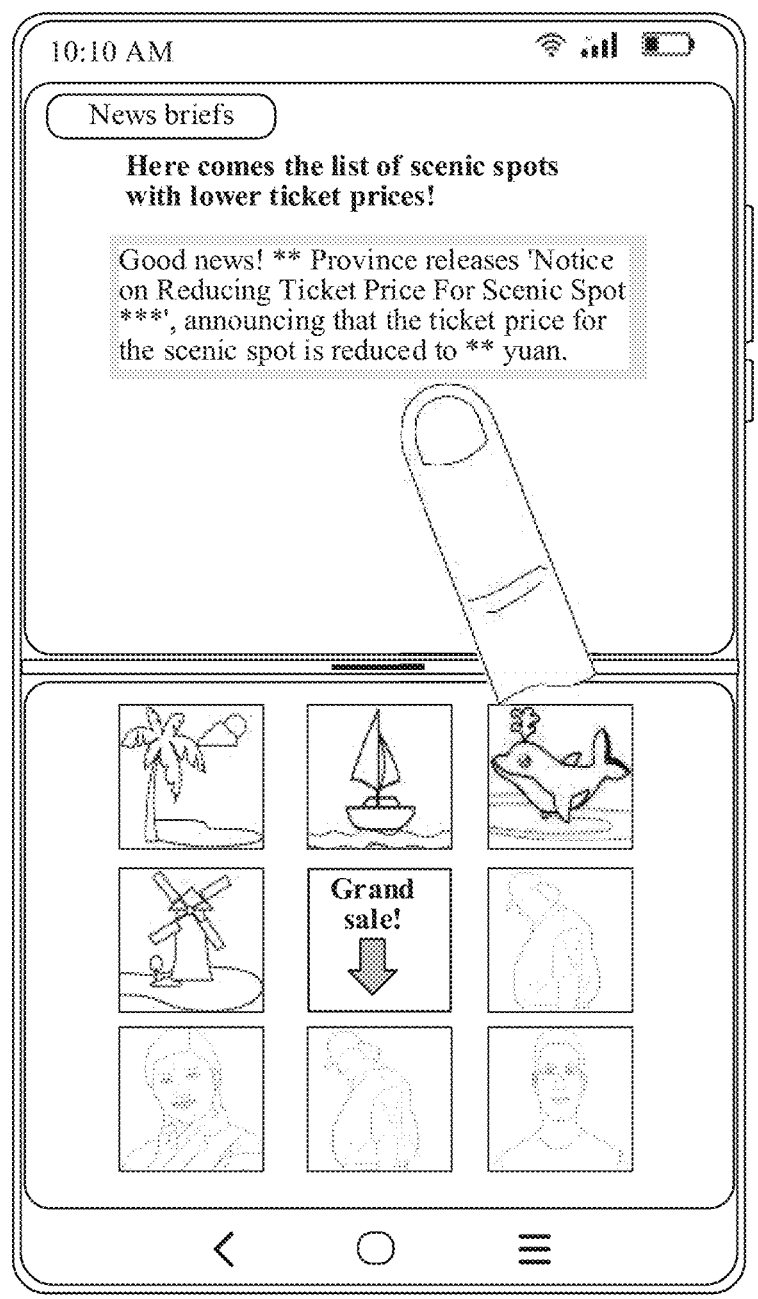
Figure 4B:
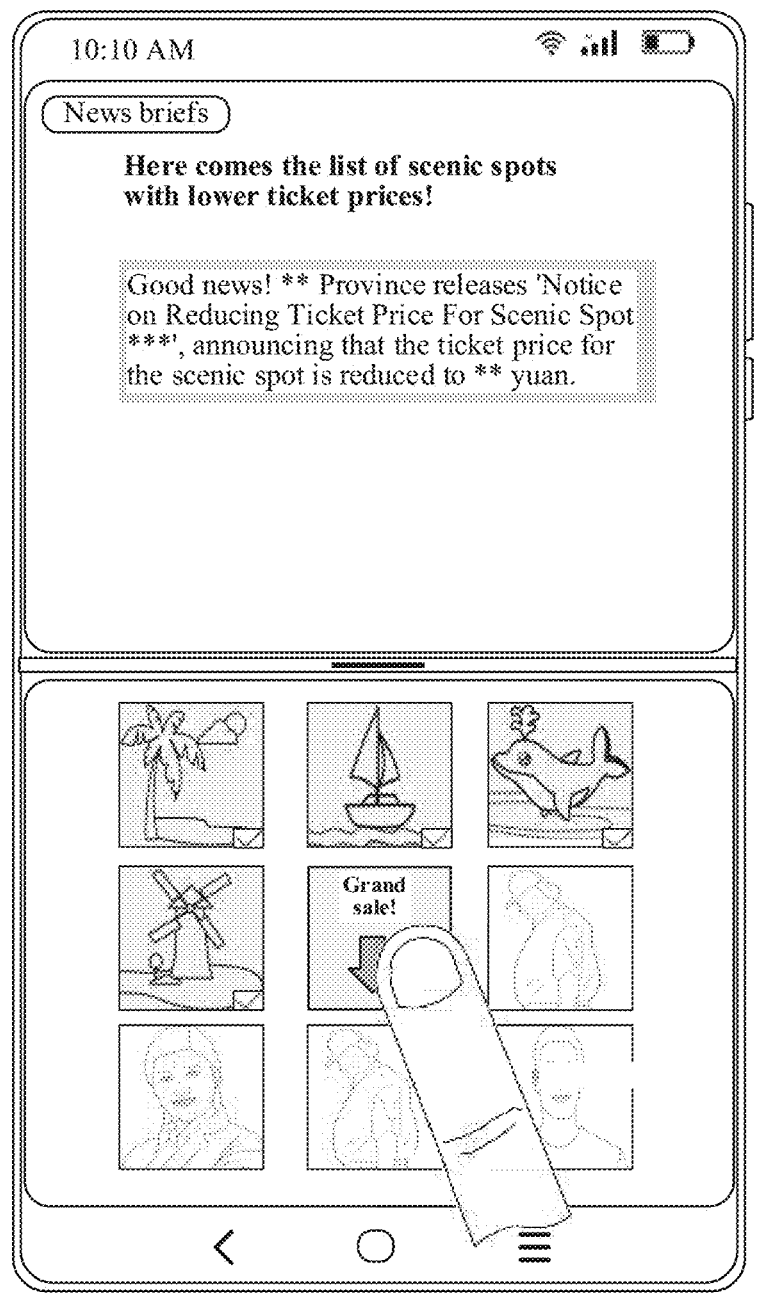

S401: In some embodiments, as shown in FIG. 4a and FIG. 4b, first content in the interface of the first application is obtained in response to a first operation on the interface of the first application; and second content in the interface of the second application is obtained in response to a second operation on the interface of the second application. In this embodiment, the first content is a text in the first application that is to be combined, and the second content is an image in the second application that is to be combined.

In some embodiments, an operation of selecting text content may be that a user may move a position of a cursor by touching a screen, so that the cursor moves from a position where content starts to a position where content ends, and a part of content is selected; the user may double-click on a touchscreen to select all texts displayed in a current interface; all the texts displayed in the current interface is obtained from a screenshot by taking the screenshot of a current application; or the user may select one or more files in the current interface by clicking on the touchscreen, to select all content in the file. In some embodiments, all or a part of the content may be selected with a custom gesture. An operation of selecting an image may be that a user selects one or more images in a current interface by clicking on a touchscreen; the image displayed in the current interface is obtained from a screenshot by taking the screenshot of a current application; or one or more images are selected with a custom gesture.

Figure 4C:
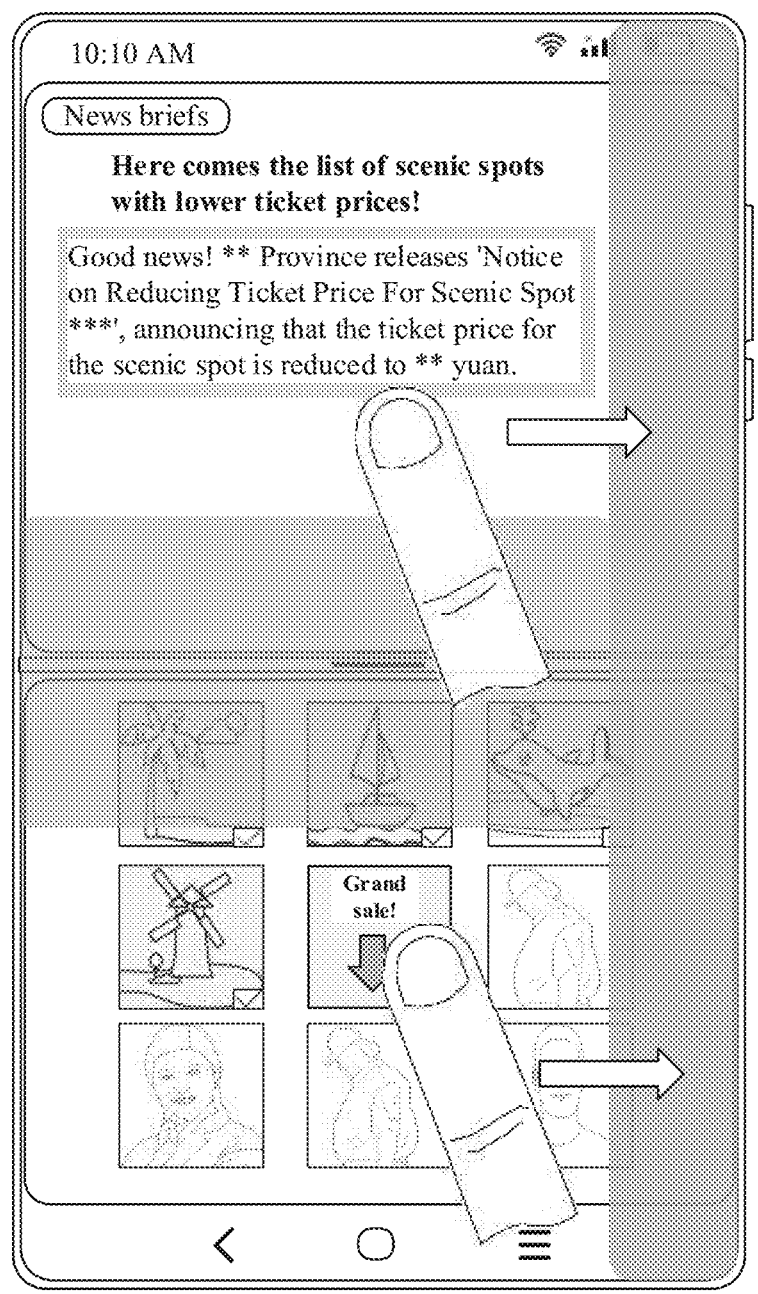

S402: As shown in FIG. 4c, in some embodiments, the third operation on the first content and the fourth operation on the second content that are performed simultaneously are received, and during dragging of the first content and the second content, the first electronic device displays a third window in the first area in a second display manner, and displays a fourth window in the fourth area in a third display manner, where the third operation includes dragging, and the fourth operation includes dragging. A manner of displaying the third window and the fourth window may be similar to that in the foregoing embodiments, and details are not described herein again.

Figure 14A:
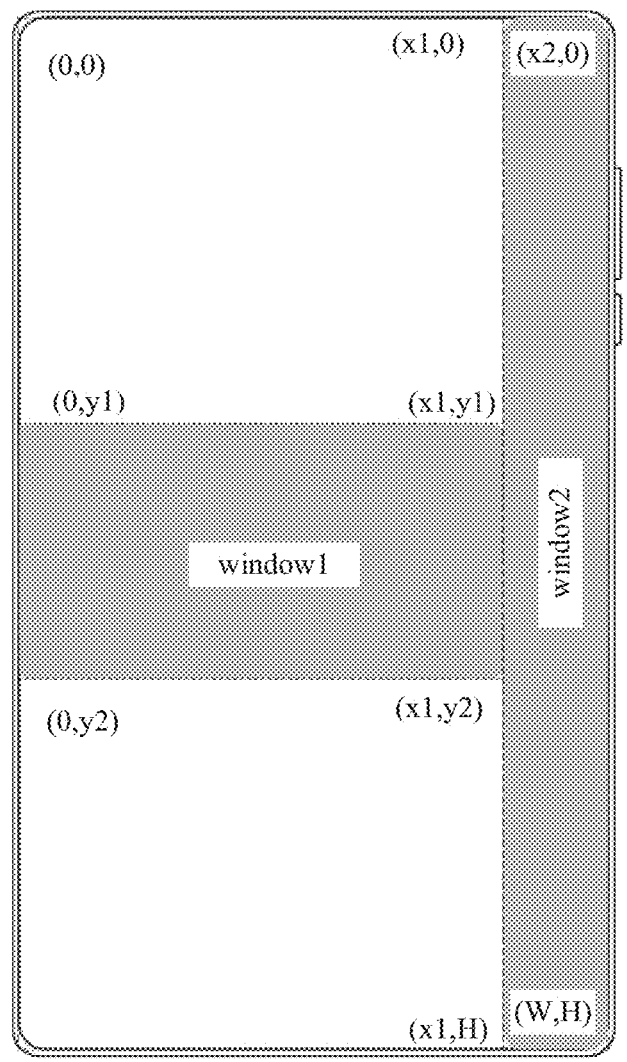
FIG. 14a and FIG. 14b are schematic diagrams of an area of an electronic device according to an embodiment of this application.

In some embodiments, as shown in FIG. 14a, the first electronic device is in a portrait mode, the third window is in the middle of a touchscreen, a shape of the third window is a rectangle, and vertex coordinates of the four points of an area corresponding to the third window are [0,y1], [x1,y1], [0,y2], and [x1,y2]; and the fourth window is on a side of the touchscreen, a shape of the fourth window is a rectangle, and coordinate values of the four endpoints of the rectangle are respectively [x1,0], [x2,0], [x1,H], and [W,H].

Figure 4D:
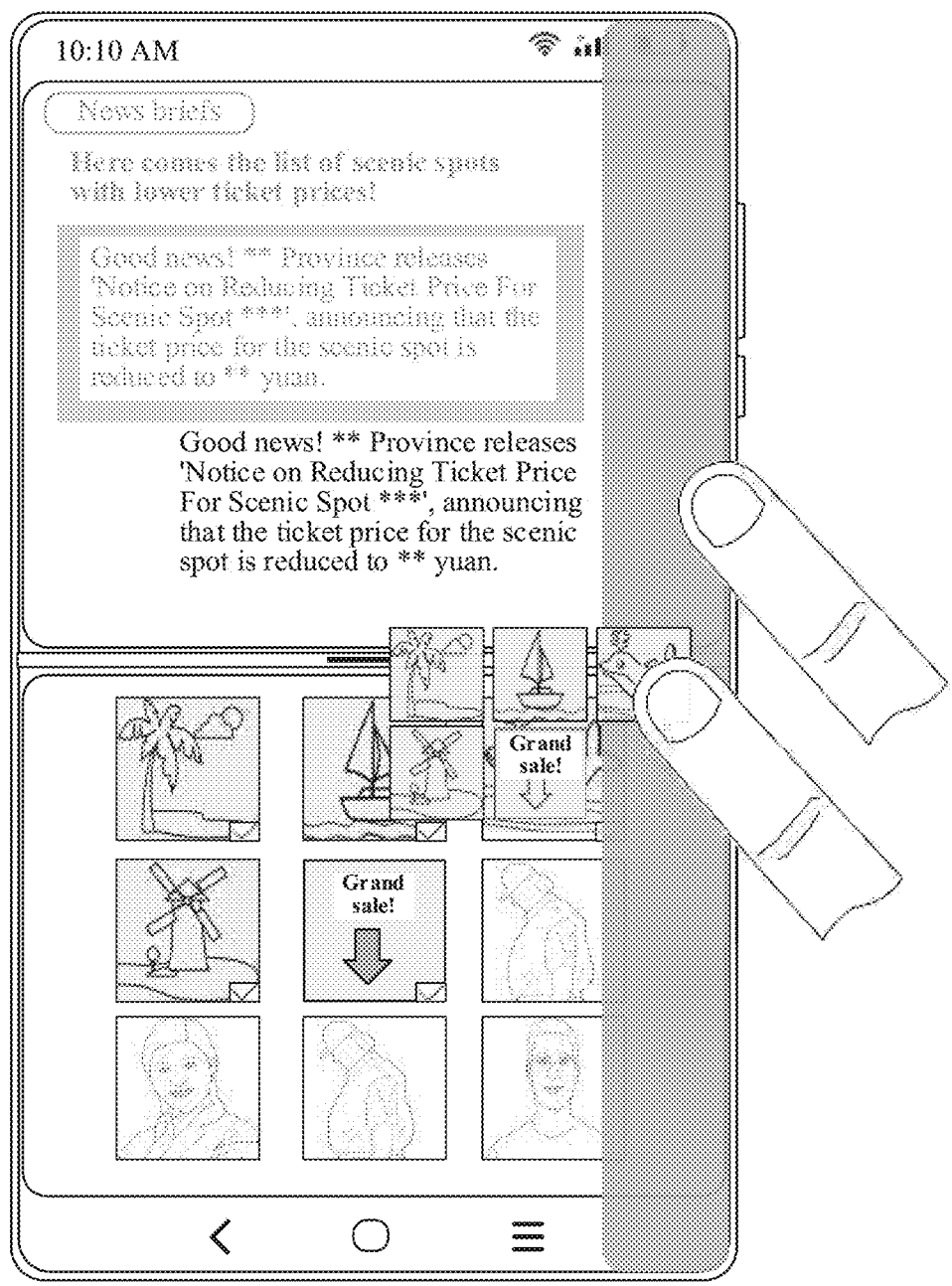

As shown in FIG. 4d, in some embodiments, during dragging of the first content by a user, a floating layer of the first content is displayed near a point where a finger of the user contacts with the first content on the touchscreen. In a process in which the user moves a finger to move the first content, the floating layer of the first content moves as the finger moves. The floating layer of the first content may be specifically a selected text displayed with a shadow effect.

During dragging of the second content by a user, a floating layer of the second content is displayed near a point where a finger of the user contacts with the second content on the touchscreen. In a process in which the user moves a finger to move the second content, the floating layer of the second content moves as the finger moves. The floating layer of the second content may be specifically a selected image displayed with a shadow effect. A display manner for and a size of the content in the floating layer may be set based on selection of the user.

S403: In some embodiments, as shown in FIG. 4d, after the first content and the second content are dragged and dropped to the third window on the touchscreen of the first electronic device, the electronic device displays the first window, and the first window includes third content displayed in a second area of the first window and a first option displayed in a third area of the first window, where the first option includes an option for sharing, and the third content includes content obtained after a combination of the text selected in the first application and the image selected in the second application. Specific descriptions of the option for sharing are similar to those in the foregoing embodiments, and details are not described herein again.

In some embodiments, the third content may be preview content, and a more detailed combination result may be viewed by clicking to zoom in. The preview content is a preview of a part of content of the combination result, and more details of the combination result may be viewed by moving on a slider.

In some embodiments, the first window includes a fifth option, and the fifth option is a second editing option. The second editing option is used to edit the third content, and the second editing option includes editing a layout, adding a border, adding an emoticon, and the like.

S404: As shown in FIG. 4f and FIG. 4g, in some embodiments, the first electronic device receives a fifth operation of a user, where the fifth operation includes selecting the second editing option, and the first electronic device displays an editing function menu in response to the fifth operation. In some embodiments, the editing function menu includes editing a layout, adding a border, adding an emoticon, and the like, so that the user further edits and modifies the third content by using an editing function.

The editing function menu is an editing template corresponding to the first content and the second content. In some embodiments, the correspondence means that the editing template corresponds to content presented in a text and an image, a quantity of text boxes, and a quantity of images. After analyzing related content by using an internal algorithm module, the electronic device may display a template suitable for a current scenario. In this embodiment, layout in the editing function menu includes a layout example for four images and one text box.

Figure 4E:
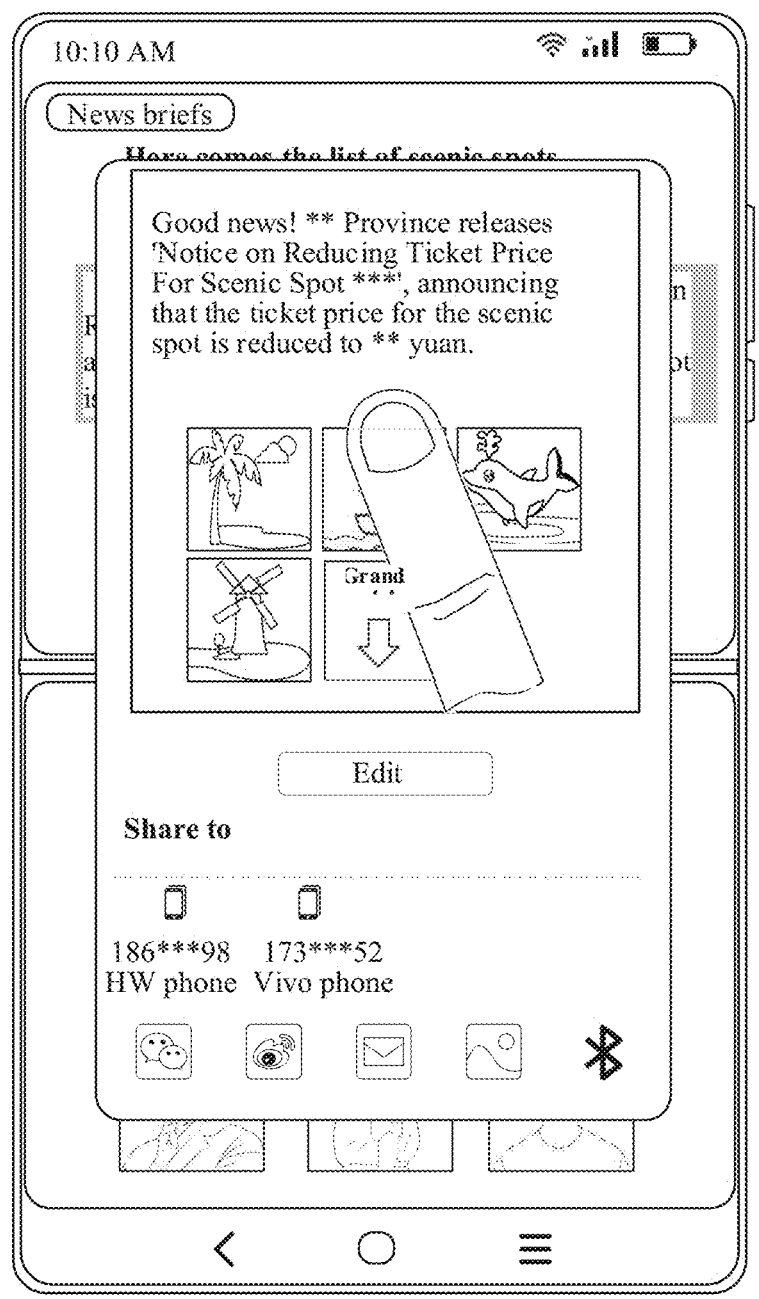
Figure 4F:
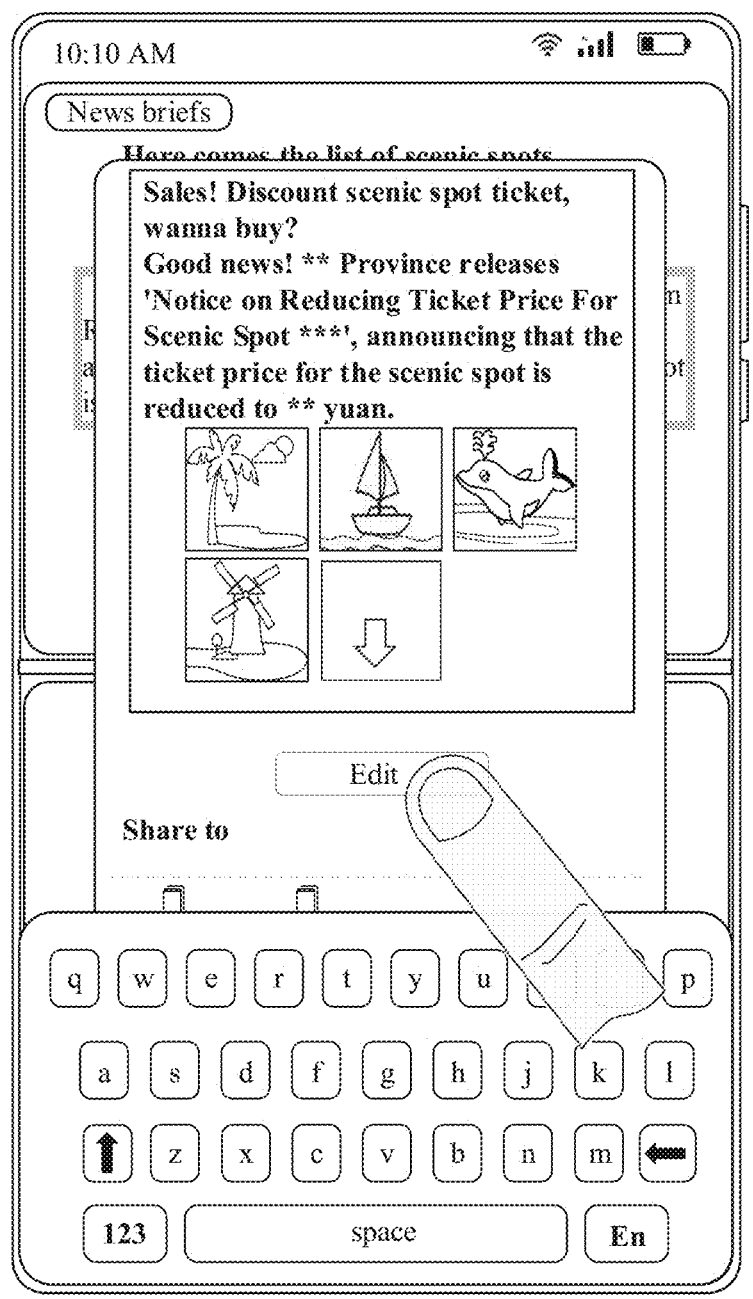
Figure 4G:
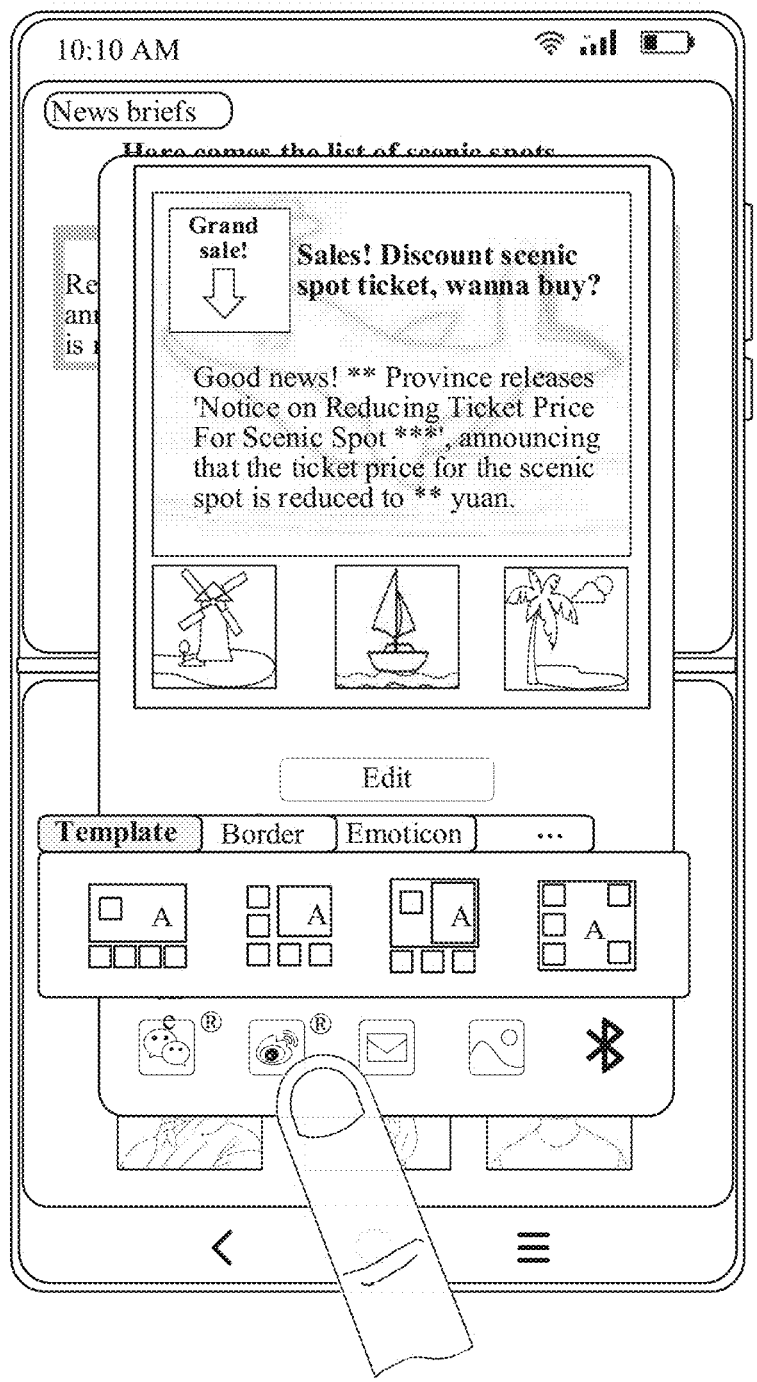

In some embodiments, the third content is editable, and editing of the third content may be triggered with a preset gesture, for example, a click or a long press, on the third content in the first window, as shown in FIG. 4e. In some embodiments, a user may delete, move, copy, or change a format of, delete a text from, or add a text to text content, and zoom in, zoom out, crop, stitch, or move image content. In this embodiment, text content "Sale! Discount scenic spot ticket, wanna buy?" is added.

In some embodiments, as shown in FIG. 6f(1) and FIG. 6f(2), after selecting the second editing option, a user selects a template function in the editing function menu, and applies a template to the combined third content, so that the third content has a new layout according to the added template.

In some embodiments, most of steps are similar to those in the foregoing embodiment, but the method further includes S405.

Figure 4H:
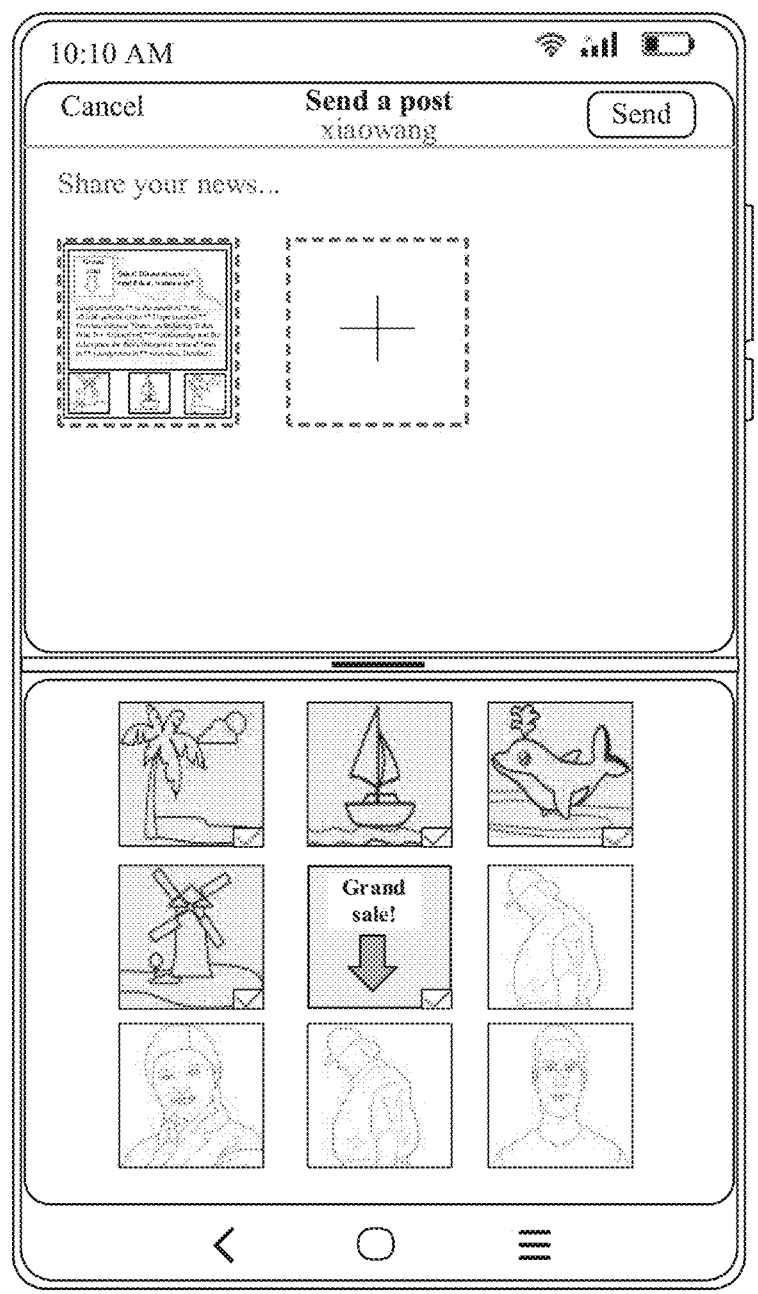

S405: As shown in FIG. 4g and FIG. 4h, in some embodiments, the first electronic device receives a sixth operation of the user, where the sixth operation includes selecting a third application, and the first electronic device sends shared content to the third application in response to the sixth operation; and after receiving the shared content, the third application jumps to an interface that runs to receive the shared content, where the third application is one application selected from at least one application in the option for sharing.

In this embodiment, as shown in FIG. 4h, the third application is Weibo. A system sends the shared content to the application Weibo, and a running program for creating a new Weibo post in the application Weibo receives the shared content. The application Weibo jumps to an interface for creating a Weibo post, and displays the shared content in the interface for creating a Weibo post. In this embodiment, as shown in FIG. 4h, the shared content is an image, and the image is an image obtained after a combination of the first content and the second content, or an image obtained after the first content and the second content are combined and edited.

In some embodiments, the shared content is an image, and the image is an image obtained after a conversion of the third content or the third content with an edit. The electronic device may convert a type of the third content or the third content with an edit into an image by invoking a programming interface. For example, the format conversion may be implemented by invoking a programming interface for a window screenshot.

In some embodiments, the first electronic device may invoke a new programming interface to send, to the application Weibo, a third message including the shared content, where the shared content includes a text and/or an image. The new programming interface may simultaneously send an image, a text, and another related parameter. In some embodiments, the programming interface may include:

Intent intent=new Intent( );
intent.setComponent(weibo);
intent.putExtra("text 1", "text content 1");
intent.putExtra("text 2", "text content 2");
intent.putExtra("image 1", "image content 1");
intent.putExtra("image 2", "image content 2");
intent.putExtra("image 3", "image content 3");
intent.putExtra("image 4", "image content 4");
intent.putExtra("image 5", "image content 5");
intent.putExtra("sequence", "text 2, image 1, image 2, text 1, image 3, image 4, and image 5");
mContext.startShareActivity(intent).

"text 1" is an identifier of a first paragraph of a text, and text content 1 represents " Province releases 'Notice on Reducing Ticket Price For Scenic Spot *', announcing that the ticket price for the scenic spot is reduced to ** yuan." "text 2" is an identifier of a second paragraph of the text, and text content 2 represents "Good news!" "image 1" is an identifier of a first image, "image 2" "image 3", and "image 3" respectively represent identifiers of a second, third, and fourth image, and "sequence" represents an arrangement sequence of the text and the image in the third content. "text 2, image 1, image 2, text 1, image 3, image 4" are an example of a specific arrangement sequence. start-ShareActivity(intent) represents a sharing event.

In some embodiments, "text 1" and "image 1" are merely examples, and identification may be implemented in another manner. For example, text content is identified by using "paragraph 1" and "sentence 1", or an image is identified by using "image 1" and "picture 1".

Figure 4I:
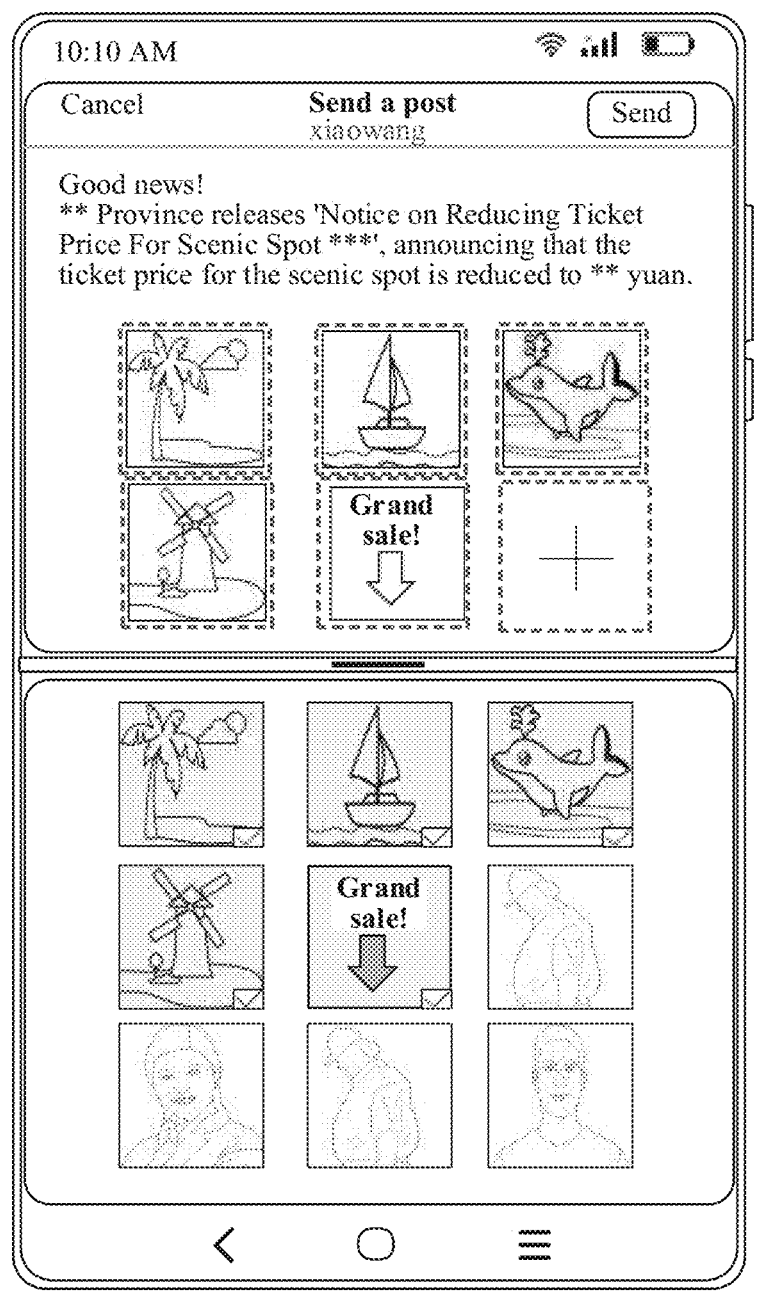

In some embodiments, as shown in FIG. 4i, the application Weibo receives the third message sent by the first electronic device through the interface, separately receives the text and the image based on content and a parameter in the third message, and separately displays the text and the image in corresponding view controls in the application Weibo. In this embodiment, a view control in Weibo for displaying the text is textview, and the text is displayed in textview according to the sequence of "text 2, text 1". A view control in Weibo for displaying the image is imageview, and the image is displayed in imageview according to the sequence of "image 1, image 2, image 3, and image 4".

In some embodiments, step S401 is similar to that in the foregoing embodiments, but another step is different from that in the foregoing embodiments. After step S401, the method further includes S406 and S407.

Figure 4J:
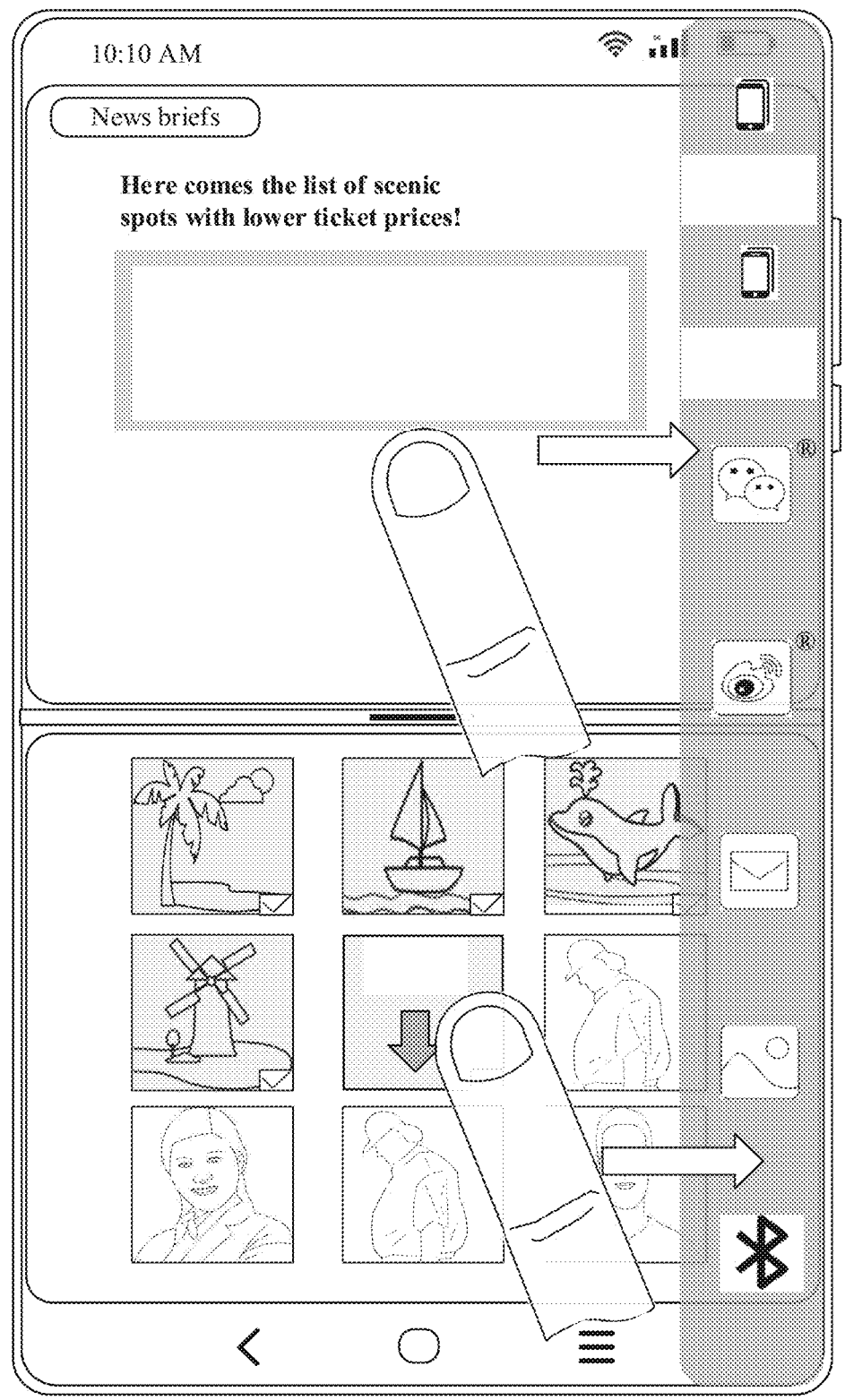
Figure 4K:
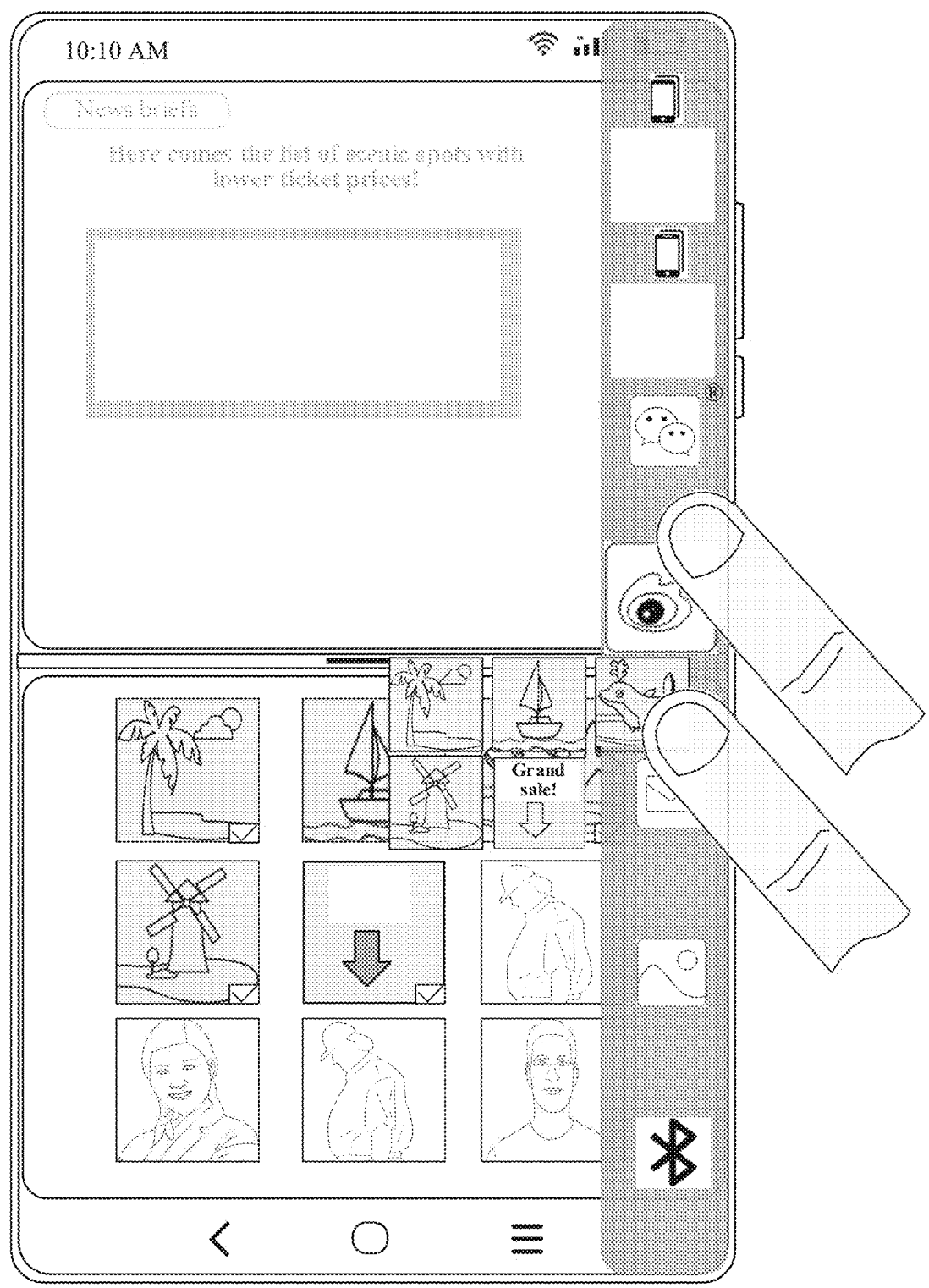
Figure 4I:
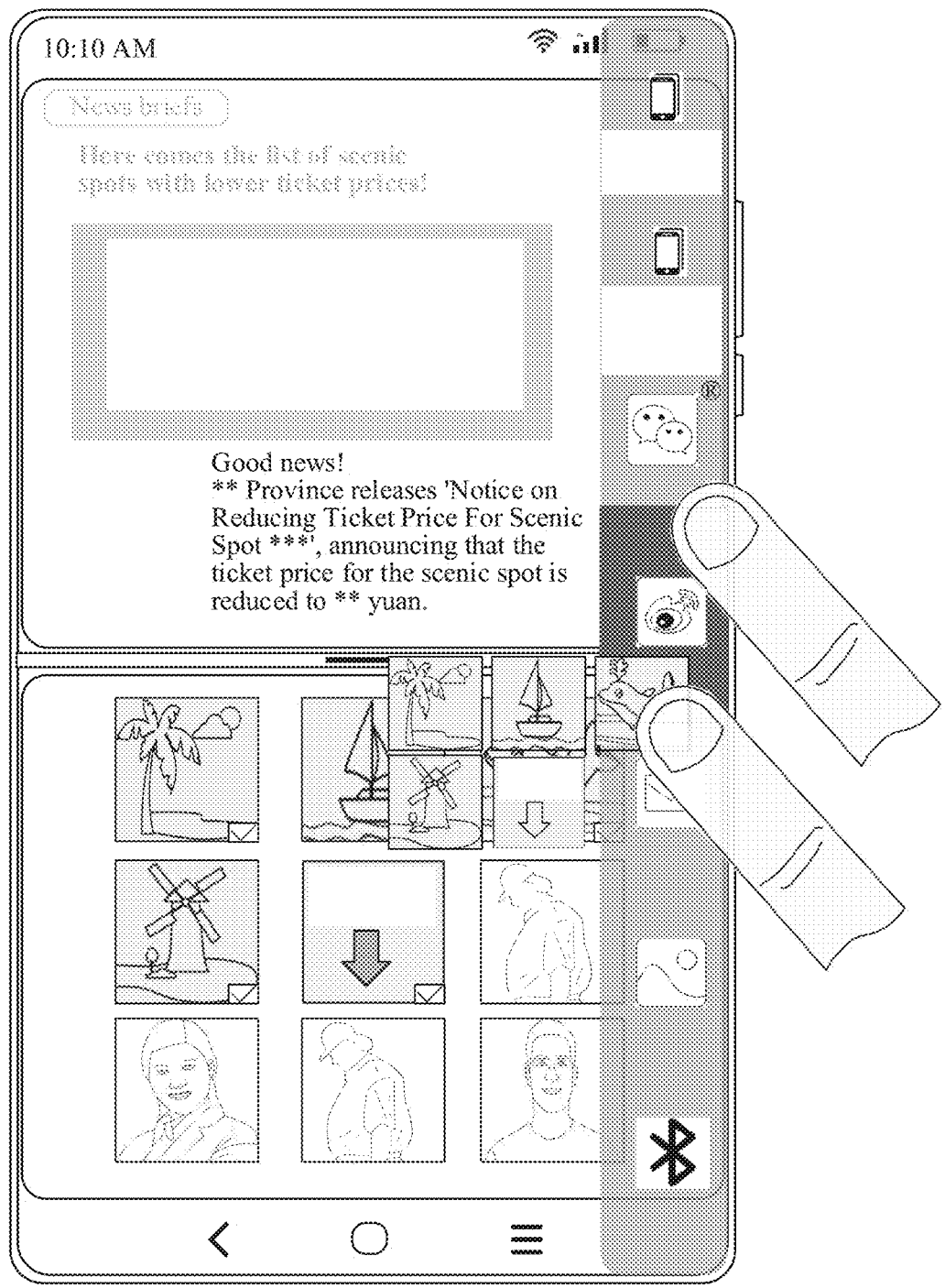

After step S401, the method further includes S406. In some embodiments, as shown in FIG. 4j to FIG. 4l, the third operation on the first content and the fourth operation on the second content that are performed simultaneously are received. During dragging of the first content and the second content, the first electronic device displays a fifth window in the first area in a first display manner, and displays, in the fifth window, identifiers of a plurality of electronic devices or applications configured to receive shared content. A first function corresponding to the fifth window is to combine the first content with the second content, and the first display manner is different from a manner of displaying the interface of the first application or the interface of the second application.

When the touchscreen displays the fifth window, the fifth window overlaps at least a part of the interface of the first application or at least a part of the interface of the second application, and the manner of displaying the fifth window is different from the manner of displaying the interface of the first application or the interface of the second application; or sizes of the interface of the first application and the interface of the second application are adaptively reduced, so that the touchscreen can display the interface of the first application, the interface of the second application, and the fifth window simultaneously. In this case, the manner of displaying the fifth window is the same as (for example, both are non-transparent display) or different from the manner of displaying the interface of the first application or the interface of the second application.

During dragging, when contact points of the third operation and the fourth operation on the touchscreen move to an area surrounding an identifier of an application in the fifth window, the application is highlighted. The application is highlighted to indicate to the user that if the user drops at a current position, the application receives third content, where the third content is a combination of the first content and the second content. The area surrounding the identifier of the application is a preset position area in the system corresponding to the application, and the position area may be specifically an area of a view control, view, corresponding to the application.

Figure 14B:
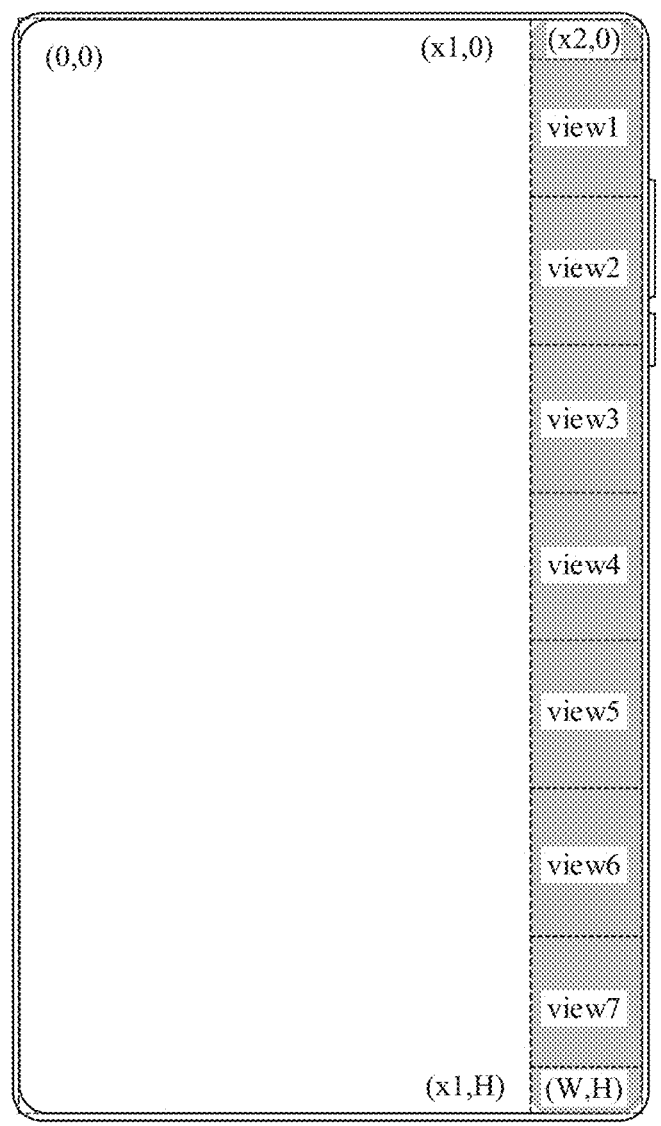

In some embodiments, as shown in FIG. 14b, the fifth window includes areas of view controls, view, corresponding to a plurality of applications. A system may create the corresponding view controls, view, by invoking initView. In the fifth window, corresponding to seven applications, seven view controls (view1 to view7) are set. In some embodiments, the system may set an attribute and a layout of the view controls by setting a parameter Update View Layout of the view controls. For example, an icon of the application or the electronic device is displayed in a view control area; and the system may set an attribute High Light Hot Area Win in the view controls to highlight the view control area or highlight the view control area with a color.

S407: In some embodiments, as shown in FIG. 4i, after the first content and the second content are dragged and dropped to an area surrounding an identifier of the third application on the touchscreen of the first electronic device, the first electronic device sends the shared content to the third application, where the shared content is the third content; and after receiving the shared content, the third application jumps to an interface for receiving the shared content, where the identifier of the third application is one of the identifiers of the plurality of applications in the fifth window. The third content may be a combined image, as shown in FIG. 4h, or may include text-type content and image-type content, as shown in FIG. 4i.

In some of the foregoing embodiments, a user may combine a text and an image from two applications, and share content obtained after the combination. Content from a plurality of applications may be shared together, so that content that the user shares is more informative, thereby optimizing a manner of sharing content for the user.

In some embodiments, the first application is an application on the first electronic device, the second application is an application on the second electronic device, and the second electronic device projects and displays the application on the touchscreen of the second electronic device onto the touchscreen of the first electronic device. In this embodiment, an image is displayed in the first application, and the first application may be a gallery folder. The gallery folder may be a local gallery folder of the first electronic device, or a gallery folder of the first electronic device read from a fourth electronic device after the fourth electronic device is connected to the first electronic device, where the fourth electronic device may be a digital camera or the like. In this embodiment, the second application includes an audio file, and the second application may be a music player or an audio folder in a file manager. The first electronic device may be a computer or a big screen, and the second electronic device may be a mobile phone. A computer or big screen is more suitable for viewing images, and a mobile phone is more commonly used for playing an audio file.

S501: In some embodiments, as shown in FIG. 5a(1) to FIG. 5b(2), first content in the interface of the first application is obtained in response to a first operation on the interface of the first application; and second content in the interface of the second application is obtained in response to a second operation on the interface of the second application. In this embodiment, the first content is an image in the first application that is to be combined, and the second content is audio in the second application that is to be combined. In this process, in response to the second operation, the interface of the second electronic device displays the audio selected in the interface of the second application.

In some embodiments, an operation of selecting an audio file may be that a user selects one or more audio files in a current interface by clicking on the touchscreen; or selects all audio files in a folder by selecting the folder, or selects one or more audio files in another manner. In some embodiments, an operation of selecting the image is the same as that described in the foregoing embodiments, and details are not described herein again.

S502: In some embodiments, as shown in FIG. 5c(1) and FIG. 5c(2), a third operation on the first content and a fourth operation on the second content that are performed simultaneously are received, and during dragging of the first content and the second content, the first electronic device displays a third window in the first area in a second display manner, and displays a fourth window in the fourth area in a third display manner, where the third operation includes dragging, and the fourth operation includes dragging. A manner of displaying the third window and the fourth window is similar to that in the foregoing embodiments, and details are not described herein again. In this process, a display interface of the second electronic device does not change, and the second content selected in the interface of the second application is still displayed.

S503: In some embodiments, as shown in FIG. 5d(1) and FIG. 5d(2), after the first content and the second content are dragged and dropped to the third window on the touchscreen of the first electronic device, the electronic device displays the first window, where the first window includes third content displayed in a second area of the first window and a first option displayed in a third area of the first window, where the first option includes an option for sharing, and the third content includes a video obtained after a combination of the image selected in the first application and the audio selected in the second application. Specific descriptions of the option for sharing are similar to those in the foregoing embodiments, and details are not described herein again. In this process, a display interface of the second electronic device does not change, and the second content selected in the interface of the second application is still displayed.

In some embodiments, the first window includes a fifth option, and the fifth option is a second editing option. The second editing option is used to edit the third content, and an editing function menu of the second editing option is used to trim, add music or an image to, or add a template for a combined video.

S504: In some embodiments, as shown in FIG. 5d(1) to FIG. 5f(2), in some embodiments, the first electronic device receives a fifth operation of a user, where the fifth operation includes selecting the second editing option, and the first electronic device displays the editing function menu in response to the fifth operation.

As shown in FIG. 5e(1) and FIG. 5e(2), in some embodiments, as shown in FIG. 5f(1) and FIG. 5f(2), after selecting the second editing option, a user selects a trimming function in the editing function menu, to trim combined audio, trim duration of a song, edit a start time and an end time of the song, edit a start and an end time of each image, or the like.

As shown in FIG. 5f(1) and FIG. 5f(2), a user edits image content for the combined audio by using an image function, for example, adds an image or deletes an image.

In some embodiments, most of steps are similar to those in the foregoing embodiment, but the method further includes S505.

S505: In some embodiments, as shown in FIG. 5g(l) to 5i(2), the first electronic device receives a sixth operation of the user, where the sixth operation includes selecting a third application, and the first electronic device sends shared content to the third application in response to the sixth operation; and after receiving the shared content, the third application jumps to an interface that runs to receive the shared content, and at the same time, the interface of the third application for receiving the shared content is displayed on a touchscreen of the second electronic device. The third application is one application selected from at least one application in the option for sharing.

In this embodiment, the third application is Weibo. A system sends the shared content to the application Weibo, and a running program for creating a new Weibo post in the application Weibo receives the shared content. The application Weibo jumps to an interface for creating a Weibo post, and displays the shared content in the interface for creating a Weibo post. In this embodiment, as shown in FIG. 5h(1) and FIG. 5h(2), the shared content is a video, and the video is a video obtained after a combination of an image and audio, or a video obtained after an image and audio are combined and edited. At the same time, an interface of Weibo for receiving the shared content is displayed on a touchscreen of a mobile phone.

In some embodiments, the first content may be a text, the second content may be audio or a video. Alternatively, both the first content and the second content may be audio, or both the first content and the second content may be a video. In the foregoing scenario, the first content and the second content may be combined by using the foregoing method, and a combination result is a video.

In some of the foregoing embodiments, a user may combine audio or videos, or combine audio or a video with other content, thereby simplifying a step of processing audio or video files, without invoking third-party video trimming software, and making sharing more convenient.

In some embodiments, the first application is an application on the first electronic device, the second application is an application on the second electronic device, and the second electronic device projects and displays the application on the touchscreen of the second electronic device onto the touchscreen of the first electronic device. In this embodiment, the first electronic device may be a computer or a big screen, the second electronic device may be a mobile phone. An image is displayed in the first application and the second application, and the first application and the second application may be gallery folders. The first application, a gallery folder, may be a local gallery folder of the first electronic device, or a gallery folder of the first electronic device read from a fourth electronic device after the fourth electronic device is connected to the first electronic device, where the fourth electronic device may be a digital camera or the like.

S601: In some embodiments, as shown in FIG. 6a(1) to FIG. 6b(2), first content in the interface of the first application is obtained in response to a first operation on the interface of the first application; and second content in the interface of the second application is obtained in response to a second operation on the interface of the second application. In this embodiment, the first content is an image in the first application that is to be combined, and the second content is an image in the second application that is to be combined. In this process, in response to the second operation, the interface of the second electronic device displays the image selected in the interface of the second application.

In some embodiments, an operation of selecting the image is the same as that described in the foregoing embodiments, and details are not described herein again.

S602: In some embodiments, as shown in FIG. 6c(1) and FIG. 6c(2), a third operation on the first content and a fourth operation on the second content that are performed simultaneously are received, and during dragging of the first content and the second content, the first electronic device displays a third window in the first area in a second display manner, and displays a fourth window in the fourth area in a third display manner, where the third operation includes dragging, and the fourth operation includes dragging. A manner of displaying the third window and the fourth window is similar to that in the foregoing embodiments, and details are not described herein again. In this process, a display interface of the second electronic device does not change, and the second content selected in the interface of the second application is still displayed.

S603: In some embodiments, as shown in FIG. 6d(1) and FIG. 6d(2), after the first content and the second content are dragged and dropped to the third window on the touchscreen of the first electronic device, the electronic device displays the first window. The first window includes third content displayed in a second area of the first window and a first option displayed in a third area of the first window, where the first option includes an option for sharing, and the third content includes content obtained after a combination of the image selected in the first application and the image selected in the second application. Specific descriptions of the option for sharing are similar to those in the foregoing embodiments, and details are not described herein again. In this process, a display interface of the second electronic device does not change, and the second content selected in the interface of the second application is still displayed.

In some embodiments, the first window includes a fifth option, and the fifth option is a second editing option. The second editing option is used to edit the third content, and an editing function menu of the second editing option includes editing a layout, adding a border, adding an emoticon, and the like, to facilitate a user to use an editing function to further edit and modify the third content.

The editing function menu is an editing template corresponding to the first content and the second content. In this embodiment, the correspondence means that the editing template corresponds to content presented in an image and a quantity of images. After analyzing the content presented in the image and the quantity of images by using an internal algorithm module, the electronic device may select a template suitable for a current scenario. A layout of the image is a layout method including five images. In some embodiments, an image processing library of a system may be invoked, and the third content may be further edited with the image processing library, for example, by adjusting a color of image content, setting a theme, or adding a text.

S604: In some embodiments, as shown in FIG. 6d(1) to FIG. 6e(2), in some embodiments, the first electronic device receives a fifth operation of a user, where the fifth operation includes selecting the second editing option, and the first electronic device displays the editing function menu in response to the fifth operation.

In some embodiments, as shown in FIG. 6f(1) and FIG. 6f(2), after selecting the second editing option, a user selects a trimming function in the editing function menu, and adds a border to the combined third content.

In some embodiments, the third content is editable, and editing of the third content may be triggered with a preset gesture, for example, a click or a long press, on the third content in the first window. In this embodiment, in the second area of the first window, a user may delete, zoom in, zoom out, or move a position of image content. In this embodiment, a third image moves to a position of a fifth image, a fourth image moves to a position of the third image, and the fifth image moves to a position of the fourth image.

In some embodiments, most of steps are similar to those in the foregoing embodiment, but the method further includes S605.

S605: In some embodiments, as shown in FIG. 6f(1) to FIG. 6g(2), the first electronic device receives a sixth operation of the user, where the sixth operation includes selecting a third application, and the first electronic device sends shared content to the third application in response to the sixth operation; and after receiving the shared content, the third application jumps to an interface that runs to receive the shared content, and at the same time, the interface of the third application for receiving the shared content is displayed on a touchscreen of the second electronic device. The third application is one application selected from at least one application in the option for sharing.

In this embodiment, the third application is Weibo. A system sends the shared content to the application Weibo, and a running program for creating a new Weibo post in the application Weibo receives the shared content. The application Weibo jumps to an interface for creating a Weibo post, and displays the shared content in the interface for creating a Weibo post. In this embodiment, as shown in FIG. 6g(1) and FIG. 6g(2), the shared content is an image obtained after the first content and the second content are combined and edited. At the same time, an interface of Weibo for receiving the shared content is displayed on a touchscreen of a mobile phone.

In some of the foregoing embodiments, a user may combine images from two different applications or two different devices. This simplifies a step in the prior art of combining images from different applications, improving efficiency of image processing, and optimizing user experience.

In some embodiments, the first application and the second application are document editing applications, and the first application and the second application may be a same application or different applications. In a specific scenario, two documents in the first application and the second application are documents for which texts need to be compared. For example, the two documents are two similar documents, or the two documents are different versions of a document in a document editing process.

Figure 7A:
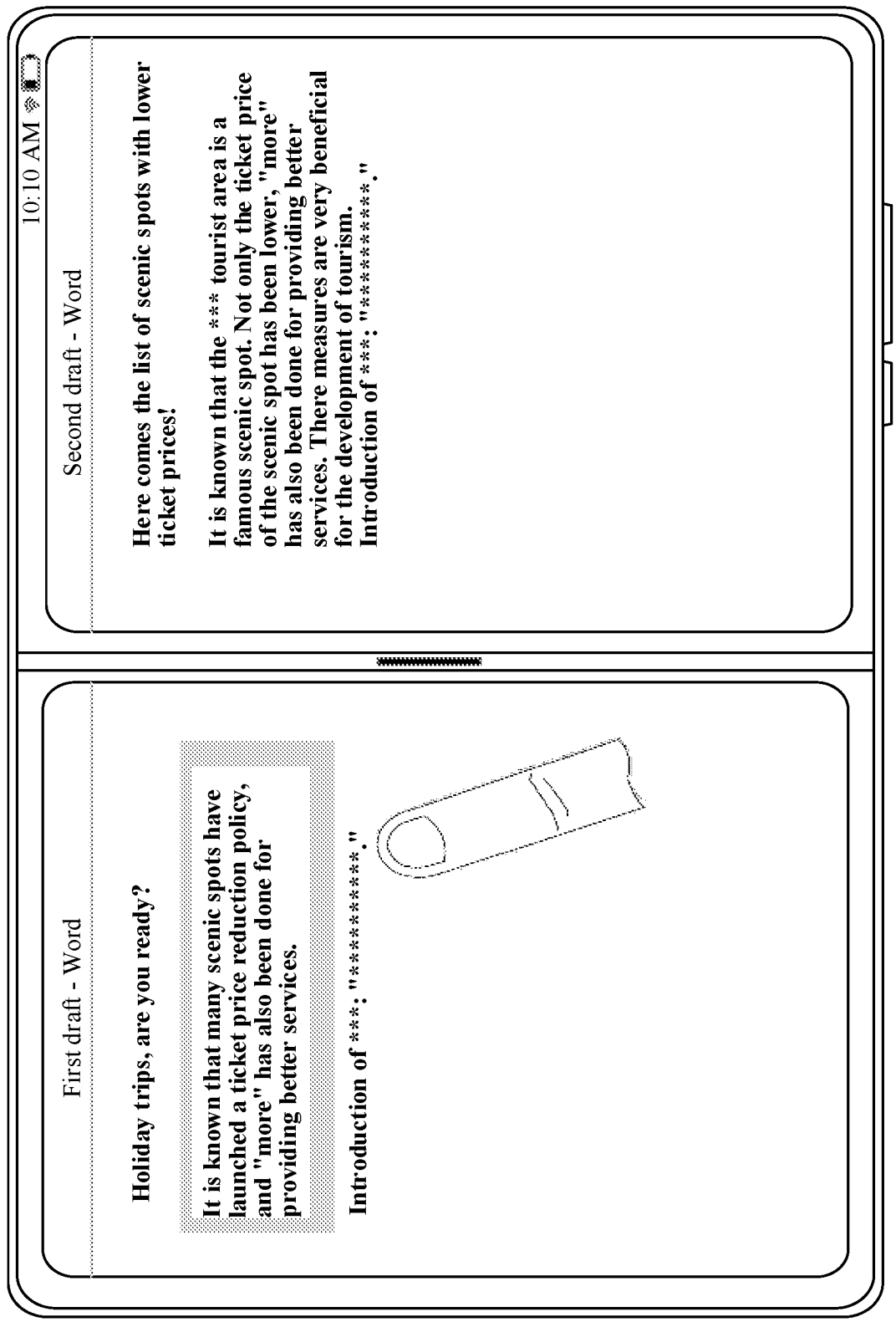
FIG. 7a to FIG. 7g are schematic diagrams of a touchscreen of an electronic device for a multi-application interaction method according to an embodiment of this application.
Figure 7B:
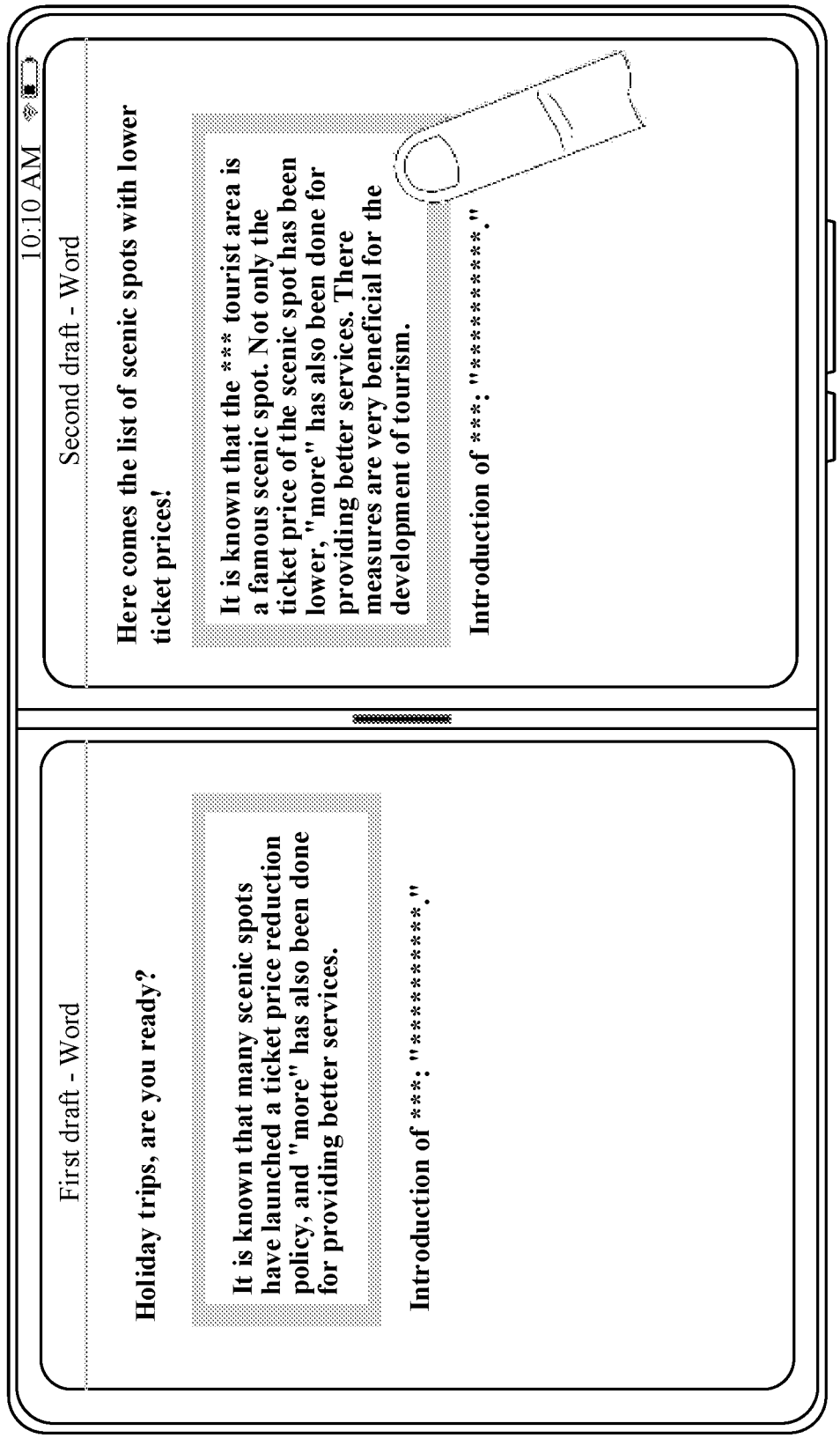

S701: In some embodiments, as shown in FIG. 7a and FIG. 7b, first content in the interface of the first application is obtained in response to a first operation on the interface of the first application; and second content in the interface of the second application is obtained in response to a second operation on the interface of the second application. In this embodiment, the first content in the first application is a text that is to be compared, and the second content in the second application is a text that is to be compared.

In some embodiments, an operation of selecting text content is the same as that described in the foregoing embodiments, and details are not described herein again.

Figure 7C:
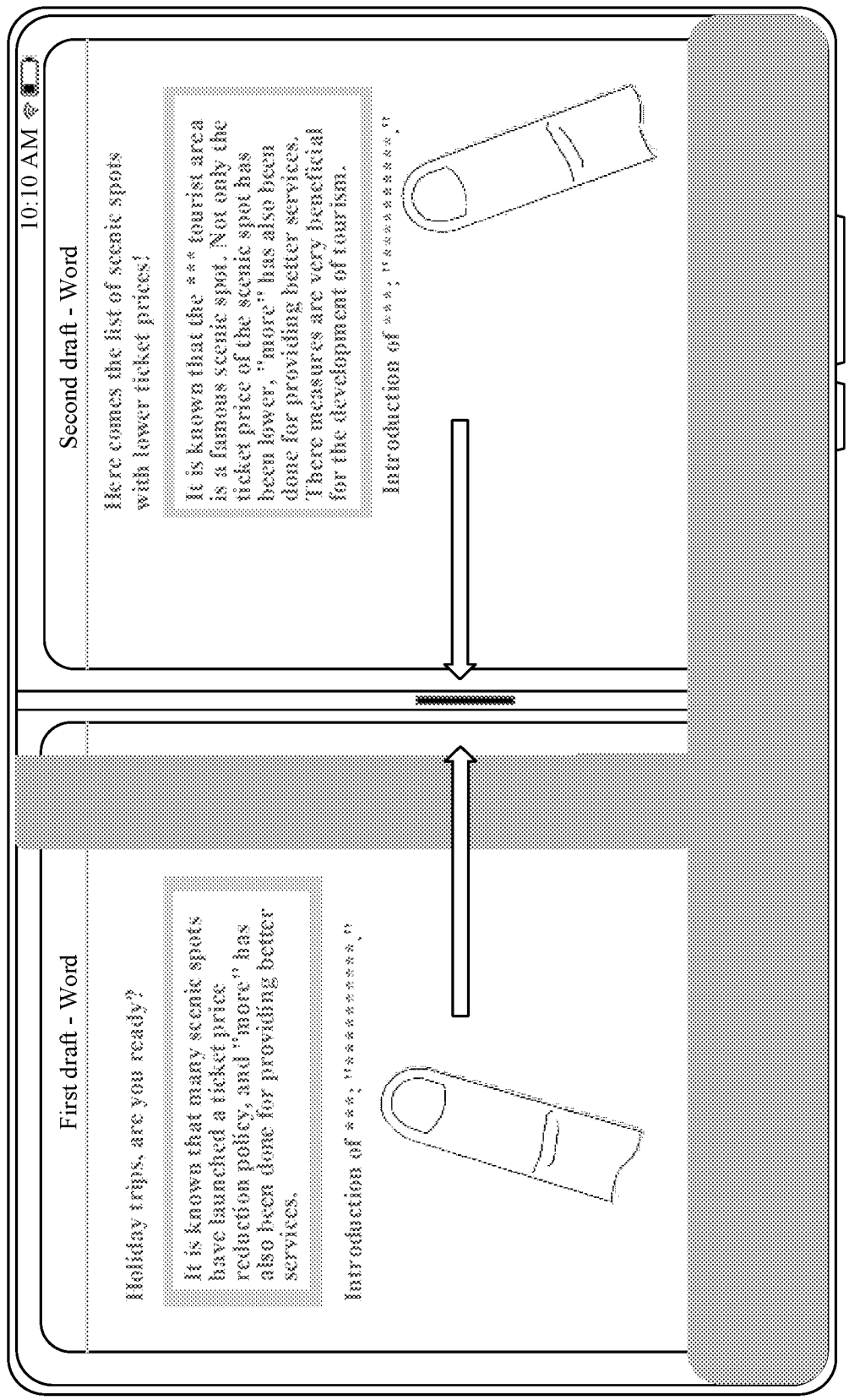

S702: In some embodiments, as shown in FIG. 7c, a third operation on the first content and a fourth operation on the second content that are performed simultaneously are received, and during dragging of the first content and the second content, the first electronic device displays a third window in the first area in a second display manner, and displays a fourth window in the fourth area in a third display manner, where the third operation includes dragging, and the fourth operation includes dragging. A manner of displaying the third window and the fourth window is similar to that in the foregoing embodiments, and details are not described herein again.

Figure 7D:
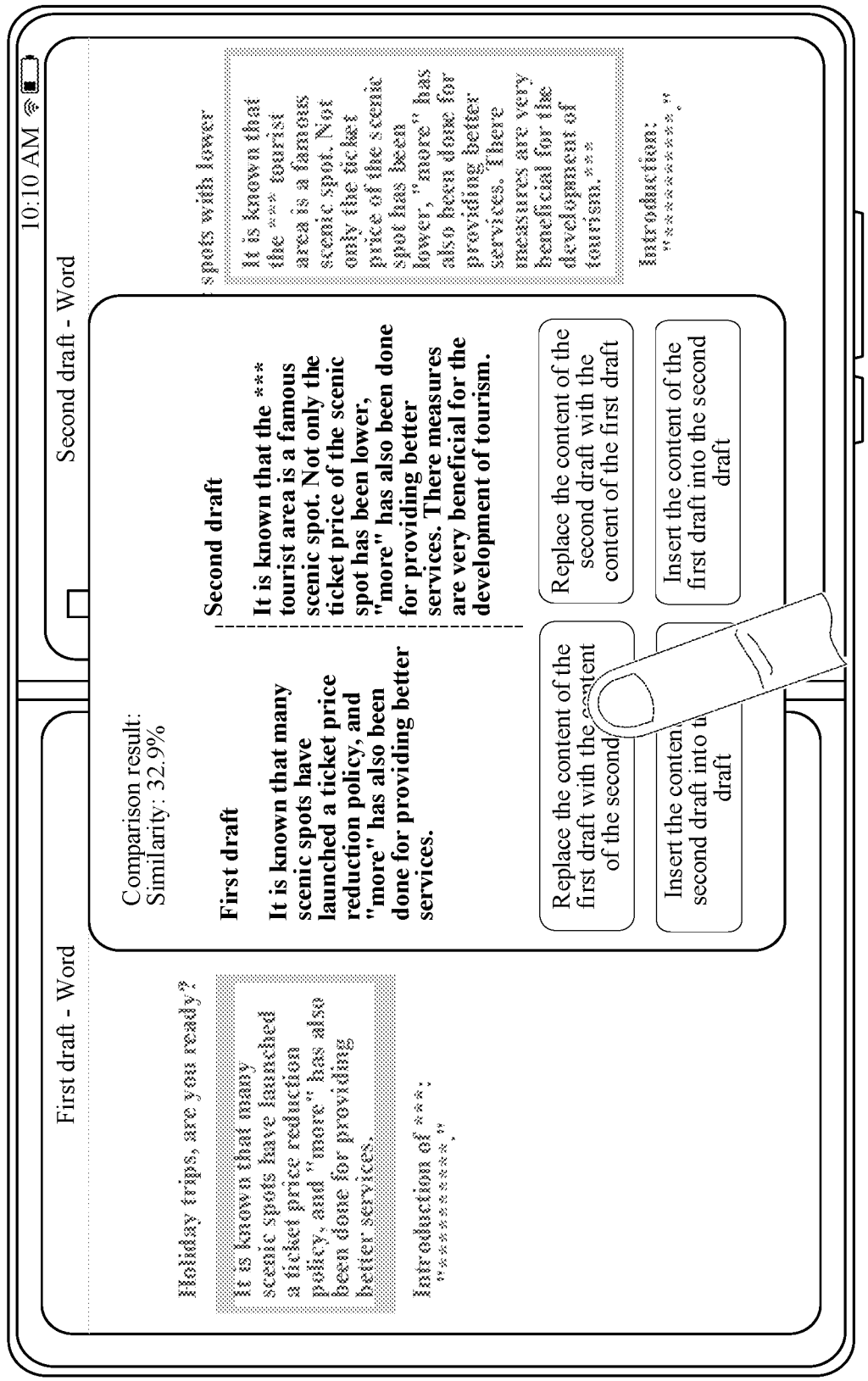

S703: In some embodiments, as shown in FIG. 7d, after the first content and the second content are dragged and dropped to the third window on the touchscreen of the first electronic device, the electronic device displays the first window, where the first window includes third content displayed in a second area of the first window and a fourth option displayed in a third area of the first window. The third content includes content obtained after a comparison between the image selected in the first application and the image selected in the second application. The fourth option includes at least one first editing option. In this embodiment, the at least one first editing option includes "Content in the first draft version may be replaced with content in the second draft version". "Insert content in the second draft version into the first draft version", "Content in the second draft version may be replaced with content in the first draft version", and "Insert content in the first draft version into the second draft version". The first editing option is used to edit content in the first application and the second application.

In some embodiments, the third content includes a similarity between the content in the first application and the content in the second application, a preview of a first application content comparison result, and a preview of a second application content comparison result. The preview of the first application content comparison result is used to display parts of the content in the first application that are the same as or different from the content in the second application; and the preview of the second application content comparison result is used to display parts of the content in the second application that are the same as or different from the content in the first application.

In some embodiments, the fourth option may further include another first editing option, for example, "Delete", that is used to perform another editing operation on the content in the first application and the second application.

S704: In some embodiments, as shown in FIG. 7d to FIG. 7g, the first electronic device receives a fifth operation of a user, where the fifth operation includes selecting the first editing option, and the first electronic device sends edited content and an editing instruction to the first application or the second application in response to the fifth operation.

Figure 7E:
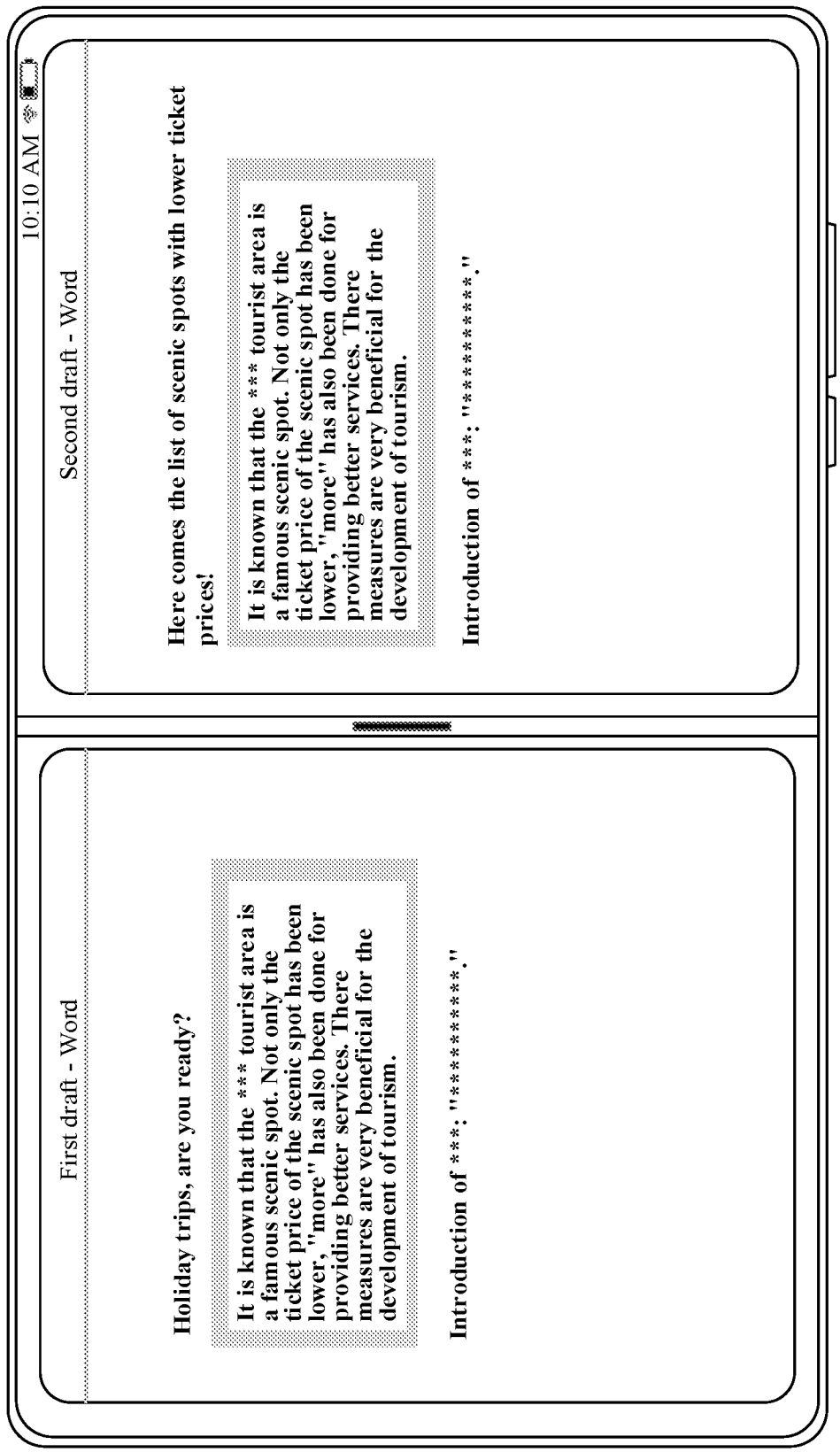

In some embodiments, as shown in FIG. 7d and FIG. 7e, the fifth operation may be selecting the option "Content in the first draft version may be replaced with content in the second draft version" in the first window. The first electronic device sends the second content and a replacement instruction to the first application in response to the fifth operation. That the first content is deleted and the second content is copied to a position of the first content are displayed in the first application.

Figure 7F:
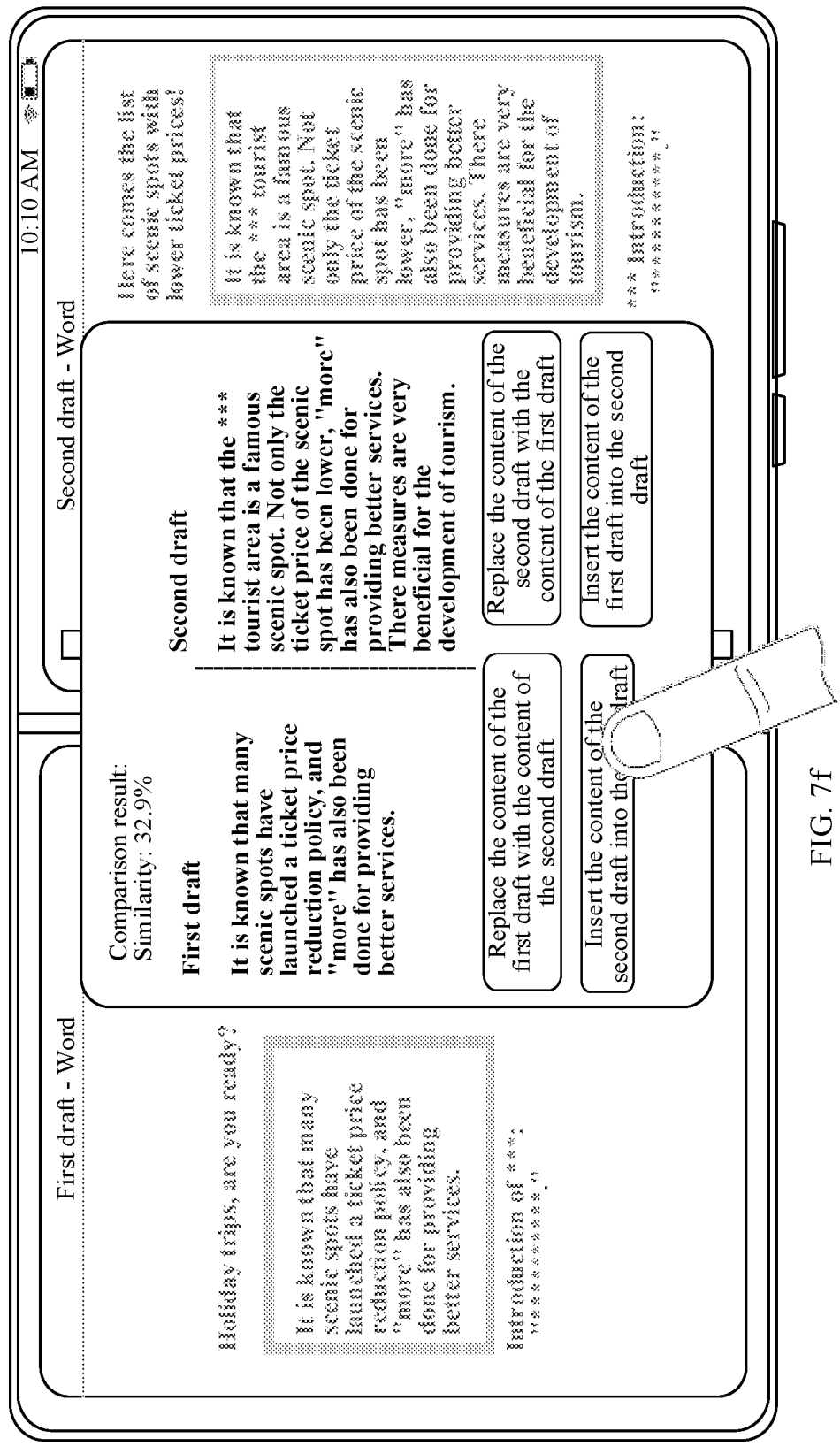
Figure 7G:
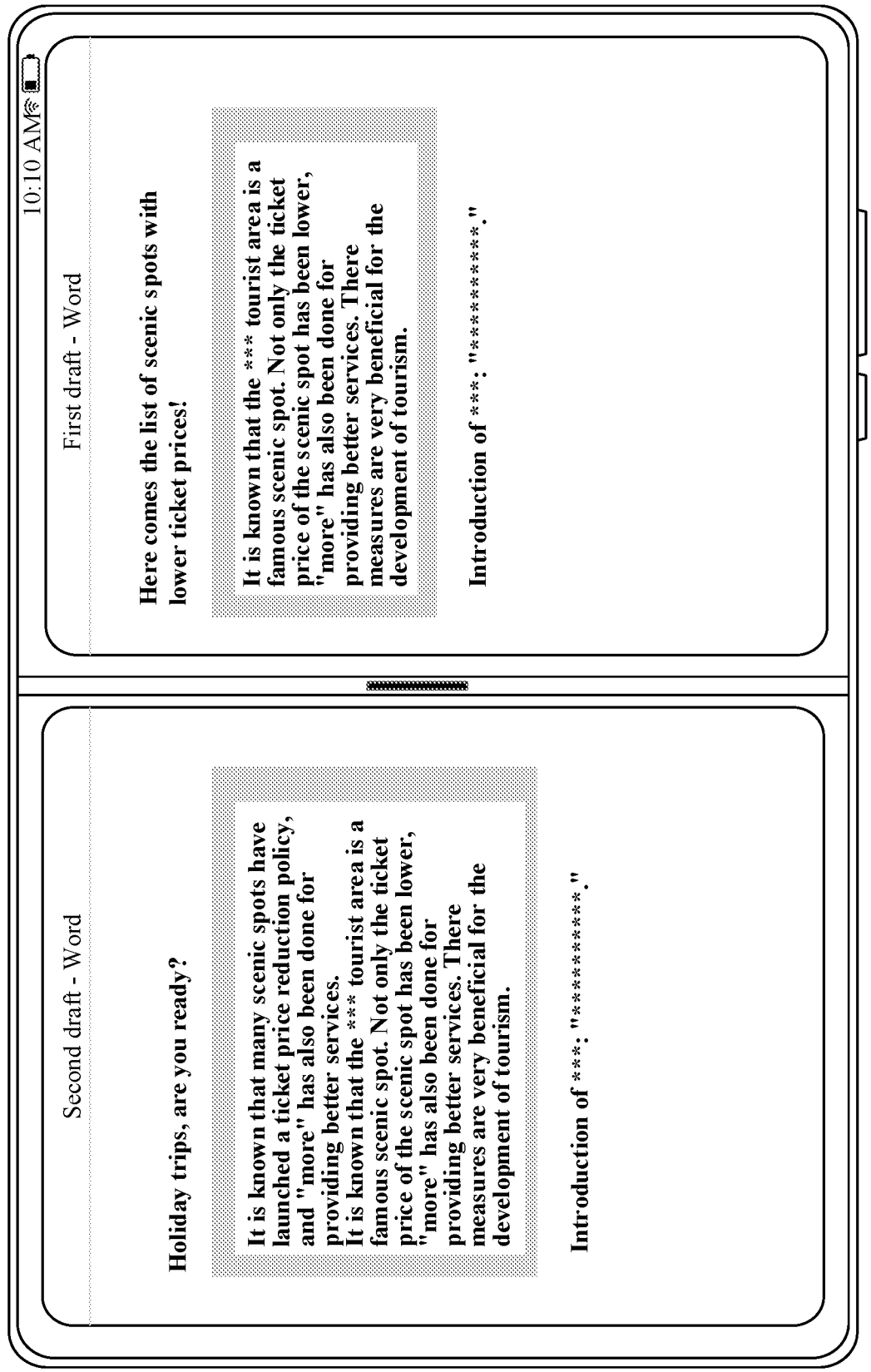

In some embodiments, as shown in FIG. 7f and FIG. 7g, the fifth operation may be selecting the option "Insert content in the second draft version into the first draft version" in the first window. The first electronic device sends the second content and an insertion instruction to the first application in response to the fifth operation. The second content is copied to a position after a position of the first content, while the first content is also retained.

In some of the foregoing embodiments, all or a part of content of two similar documents may be compared, and a comparison result shows a similarity and a different part. Based on the comparison result, a user may edit an original document as required, for example, performs a replacement or insertion, thereby providing more convenience in document editing.

In some embodiments, the first application is an application on the first electronic device, the second application is an application on the touchscreen of the second electronic device, and the second electronic device projects and displays the application on the touchscreen of the second electronic device onto the touchscreen of the first electronic device. In this embodiment, the first electronic device is a laptop computer, the second electronic device is a mobile terminal, the first application is a document editing application, and the second application is an office application. In some embodiments, in a mobile office scenario, the office application is an office application that needs to run on a mobile terminal.

S801: In some embodiments, as shown in FIG. 8a(1) to FIG. 8b(2), first content in the interface of the first application is obtained in response to a first operation on the interface of the first application; and second content in the interface of the second application is obtained in response to a second operation on the interface of the second application. In this embodiment, the first content in the first application is a text that is to be compared, and the second content in the second application is a text that is to be compared. In this process, in response to the second operation, the interface of the second electronic device displays a text selected in the interface of the second application.

In some embodiments, an operation of selecting the text is the same as that described in the foregoing embodiments, and details are not described herein again.

S802: In some embodiments, as shown in FIG. 8c(1) and FIG. 8c(2), a third operation on the first content and a fourth operation on the second content that are performed simultaneously are received, and during dragging of the first content and the second content, the first electronic device displays a third window in the first area in a second display manner, and displays a fourth window in the fourth area in a third display manner, where the third operation includes dragging, and the fourth operation includes dragging. A manner of displaying the third window and the fourth window is similar to that in the foregoing embodiments, and details are not described herein again. In this process, a display interface of the second electronic device does not change, and the second content selected in the interface of the second application is still displayed.

S803: In some embodiments, as shown in FIG. 8d(1) and FIG. 8d(2), after the first content and the second content are dragged and dropped to the third window on the touchscreen of the first electronic device, the electronic device displays the first window, where the first window includes third content displayed in a second area of the first window and a first option displayed in a third area of the first window. The first option includes an option for sharing, and the third content includes content obtained after a combination of a text selected in the first application and the text selected in the second application. Specific descriptions of the option for sharing are similar to those in the foregoing embodiments, and details are not described herein again. In this process, a display interface of the second electronic device does not change, and the second content selected in the interface of the second application is still displayed.

S804: In some embodiments, as shown in FIG. 8d(1) to FIG. 8f(2), the first electronic device receives a fifth operation of a user, where the fifth operation includes selecting a third application, and the first electronic device sends shared content to the third application in response to the fifth operation; and after receiving the shared content, the third application jumps to an interface that runs to receive the shared content, and at the same time, the interface of the third application for receiving the shared content is displayed on a touchscreen of the second electronic device. The third application is one application selected from at least one application in the option for sharing, and the shared content may be the third content or the third content with an edit.

In some embodiments, the third content is editable, and editing of the third content may be triggered with a preset gesture, for example, a click or a long press, on the third content in the first window. In this embodiment, in the first window, a user may change a format of text content by removing an underline from fonts of "Cause analysis" and "Improvement plan", using a bold font, and adding a text "P.S., please see the attached 2020 annual plan for your reference".

In some embodiments, the third application is office software of Weibo, for example, a mailbox, on the second electronic device. The first electronic device sends the shared content to the mailbox in response to the fifth operation. After receiving the shared content, the mailbox jumps to an interface for writing a new email, and sends the shared content to a body paragraph part of the new email in the interface. At the same time, the interface for writing a new email is displayed on a touchscreen of a mobile phone.

In some embodiments, m a scenario in which the first application is an application on the first electronic device and the second application is an application on the second electronic device, the application included in the option for sharing may be the application on the first electronic device and/or the application on the second electronic device. In some embodiments, an identifier of an application is displayed, and the identifier indicates a device to which the application belongs. In some embodiments, both the first electronic device and the second electronic device include a same application. In this case, priorities of the application on the first electronic device and the application on the second electronic device (an electronic device that has a screen projection) may be set in a system on the first electronic device. When a user selects an application in the first window, a high-priority application is opened by default. In this embodiment, as shown in FIG. 8e(1) and FIG. 8e(2), the identifier of the application includes a device to which the application belongs. For example, an identifier of the application WeChat includes an icon WeChat and an identifier "From P40" of a source device of the application.

In some embodiments provided in this application, a user may edit content by using the first electronic device (for example, a computer), and combine content in the first electronic device (for example, a computer) and content in the second electronic device (for example, a mobile phone). Content obtained after the combination may be sent to an application on any device. Interactive processing and sharing of the content on two different devices are implemented by simple operations, thereby reducing steps of file transfer between different devices and optimizing user experience of content processing.

In some embodiments, both the first application and the second application are file managers, and the two file managers are separately opened by using a function for cloning an application on the first electronic device. In this embodiment, the first application is a storage folder of a third-party application, and the second application is a storage folder of a system, for example, an album or a document. In this embodiment, the third-party application is WeChat, the storage folder of the third-party application is correspondingly Weixin, and the storage folder of the system is DCIM. In some embodiments, when a user uploads a local file by using the third-party application, the storage folder of the third-party application usually stores the uploaded file. In this scenario, a same file is stored in both the storage folder of the system and the storage folder of the third-party application, thereby causing unreasonable use of storage resources. In this embodiment, when sending an image in an album, WeChat stores the image in the folder Weixin.

Figure 9A:
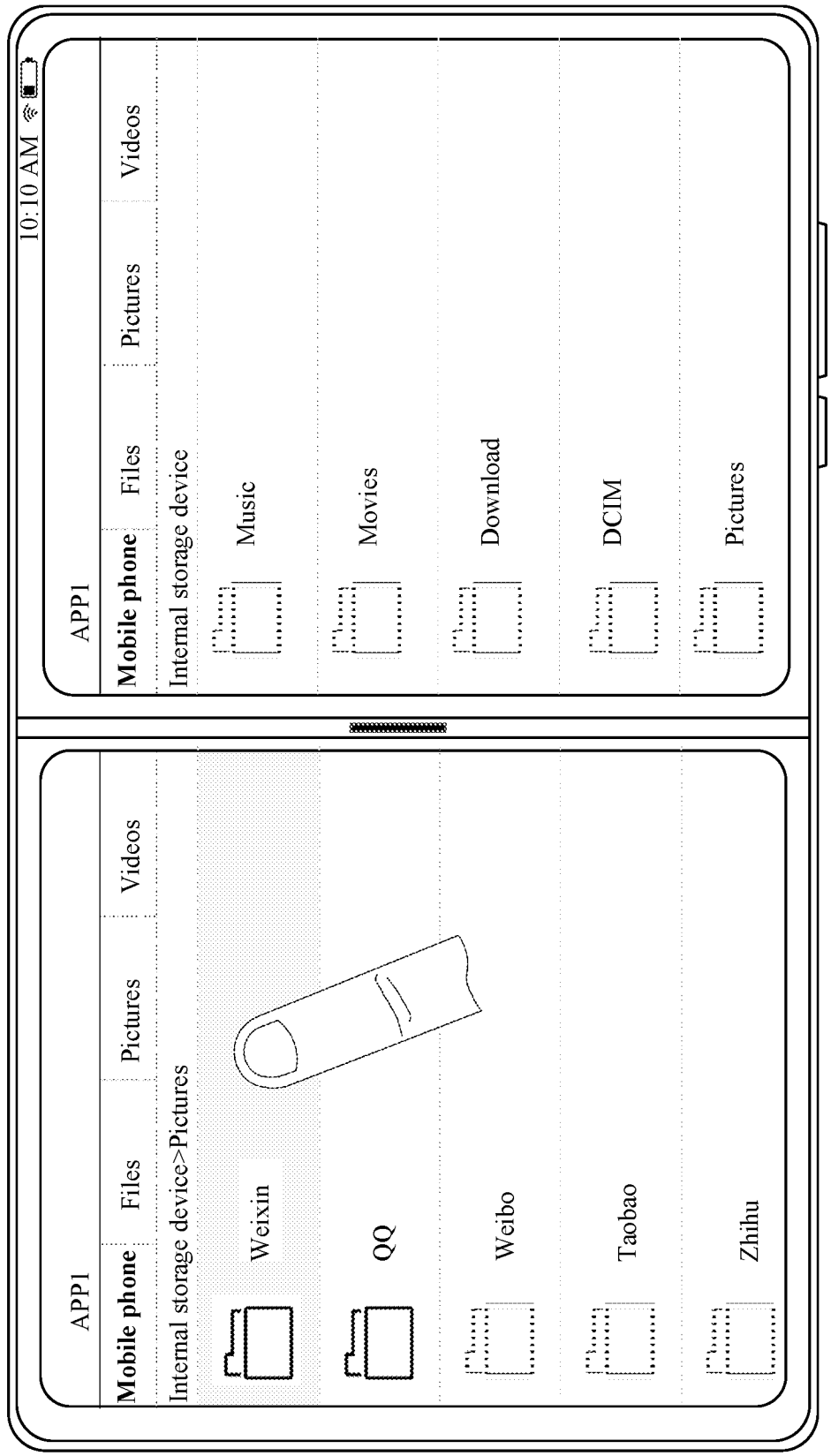
FIG. 9a to FIG. 9f are schematic diagrams of a touchscreen of an electronic device for a multi-application interaction method according to an embodiment of this application.
Figure 9B:
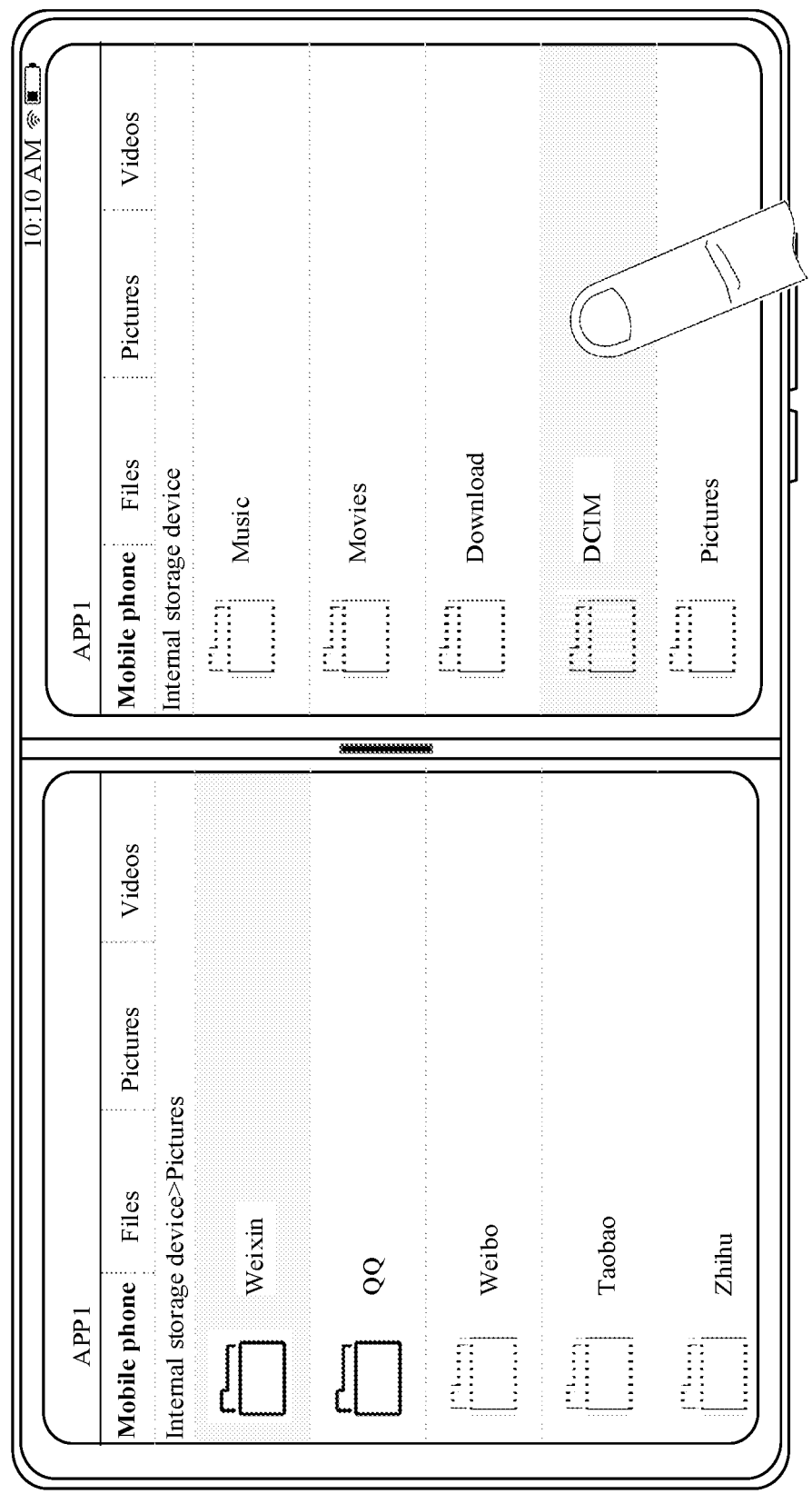

S901: In some embodiments, as shown in FIG. 9a, first content in the interface of the first application is obtained m response to a first operation on the interface of the first application; and second content in the interface of the second application is obtained in response to a second operation on the interface of the second application. In this embodiment, the first content is an image in the folder Weixin, and the second content is an image in the folder DCIM.

In some embodiments, an operation of selecting a file (an image-type file in this embodiment) may be that a user selects one or more folders in a current interface with a click or another gesture, to select all files in the folder; or select a plurality of files directly by a click or another gesture, or select one or more files in another manner.

Figure 9C:
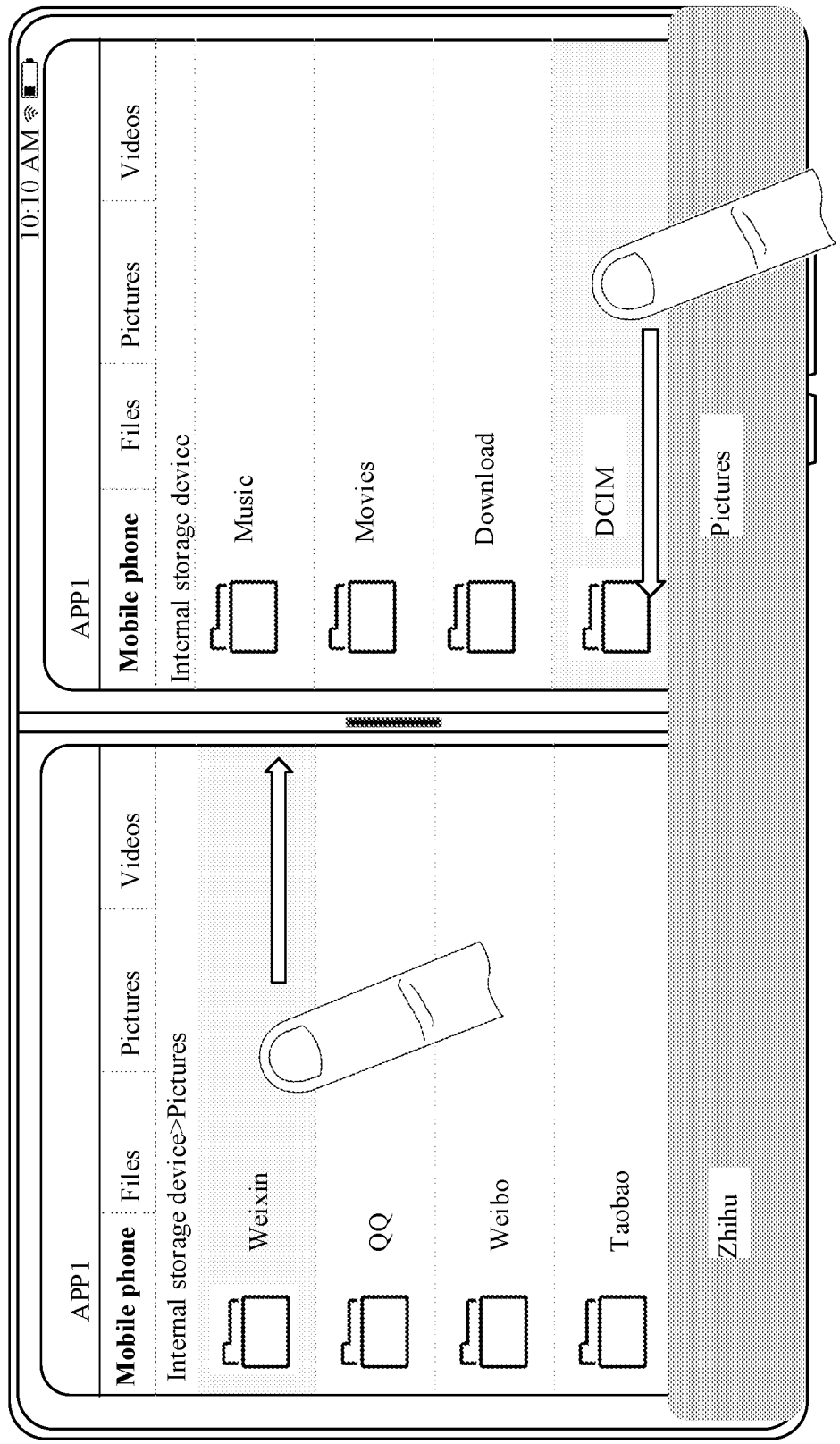

S902: In some embodiments, as shown in FIG. 9c, a fourth operation performed simultaneously on the hot area is received, and during dragging of the first content and the second content, the first electronic device displays a third window in the first area in a second display manner, and displays a fourth window in the fourth area in a third display manner, where the third operation includes dragging, and the fourth operation includes dragging.

Figure 9D:
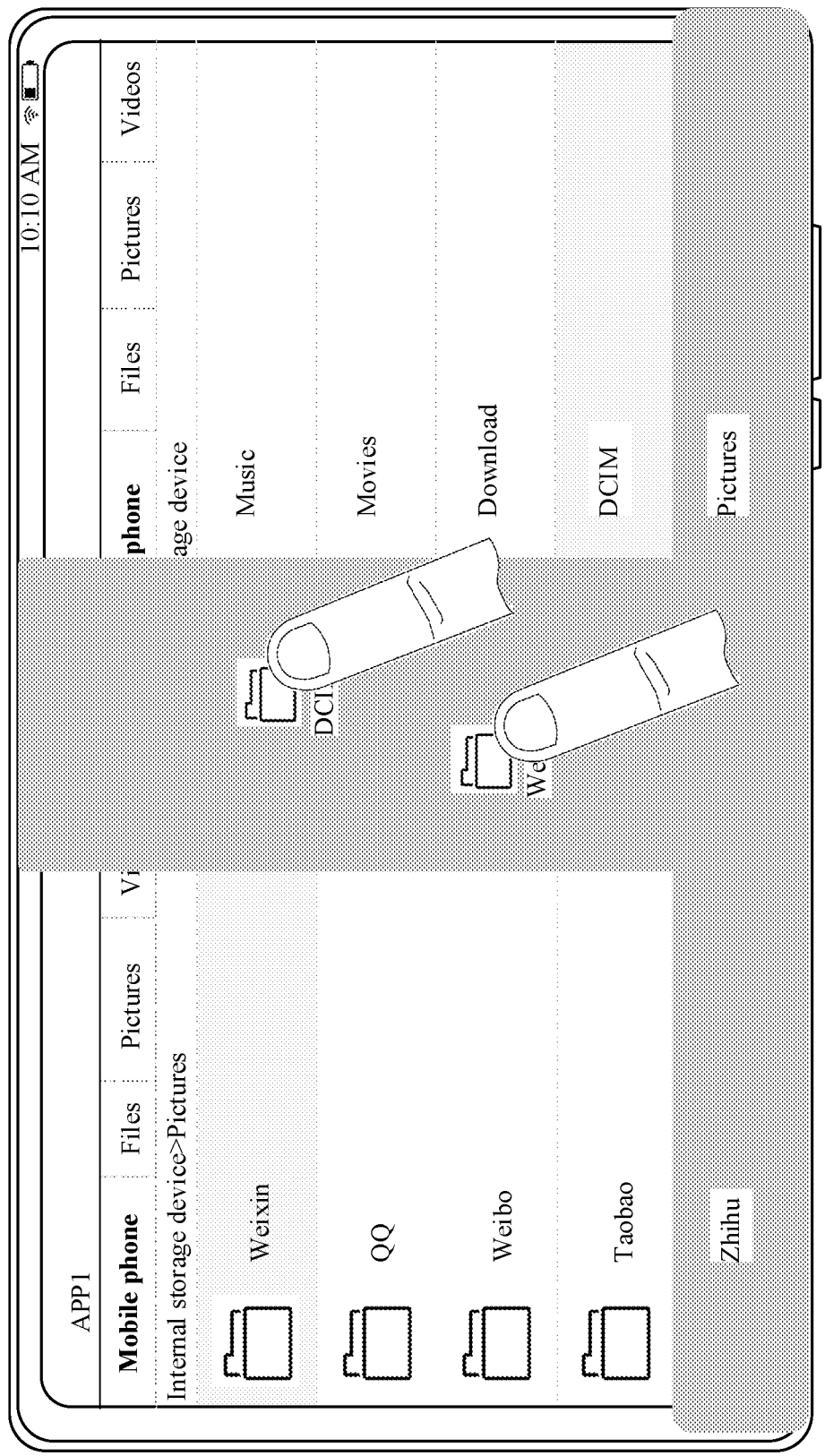
Figure 9E:
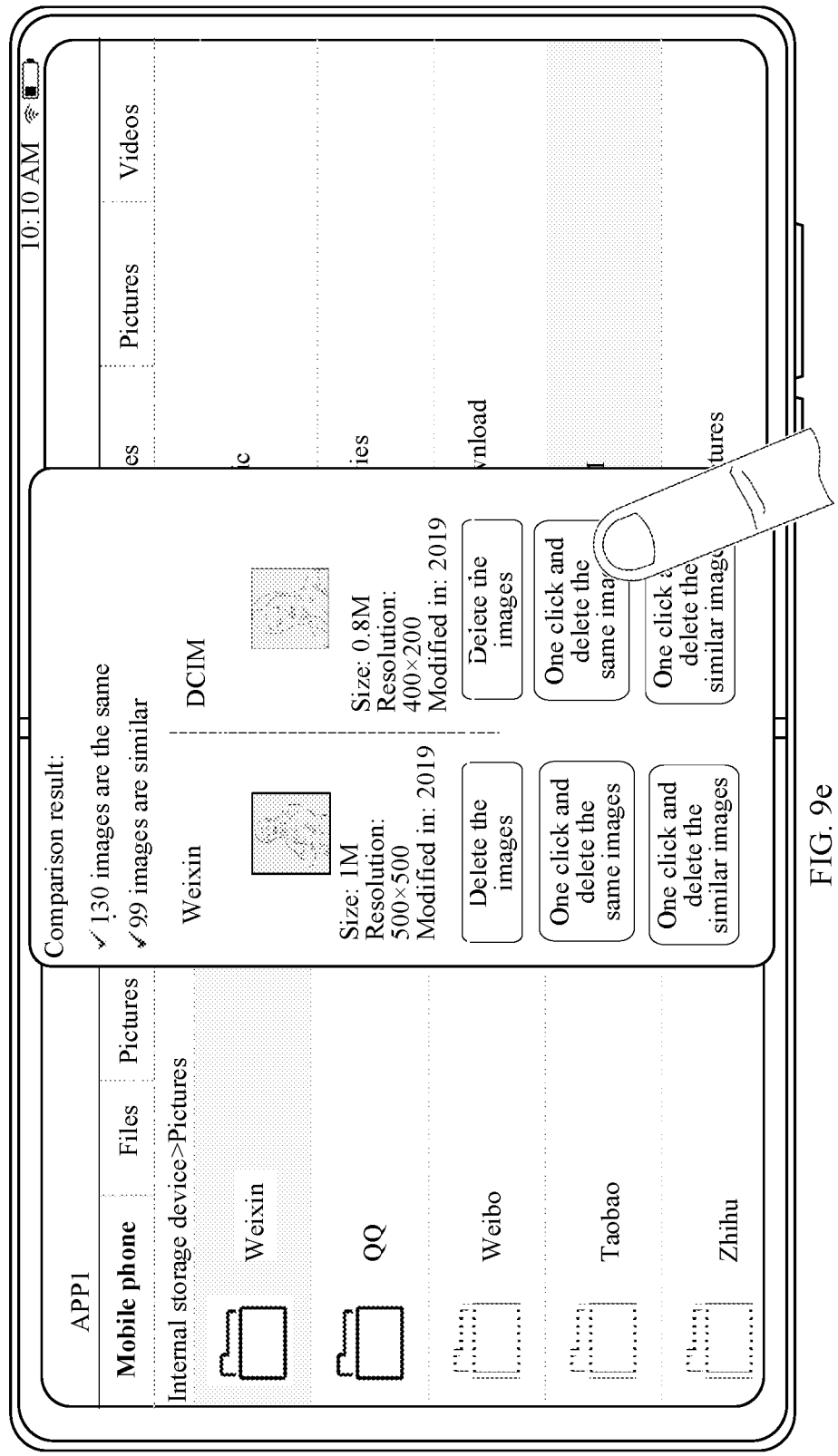

As shown in FIG. 9d, in some embodiments, during dragging of the first content by a user, a floating layer of the first content is displayed near a point where a finger of the user contacts with the first content on the touchscreen. In a process in which the user moves a finger to move the first content, the floating layer of the first content moves as the finger moves. The floating layer of the first content may be specifically a thumbnail of a file or folder that represents the first content, and is a thumbnail of the folder Weixin in this embodiment. In some embodiments, a manner of displaying the second content is similar to that of the first content, and details are not described again. S903: In some embodiments, as shown in FIG. 9e, after the first content and the second content are dragged and dropped to the third window on the touchscreen of the first electronic device, the electronic device displays the first window, where the first window includes third content displayed in a second area of the first window and a fourth option displayed in a third area of the first window.

The third content includes statistical results of same images and similar images in the folder Weixin and the folder DCIM, image thumbnails of the same images or similar images, and preview content of parameters of the same images or similar images. The parameters include a file size, a resolution, a modification time, and the like. Every two same images or every two similar images are displayed as a group in the preview content, so that the user can delete an unneeded image based on an attribute of the image. The fourth option includes at least one first editing option. In this embodiment, the at least one first editing option includes "Delete the image", "One click and delete the same images", and "One click and delete the similar images" that correspond to a first application 1, and "Delete the image", "One click and delete the same images", and "One click and delete the similar images" that correspond to a second application 1. The first editing option is used to delete content in the first application and the second application.

Figure 9F:
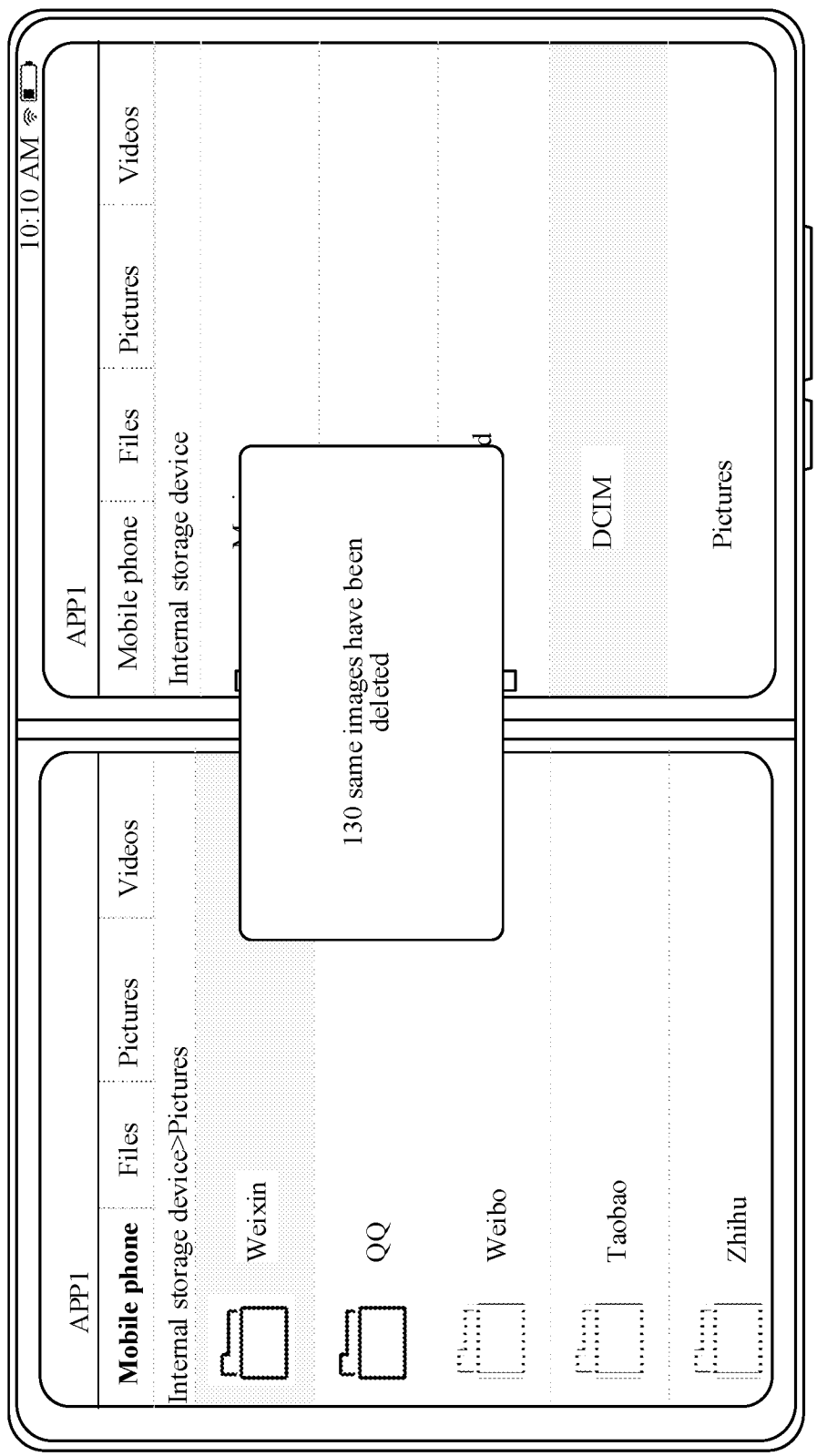

S904: In some embodiments, as shown in FIG. 9f, the first electronic device receives a fifth operation of a user, where the fifth operation includes selecting the first editing option, and the first electronic device sends a deletion instruction to the first application or the second application in response to the fifth operation.

In this embodiment, the fifth operation may be selecting the option "One click and delete the same images" that corresponds to the second application. In response to the fifth operation, the first electronic device deletes, in the first electronic device, same images in the folder DCIM and the folder Weixin, and displays a seventh window. "130 same images have been deleted" is displayed in the seventh window, indicating that operation of deleting the same images has been completed.

In some embodiments, the option "Delete the image" may be selected based on the image thumbnails of the same images or similar images and the preview content of parameters of the same images or similar images in the third content, and a respective individual image in the preview content is deleted correspondingly.

In some embodiments, the first content or the second content may be an image, a document, a video, audio, or the like.

In some of the foregoing embodiments, a user may directly obtain, in the first window, a comparison result of same or similar files, and delete one of the same or similar files each time successively based on an actual condition, or delete images in batches. As the user can directly obtain the comparison result of the similar files, the operation of deleting files by the user is simplified.

In some embodiments, as in the foregoing embodiment, after the third operation and the fourth operation are received, during dragging of the third operation and the fourth operation, a window displayed on the touchscreen may be displayed in different manners: For example, the window may be the third window and the fourth window in S302 and S303, may be the third window and the fourth window in S307, may be the second window in S308 and S309, may be the second window in S311, or may be the fifth window in S406 and S407. All the foregoing plurality of implementations may be applied to embodiments of this application, and an implementation process of user interaction interface display and a bottom layer of the electronic device may be adjusted as required. For details, refer to the foregoing descriptions. Details are not listed in a specific embodiment again.

The foregoing embodiments describes processing of content in two applications. It can be understood that the method in the foregoing embodiments in this application is applicable to processing of content in a plurality of applications. A user performs an operation on the content in the plurality of applications to enable the first electronic device to perform interactive processing on the content in the plurality of applications, and share content obtained after the interactive processing.

Figure 10:
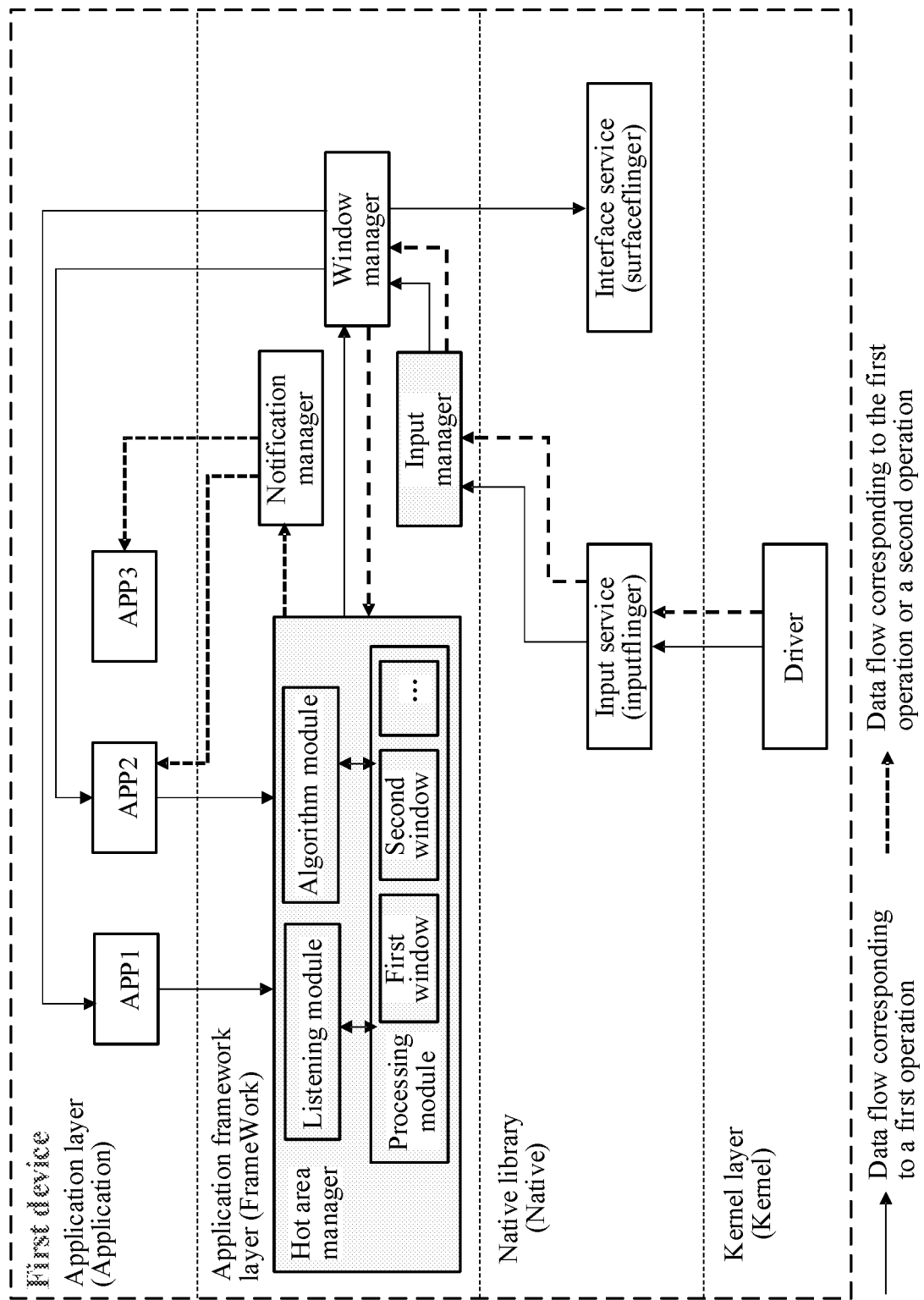
FIG. 10 is a schematic diagram of a direction of data flow of an electronic device according to an embodiment of this application.
Figure 11:
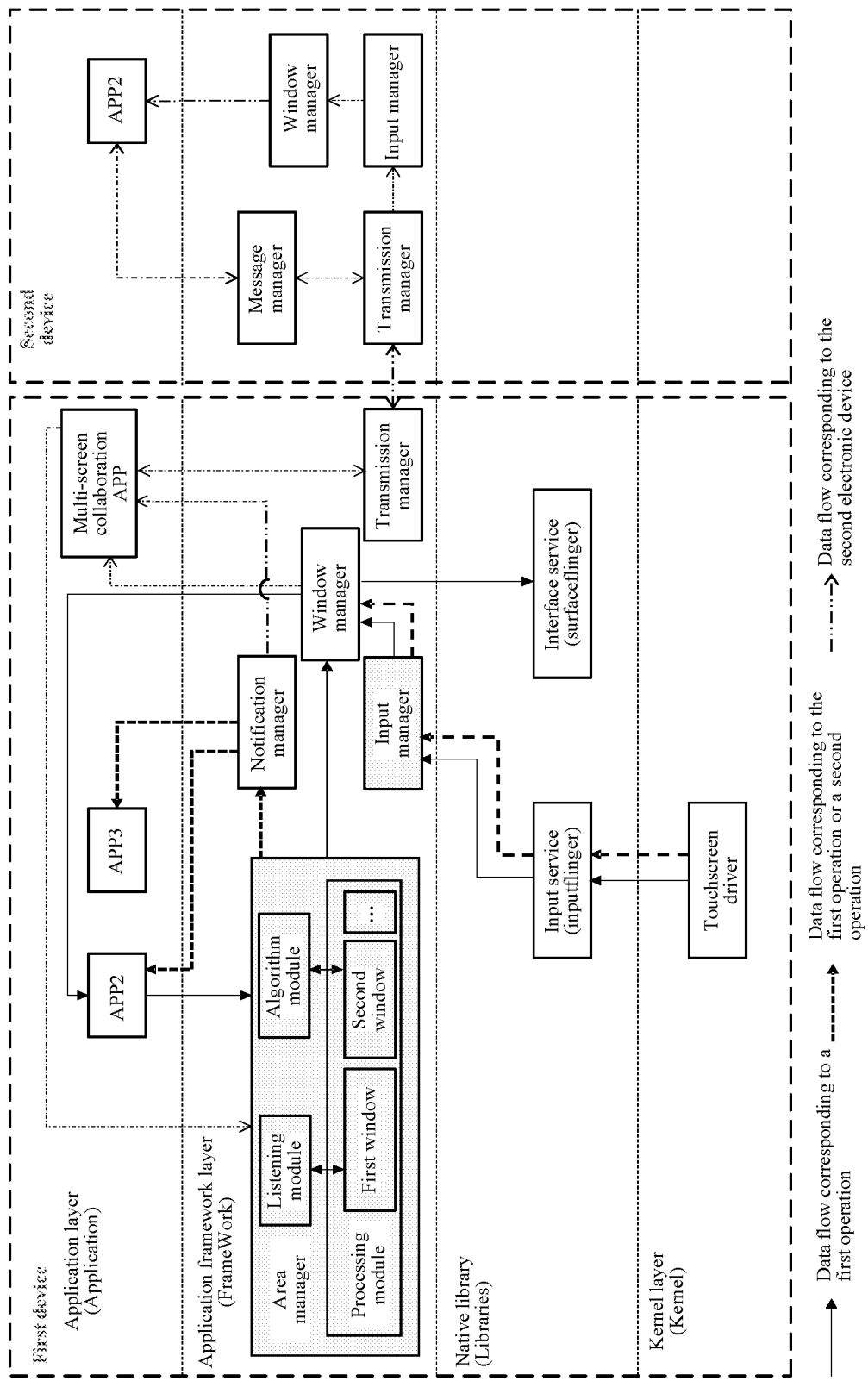
FIG. 11 is a schematic diagram of a direction of data flow of an electronic device according to an embodiment of this application.
Figure 12:
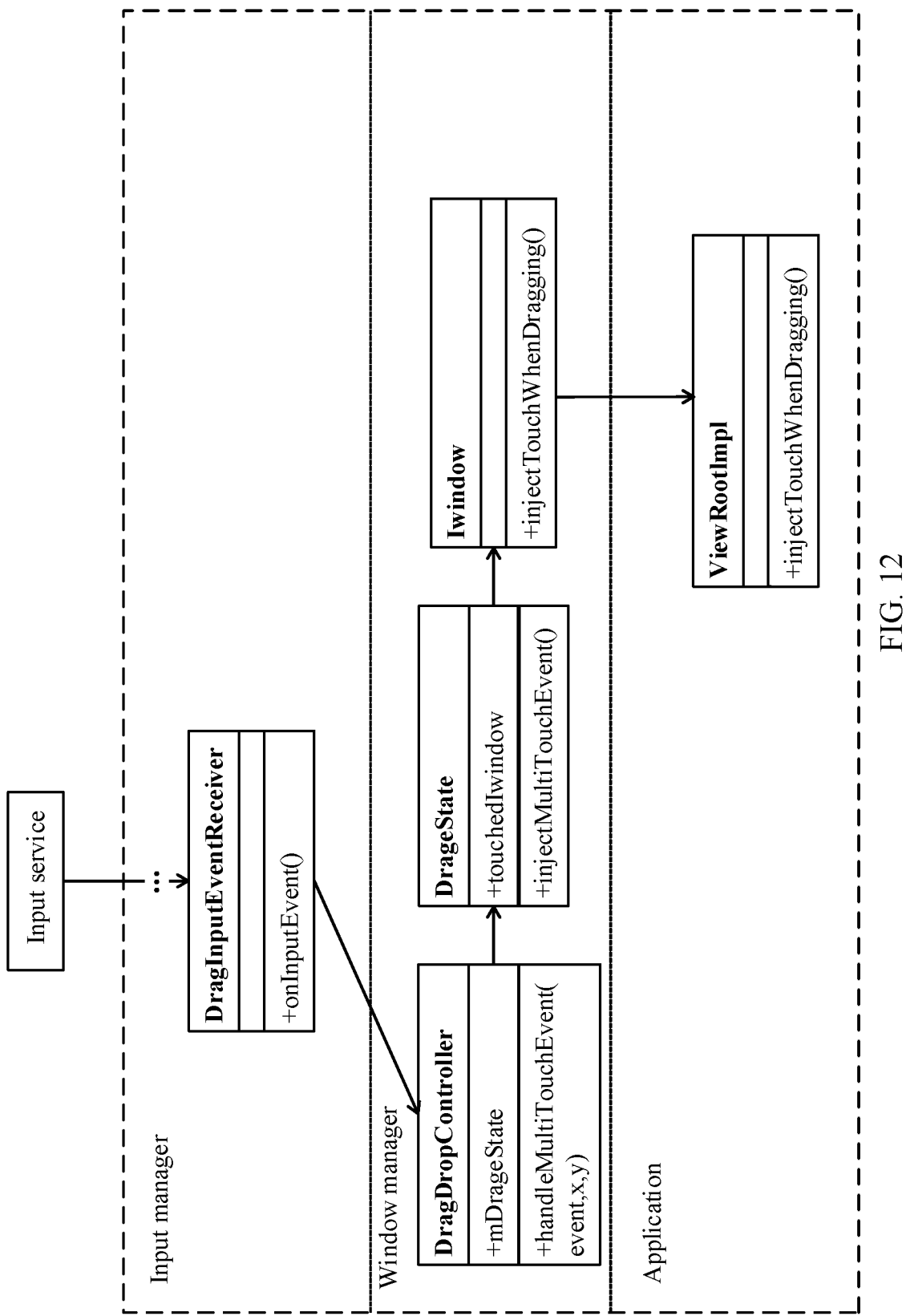
FIG. 12 is a schematic diagram of a direction of data flow of an electronic device according to an embodiment of this application.

FIG. 10 and FIG. 11 are schematic diagrams of a direction of data flow of an electronic device according to this application. With reference to a specific scenario in embodiments provided in this application, an example is used to describe a working process of an electronic device 100. In some embodiments, the method relates to the electronic device including the following modules: a touch panel driver in a kernel layer, an interface service and an input service in a native library, an input manager, a window manager, a hot area manager, a notification manager, and a transmission manager that are in an application framework layer, and a first application, a second application, and a third application in an application layer. As shown in FIG. 10 to FIG. 12, the multi-application interaction method includes:

S111: A touchscreen driver program receives an electrical signal corresponding to a first operation and an electrical signal corresponding to a second operation that are on a touchscreen, converts the electrical signal corresponding to the first operation into a first touch control parameter, converts the electrical signal corresponding to the second operation into a second touch control parameter, and sends the first touch control parameter and the second touch control parameter to the input manager by using the input service in the native library.

In some embodiments, a physical layer (for example, the touch panel) receives a touch control operation of a user, and a corresponding hardware interrupt is sent to the kernel layer. The touch panel driver in the kernel layer processes the touch control operation into a touch control parameter of an original input event that includes parameters or information, for example, a touch control coordinate and a timestamp of the touch control operation. The original input event is stored in the kernel layer.

S112: The input manager obtains the first touch control parameter and the second touch control parameter, and sends the first touch control parameter and the second touch control parameter to the window manager.

S113: The window manager obtains the first touch control parameter and the second touch control parameter, and sends the first touch control parameter to the corresponding first application and sends the second touch control parameter to the corresponding second application respectively based on a position relationship between the first touch control parameter, the second touch control parameter, and an application interface, where a first touch control operation is in an interface of a first application, and a second touch control operation is in an interface of a second application.

S114: The first application receives the first touch control parameter, and obtains first content in the interface of the first application based on the first touch control parameter; and the second application receives the second touch control parameter, and obtains second content in the interface of the second application based on the second touch control parameter.

In some embodiments, the first operation or the second operation may be a gesture of taking a screenshot of the application interface, and in this case, the first application or the second application is triggered to invoke a preset screenshot interface to take a screenshot of the application interface. The screenshot includes a screenshot of a current interface of the application or a long screenshot of an interface of the application, and the long screenshot may be all interfaces of the application, or interfaces of the application of a pre-specified length.

In some embodiments, in a case in which the operating system is the Android system, a screenshot of the application may be taken by using a programming interface mService.mWindowManager.getWindowManagerServiceExo.takeTaskSnapshot, where the screenshot includes content displayed in the current interface of the application; or a screenshot of the application may be taken by using a programming interface Instrumentation,sendPointerSync( ), where the screenshot is a long screenshot, and the long screenshot may be all content including the current interface of the application and an interface that is not displayed, or the long screenshot may include content in an interface of the application that is of a specified length. In some embodiments, if a scroll bar is provided in the application interface, the scroll bar may be controlled for movement by using a programming interface, so as to control update of the current interface. After each update, a screenshot image obtained after the interface is updated is captured, and captured screenshot images are stitched finally to obtain a long screenshot of the application interface.

S115: The touch panel driver receives an electrical signal corresponding to the third operation and an electrical signal corresponding to the fourth operation that are on the touchscreen, converts the electrical signal corresponding to the third operation into a third touch control parameter, converts the electrical signal corresponding to the fourth operation into a fourth touch control parameter, and sends the third touch control parameter and the fourth touch control parameter to the input manager by using the input service in the native library.

S116: The input manager obtains the third touch control parameter and the fourth touch control parameter, and sends the third touch control parameter and the fourth touch control parameter to the window manager. The third operation is performed on the interface of the first application and corresponds to the first content, and the third operation includes dragging; and the fourth operation is performed on the interface of the second application and corresponds to the second content, and the fourth operation includes dragging.

The window manager obtains the third touch control parameter and the fourth touch control parameter, and based on the third touch control parameter and the fourth touch control parameter, sends the third touch control parameter to the corresponding first application, and sends the fourth touch control parameter to the corresponding second application.

In some embodiments, as shown in FIG. 12, the input manager listens to the third touch control parameter and the fourth touch control parameter on the touchscreen by using a method onInputEvent( ) in a DragInputEventReceiver class. The input manager invokes a static DragDropController class to send the third touch control parameter and the fourth touch control parameter to the window manager, and the window manager processes a multi-touch event on the touchscreen by using a method handleMultiTouchEvent (event,x,y) in the DragDropController class; the window manager invokes a method injectMultiTouchEvent( ) in the Dragstate class and a method injectTouchWhenDragging( ) in the Iwindow class to inject the third touch control parameter into a window of the first application in a dragging process and inject the fourth touch control parameter into a window of the second application in the dragging process; and the first application invokes the method injectTouchWhenDragging( ) in ViewRootImp1 to obtain the third touch control parameter from the window of the first application and inject the third touch control parameter into a view control, view, that corresponds to the first application, and the second application invokes the method injectTouchWhenDragging( ) in ViewRootImp1 to obtain the fourth touch control parameter from the window of the second application and inject the fourth touch control parameter into a view control, view, that corresponds to the second application.

As each touch drag event is applied to a different application, each application corresponds to a different layer, and a processor of an electronic device processes an event at an uppermost layer at the same time. For example, the drag event in the third operation corresponds to a first layer, and the drag event in the fourth operation corresponds to a second layer. The processor first processes the drag event in the third operation in the first layer, and then processes the drag event in the fourth operation in the second layer. However, in some embodiments of this application, a listening module is configured to listen on and process multi-finger touch events. The multi-finger drag events may be set in the same layer, and the processor may process the multi-finger drag events simultaneously.

S117: The first application receives the third touch control parameter, and sends a first message to the hot area manager based on the third touch control parameter, where the first message includes the drag event in the first application and the first content; and the second application receives the fourth touch control parameter, and sends a second message to the hot area manager based on the fourth touch control parameter, where the second message includes the drag event in the first application and the second content.

In some embodiments, the first application receives the third touch control parameter, determines whether the operation is a gesture for the drag event, and determines whether content in the first application responds to the drag event. The gesture for the drag event is that a press time at a touch point exceeds a preset time threshold. The time threshold is preset by a user, and during the press, a position coordinate of the touch point changes. If the content responds to the drag event, the application may invoke the programming interface StartDrag( ) for the drag event provided by the Android system. Generally, all content in the application supports the drag event, and the application may set, as required, that the content in the application supports or does not support the drag event. A determining process of the second application is similar, and details are not described again.

In some embodiments, the first application and the second application send the first message and the second message to the hot area manager by invoking the programming interface StartDrag( ). The programming interface StartDrag( ) is a programming interface for a drag event, and is used by an application in the application layer to send information about a drag event to another module in the Android system. In embodiments of this application, the first message includes startDrag (ClipData, DragShadowBuilder, mwLocalState,flags). ClipData includes the first content in the first application. DragShadowBuilder( ) is a callback method for drawing drag shadows. myLocalState can be used to carry some lightweight mark bits or other data. flag is used to indicate an event type of drag (drag) or drop (drop). Generally, myLocalState and flag are set to default values.

In some embodiments, ClipData( ) in the message further includes additional information about the content, and the additional information may be carried by using ClipDescription, or the additional information may be included in a parameter of myLocalState.

In some embodiments, the additional information further includes an attribute or a parameter of the content, for example, a file size, a modification time, or a resolution of an image. The additional information includes a view control to which the content belongs. For example, the view control to which the content belongs may be an input box or a text editor; and/or the additional information includes a function supported by an application, for example, searching or showing a new status; and/or, in a case in which the content in the application is a relatively large file, the additional information includes an address of the file; and/or, the additional information includes a declared type.

In some embodiments, the declared type indicates whether content selected in a current application supports editing (for example, step S119), and may be obtained by invoking a new interface. Specifically, the following are declared types:

For a text type, the additional information that supports editing may be String[ ] supportMimeType1={"text/plain" };xxx.addMimeType(view1, supportMimeType1);

for text and image types, the additional information that supports editing may be String[ ]supportMimeType2={"text/plain","image/jpeg" };xxx.addMimeType(view2, supportMimeType2); and for any type, the additional information that supports editing may be String[ ]supportMimeType3={"*/*" }; xxx.addMimeType(view3, supportMimeType3).

In some embodiments, m an embodiment, content of a screenshot may be displayed by using a floating layer by invoking DragShadowBuilder( ).

S118: During dragging of the first content and the second content, the hot area manager controls, by invoking the window manager and the interface service based on the third touch control parameter or the fourth touch control parameter, or based on the obtained first message and second message, the touchscreen to display a window corresponding to at least one first area or fourth area. The window corresponding to the first area or the fourth area includes a second window, a third window, or a fourth window.

In some embodiments, after a processing module of the hot area manager receives the first message and the second message, the hot area manager controls the touchscreen to display the window corresponding to the at least one first area or fourth area.

In some embodiments, the processing module of the hot area manager triggers, based on the third touch control parameter and the fourth touch control parameter, the touchscreen to display the window corresponding to the at least one first area or fourth area. In some embodiments, the processing module of the hot area manager invokes the listening module to obtain the third touch control parameter and the fourth touch control parameter, and when determining that both the operations corresponding to the third touch control parameter and the fourth touch control parameter are long-press gestures, or that both the operations corresponding to the third touch control parameter and the fourth touch control parameter are drag event gestures, triggers the touchscreen to display the window corresponding to the at least one first area or fourth area.

In some embodiments, the processing module of the hot area manager may further trigger, based on whether the first content sent by the first application and the second content sent by the second application are obtained, the touchscreen to display at least one hot area. The first application sends the first content to the hot area manager by using the first message, and the second application sends the second content to the hot area manager by using the second message.

In some embodiments, a system on the electronic device presets at least one area based on a requirement for interactive content processing. The area may be a position corresponding to a window (window). In some embodiments, the area includes the first area and the fourth area. The first area corresponds to the second window or the third window, and the fourth area corresponds to the fourth window.

In some embodiments, the processing module of the hot area manager adjusts the window corresponding to the preset area to a highest layer (a window in the highest layer is displayed in the first layer), and draws the window corresponding to the preset area. The hot area manager draws the area by invoking the window manager and the interface service (surfaceflinger), so that the touchscreen of the electronic device displays the area. In some embodiments, a layer of the window may be set by using FIRST_SYSTEM_WINDOW+X. The layer of the window is adjusted to the highest layer by setting a value of X, and the processor processes events sequentially based on a layer of a window.

The first electronic device may create a window by invoking a method wms.addWindow in the window manager, and draw the window by using the interface service (surfaceflinger). The method wms.addWindow may be used to set an attribute of a window, for example, an area and a layout corresponding to the window. For a specific area and layout, refer to the descriptions in embodiments. In some embodiments. FLAG_NOT_FOCUSABLE indicating an attribute that the window is not focusable is set, FLAG_WATCH_OUTSIDE_TOUCH is set to listen on an external click event, PRIVATE_FLAG_NO_MOVE_ANIMATION indicating an attribute that there is no window animation is set, and the like.

In some embodiments, during a drag event, after receiving a message (the first message or the second message) of the drag event, the hot area manager returns information ACTION_DRAG_STARTED (drag is started) to the system by invoking a method getAction( ), indicating that the drag event will be further processed, initializes ClipData, and stores the data in the listening module.

During dragging, the hot area management module invokes, based on the received first message or second message, the method DragShadowBuilder( ) for drawing drag shadows to draw a floating layer for displaying the first content, where the floating layer moves as a finger moves. The floating layer displays a text, an image thumbnail, a file icon, a folder icon, and the like in the first content or the second content. The floating layer indicates that the first content or the second content is being dragged. A size and a position of the floating layer may be set by using the callback method.

S119: The hot area management program is further configured to: after the first content and the second content are dragged and dropped to the window corresponding to the first area or the fourth area on the touchscreen of the first electronic device, the electronic device displays a first window, where the first window includes third content displayed in a second area of the first window and a first option displayed in a third area of the first window, the third content is related to the first content and the second content, and the first option includes at least one option for sharing.

In some embodiments, the processing module obtains, by using the listening module, the third touch control parameter of the third operation and the fourth touch control parameter of the fourth operation when the content is dropped, and determines, based on the third touch control parameter and the fourth touch control parameter, whether both the third touch control parameter and the fourth touch control parameter are in a window corresponding to a same area when the content is dropped.

In some embodiments, the processing module invokes the listening module to listen on an Action up (hand lift) event of the third operation, and obtains the third touch control parameter when the third operation is dropped. Action up is a state in which a user lifts the hand to end a drag event and a touch point is no longer pressed. In some embodiments, the touch point at the start of the third operation is not limited. The touch point at the start of the third operation may be in the window corresponding to the first area or the fourth area, and a touch point when the third operation is dropped is also in the same window. The third operation may be dragging in the same window. An operation for the fourth touch control parameter is similar, and details are not described again.

In some embodiments, a first function or a second function corresponding to the window is performed on the first content and the second content based on a window including the third touch control parameter and the fourth touch control parameter when the content is dropped. The first function is a comparison function, and the second function is a combination function, or the first function is a combination function, and the second function is a comparison function. The third content is content obtained after a comparison between or a combination of the first content and the second content.

In some embodiments, after the third operation and the fourth operation are dropped, the hot area manager returns a message ACTION_DROP (to drop down) to the system by invoking the method getAction( ), and obtains the data ClipData in the listening module by invoking a method getClipData( ). In some embodiments, the data Clipdata is selected text, image, video, or audio data. In other embodiments, in a case in which the first content and the second content are relatively large files or folders, the data Clipdata is an address of a file or folder. In this case, the hot area manager obtains the address of the file or folder from Clipdata, and obtains content of the file or folder through the address.

In some embodiments, the processing module includes an algorithm module, and the processing module compares or combines the first content and the second content by invoking the algorithm module.

In some embodiments, the algorithm module may be used in the embodiment corresponding to FIG. 3. The algorithm module includes a product comparison algorithm, a word set with a preset common product parameter or attribute, and a product comparison template. In some embodiments, the first column of the product comparison template is a product parameter type, and another column is a specific product parameter value. In a case in which two images, for example, screenshots of the application interface in the embodiment corresponding to FIG. 3, are received, the algorithm module may extract a text in an image by OCR (Optical Character Recognition, optical character recognition), determine, based on the preset word set, whether the scenario is a scenario for product comparison, extract a product parameter or attribute if the scenario is the scenario for product comparison, and generate a product comparison result according to the preset product comparison template.

In some embodiments, the algorithm module may be used in the embodiments corresponding to FIG. 4 to FIG. 6*a*(1) to FIG. 6*g*(2) and FIG. 8*a*(1) to FIG. 8*f*(2). The algorithm module includes a combination algorithm, and the combination algorithm is used to combine texts, images, videos, or audio.

In some embodiments, in a case in which the content includes a text or an image, the combination includes stitching text content or image content together, so that the text and the image are combined into at least one image. In the combination method, an image processor of the system may be invoked, and a related template, for example, a border or a layout, may be obtained from the image processor. In a case in which the content includes a video or audio, the combination includes stitching the video or audio and an image or a text together, or stitching a video and a video together, audio and audio together, or a video and audio together, so that combined content is a video or audio. The combination method may be used to edit a video or audio by invoking a media processor of the system.

In some embodiments, the algorithm module may be used in the embodiment corresponding to FIG. 7. The algorithm module includes a text comparison algorithm, and is configured to compare a text with a text. The comparison algorithm may be a line-by-line comparison algorithm, a byte-by-byte comparison algorithm, the edit-distance-based LD algorithm, the Nakatsu algorithm, or an application that employs text comparison.

In some embodiments, the algorithm module may be used in the embodiment corresponding to FIG. 9. The algorithm module includes a file comparison algorithm, and may determine, by comparing MD5 values of files or determining binary information of the files, whether the files are the same. MD5 is short for message-digest algorithm 5 (Message-Digest Algorithm 5). The algorithm calculates information of any length bit by bit to generate a binary 128-bit message digest. Different files have different message digests. By determining whether the MD5 values are the same, whether the files are the same can be determined.

In some embodiments, the algorithm module may be used in the embodiment corresponding to FIG. 9. The algorithm module includes a similar image comparison algorithm, and calculates a similarity between two similar images by using the comparison algorithm. The comparison algorithm may be a color distribution algorithm, a content feature algorithm, a perceptual Hash algorithm, an application that employs image comparison, or the like.

In some embodiments, a third function is determined based on the additional information in the first message and the second message, where the third function includes sharing, searching, editing, and the like. Compared or combined content and an option for performing the third function are displayed in the first window, where the option includes a first option, a third option, and a fourth option, the first option is an option for sharing, the third option is a search option, and the fourth option is an editing option.

In some embodiments, a corresponding third function is determined based on application types of the first application and the second application. For example, the application is a shopping application or a browser application, and the third function of this type of application is preset to including searching; or the application is a social networking application, and the second function of this type of application is preset to including sharing. In some embodiments, that the corresponding third function includes editing is determined based on a declaration type in the additional information that supports editing; and that the corresponding third function includes editing is determined based on the view control to which the content belongs in the additional information. For example, in the additional information, the view control to which the content belongs is an input box, and a system default attribute of the input box is that editing is supported. Therefore, the third function includes editing. In some embodiments, the third function includes, by default, a function for sharing.

In some embodiments, the hot area manager invokes the window manager and the interface service (surfaceflinger) to draw the first window, where the first window includes the third content displayed in the second area of the first window and the first option displayed in the third area of the first window. The third content is content obtained after a comparison between or a combination of the first content and the second content, and the first option is an option for sharing. The third area of the first window may further include a second option, a third option, a fourth option, and a fifth option.

In some embodiments, the third content may be displayed by using an editable view control. For example, a text may be displayed by using textview, an image may be displayed by using imageview, and textview and imageview are editable view controls. A user may edit the third content by using the editable view control. In some embodiments, for example, in the embodiments corresponding to FIG. 4 and FIG. 8a(1) to FIG. 8f(2), moving, copying, changing a format of deleting a text from, or adding a text to the text content is performed. In some embodiments, for example, in the embodiments corresponding to FIG. 4 and FIG. 6a(1) to FIG. 6g(2), the image content is zoomed in, zoomed out, cropped, stitched, moved, or the like.

In some embodiments, after the first window appears, the second window or the third window corresponding to the first area and/or the fourth window corresponding to the fourth area are/is no longer displayed on the touchscreen, and the window may be no longer displayed by setting a layer of the window.

S120: In response to an operation of the option selected by a user, the hot area manager sends a third message to the selected third application by using the message manager, and after receiving the third message, the third application performs a function corresponding to the third message, and jumps to an interface for executing the third message.

In some embodiments, the third message includes a sharing instruction and shared content. In some embodiments, for example, the embodiment corresponding to FIG. 3, the third message includes a searching instruction and searched content. In some embodiments, for example, the embodiments corresponding to FIG. 7 and FIG. 9, the third message includes an editing instruction.

In some embodiments, the third application selects, based on a programming interface for receiving a message, to receive an original text or image or convert content into a format receivable for the application and then receive the content.

In some embodiments, as shown in FIG. 11, the first application is an application on the first electronic device, the second application is an application on a second electronic device, and the second electronic device projects the second application onto the touchscreen of the first electronic device through screen projection. In some embodiments, a screen projection method of the second application is that a fourth application is provided on the first electronic device, where the fourth application is a multi-screen collaboration application. An interface of the multi-screen collaboration application is used to display the second application on the touchscreen of the first electronic device, and the multi-screen collaboration application is used to receive data from the second application or send data to the second application.

In this case, when the first electronic device sends a message to the second application, the fourth application on the first electronic device receives the message, and the fourth application sends the message to the second application by using a transmission manager of the first electronic device and a transmission manager of the second electronic device. When the second application sends a message and data to the first electronic device, the second application sends the message to the fourth application by using the transmission manager of the second electronic device and the transmission manager of the first electronic device.

In some embodiments, most steps are similar to those in the foregoing embodiments, and details are not described herein again. S116 and S117 are different from those in the foregoing embodiments. Details are provided below.

In step S116, "the fourth operation is performed on the interface of the second application and corresponds to the second content" may include: The fourth touch control parameter of the fourth operation is in an interface of the second application on the touchscreen of the first electronic device, but actually, an application for the fourth touch control parameter corresponding to the first electronic device is the multi-screen collaboration application on the first electronic device.

In step S116, "sends the fourth touch control parameter to the corresponding second application" may include:

The window manager sends the fourth touch control parameter to the multi-screen collaboration application; after the multi-screen collaboration application receives the fourth touch control parameter, the multi-screen collaboration application sends a fourth message to the second application on the second electronic device by using the transmission manager, where the fourth message includes a converted fourth touch control parameter and an instruction for returning data; and the second electronic device receives the fourth message, and transmits the fourth message to the second application by using the transmission manager and the message manager. The instruction for returning data instructs the second application to return, after the second application receives the fourth touch control parameter, an event to be triggered and an event parameter to the multi-screen collaboration application. The instruction for returning data may be a special flag bit, a flag, or another user-defined manner. The converted fourth touch control parameter is a second coordinate relative to the second electronic device mapped by the multi-screen collaboration application from a first coordinate, of the fourth touch control parameter, relative to the first electronic device based on a pre-stored position and proportion of the touchscreen.

In step S117, "the second application receives the fourth touch control parameter, and sends a second message to the hot area manager based on the touch control parameter, where the second message includes the drag event in the first application and the second content" includes:

The second application on the second electronic device receives the fourth touch control parameter in the fourth message, determines whether the operation is a gesture for the drag event, and determines whether content in the application responds to the drag event. If the second content in the second application responds to the drag event, the second application sends a fifth message to the multi-screen collaboration application in response to the instruction for returning data in the fourth message. The fifth message includes the drag event and a parameter of the drag event. In some embodiments, the parameter of the drag event includes at least ClipData. The second electronic device sends the fifth message to the first electronic device by using the message manager and the transmission manager. After receiving the fifth message, the first electronic device transmits the fifth message to the multi-screen collaboration application by using the transmission manager.

The multi-screen collaboration application on the first electronic device receives the fifth message, invokes the programming interface StartDrag( ) for the drag event based on the drag event and the parameter of the drag event in the fifth message, and sends the second message to the hot area manager. The second message includes startDrag (ClipData. DragShadowBuilder, myLocalState, flags), where ClipData is the parameter of the drag event sent in the fifth message, and content in ClipData may be displayed in a floating-layer manner and move as a finger moves between positions on the first electronic device.

In a process of performing steps S115 to S119, in a case in which the fourth operation is performed on the interface of the multi-screen collaboration application on the first electronic device, because the second application on the second electronic device has not generated a new event, what is displayed in the interface of the second application on the second electronic device does not change.

In addition, in step S120, in a case in which the third application is an application on the second electronic device, the third message is sent to the multi-screen collaboration application by using a message manager of the first electronic device. The multi-screen collaboration application sends the third message to the third application on the second electronic device by using the transmission manager of the first electronic device, the transmission manager of the second electronic device, and a message manager of the second electronic device. The third application executes an instruction for the third message, and jumps to an interface for executing the third message.

In this process, the third application displayed on the touchscreen of the second electronic device jumps to the interface for executing the third message; and at the same time, the multi-screen collaboration application on the first electronic device displays the interface on the touchscreen of the second electronic device.

Related parts of the method embodiments in this application may be mutually referenced. The apparatuses provided in the apparatus embodiments are configured to perform the methods provided in the corresponding method embodiments. Therefore, for understanding the apparatus embodiments, refer to related parts in the related method embodiments.

In addition, functional units in embodiments of this application may be integrated into one processing unit, each of the units may exist alone physically, or two or more units are integrated into one unit.

In this application, "and/or" describes an association relationship between associated objects, and indicates that three relationships may exist. For example. A and/or B may indicate the following three cases: A exists alone, both A and B exist, and B exists alone, where A and B may be singular or plural. The character "/" usually indicates an "or" relationship between associated objects.

In this application, "at least one" means one or more, and "plurality of" means two or more. "At least one of the following items (pieces)" or a similar expression thereof refers to any combination of these items, including any combination of singular items (pieces) or plural items (pieces). For example, "at least one of a, b, or c", or "at least one of a, b, and c" may indicate: a, b, c, a-b (that is, a and b), a-c, b-c, or a-b-c, where a, b, and c may be singular or plural.

It should be understood that sequence numbers of the foregoing processes do not mean execution sequences in embodiments of this application. All or some of the steps may be performed in parallel or in sequence. The execution sequences of the processes should be determined based on functions and internal logic of the processes, and should not be construed as any limitation on the implementation processes of embodiments of this application.

It should be understood that although terms "first", "second", "third", and the like may be used in embodiments of the present invention to describe various messages, requests, and terminals, the messages, the requests, and the terminals are not limited by the terms. These terms are merely used to distinguish the messages, requests, and terminals. For example, without departing from the scope of embodiments of the present invention, a first terminal may also be referred to as a second terminal, and similarly, a second terminal may also be referred to as a first terminal.

Depending on the context, for example, the word "if" used herein may be explained as "while" or "when" or "in response to determining" or "in response to detection". Similarly, depending on the context, the phrase "if determining" or "if detecting (a stated condition or event)" may be explained as "when determining" or "in response to determining" or "when detecting (the stated condition or event)" or "in response to detecting (the stated condition or event)".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, a corresponding process in the foregoing method embodiments may be referred to. Details are not described herein again.

A person of ordinary skill in the art should understand that all or some of the steps of the method specified in any foregoing embodiment may be implemented by program instructing related hardware. The program may be stored in a readable storage medium in a device, for example, a flash memory, or an EEPROM. When the program runs, the program executes all or part of the steps described above.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (that may be a personal computer, a server, a network device, a terminal device, or the like) to perform all or some of the steps of the methods in embodiments of this application. The foregoing storage medium includes: any medium that can store a program code, for example, a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that modifications can still be made to the technical solutions described in the foregoing embodiments or equivalent replacements can still be made to some technical features thereof, without departing from the spirit and scope of the technical solutions of embodiments of the present invention.

What is claimed is:

1. A multi-application interaction method implemented by a first electronic device, wherein the multi-application interaction method comprises:
    displaying a first interface of a first application and a second interface of a second application;
    receiving a first operation on the first interface;
    obtaining, in response to the first operation, first content in the first interface;
    receiving a second operation on the second interface;
    obtaining, in response to the second operation, second content in the second interface;
    simultaneously receiving a third operation on the first content and a fourth operation on the second content; and
    displaying a first window after the first content and the second content are dragged to a first area on a touchscreen of the first electronic device,
    wherein the first window comprises third content displayed in a second area of the first window and a first option displayed in a third area of the first window,
    wherein the third area further comprises a second option of comparing content of a first part of the first content with a second part of the second content to obtain the third content, and
    wherein the first option comprises at least one option for sharing.

2. The multi-application interaction method of claim 1, further comprising:
    displaying a second window in the first area in a first display manner during the operation on the first content and the operation on the second content, wherein the first display manner is different from a second display manner of the first interface or the second interface, and
    wherein the operation on the first content and the operation on the second content comprise dragging the first content and the second content to the second window.

3. The multi-application interaction method of claim 1, wherein the multi-application interaction method further comprises:
    receiving a fifth operation of selecting the second option; and
    displaying, in response to the fifth operation, the third content in the second area.

4. The multi-application interaction method of claim 1, further comprising:
    displaying, during the operations on the first content and the second content, a second window in the first area in a first display manner, wherein the first display manner is different from a display manner of the first interface or a display manner of the second interface, and wherein the second window comprises a first function;
    displaying, during the operations on the first content and the second content, a third window in a fourth area in a second display manner, wherein the second display manner is different from the display manner of the first interface or the display manner of the second interface, wherein the third window comprises a second function;
    further displaying the first window after the first content and the second content are dragged to the second window on the touchscreen; and
    obtaining the third content by processing the first content and the second content, wherein the processing corresponds to the first function.

5. The multi-application interaction method of claim 4, wherein the first function comprises comparing two pieces of content and the second function comprises combining the two pieces of content, or wherein the first function comprises combining two pieces of content and the second function comprises comparing the two pieces of content.

6. The multi-application interaction method of claim 4, further comprising:
    displaying a first identifier of the first function in the second window; and displaying a second identifier of the second function in the third window.

7. The multi-application interaction method of claim 4, wherein:
the first area is in the middle of the touchscreen and the fourth area is on any side of the touchscreen;
the first area is on any side of the touchscreen and the fourth area is in the middle of the touchscreen; or
both the first area and the fourth area are in the middle of or on any side of the touchscreen.

8. The multi-application interaction method of claim 1, wherein the third content is editable by moving, copying, changing a format of, deleting text from, or adding text to text content, comprises zooming in, zooming out, cropping, stitching, or moving image content, or comprises applying a first background color or a first background image to the third content, and wherein the multi-application interaction method further comprises:
receiving a fifth operation of selecting the at least one option for sharing;
displaying, in response to the fifth operation, a first identifier of at least one application;
receiving a sixth operation of selecting a second identifier of a third application, wherein the third application is one of the at least one application; and
sending, in response to the sixth operation, the third content or the third content with an edit to the third application.

9. The multi-application interaction method of claim 1, wherein the first area is in the middle of the touchscreen or on any side of the touchscreen.

10. The multi-application interaction method of claim 1, wherein the third area further comprises a second option comprising at least one first search option indicating either the first application to perform a first search based on all or a second part of the second content or the second application to perform a second search based on all or a first part of the first content, and wherein the multi-application interaction method further comprises:
receiving a fifth operation of selecting the at least one first search option; and
displaying, in response to the fifth operation, either a first result based on the first search in the first interface or a second result based on the second search in the second interface.

11. The multi-application interaction method of claim 1, wherein the third area further comprises a second option comprising at least one first editing option indicating either the first application to perform first editing processing of deleting the first content, inserting the second content, or replacing the first content with the second content in the first interface or the second application to perform second editing processing of deleting the second content, inserting the first content, or replacing the second content with the first content in the second interface, and wherein the multi-application interaction method further comprises:
receiving a fifth operation of selecting the at least one first editing option; and
displaying, in response to the fifth operation, either fourth content based on the first editing processing in the first interface or fifth content based on the second editing processing in the second interface.

12. The multi-application interaction method of claim 1, further comprising:
obtaining, by taking a screenshot of the first interface, fourth content displayed in the first interface;
obtaining fifth content selected through a drag operation in the first interface; or
selecting an application in the first interface and obtaining all content of a file of the selected application.

13. The multi-application interaction method of claim 1, wherein the first content or the second content comprises one or more texts, images, videos, or audio pieces.

14. The multi-application interaction method of claim 1, wherein the first content comprises at least one first text or at least one first image, wherein the second content comprises at least one second text or at least one second image, and wherein the multi-application interaction method further comprises:
receiving a fifth operation of selecting the at least one option for sharing; and
sharing, in response to the fifth operation, an image corresponding to the third content, wherein the image is based on combining a first part of the first content and a second part of the second content.

15. The multi-application interaction method of claim 1, further comprising:
displaying the first interface in a fourth area on the touchscreen, and the second interface in a fifth area on the touchscreen, wherein the first electronic device comprises the first application and the second application; or
displaying the first interface in the fourth area and the second interface in the fifth area, wherein the first electronic device comprises the first application, and wherein the second interface is a projection of a third interface of the second application received from a second electronic device.

16. The multi-application interaction method of claim 15, wherein a third application corresponding to the at least one option for sharing is either on the first electronic device or on the second electronic device.

17. The multi-application interaction method of claim 15, wherein the first area overlaps a first part of the fourth area and a second part of the fifth area.

18. A computer program product comprising computer-executable instructions that are stored on a non-transitory computer-readable storage medium and that, when executed by a processor, cause an electronic device to:
display a first interface of a first application and a second interface of a second application;
receive a first operation on the first interface;
obtain, in response to the first operation, first content in the first interface;
receive a second operation on the second interface;
obtain, in response to the second operation, second content in the second interface;
simultaneously receive a third operation on the first content and a fourth operation on the second content; and
display a first window after the first content and the second content are dragged to a first area on a touchscreen of the electronic device,
wherein the first window comprises third content displayed in a second area of the first window and a first option displayed in a third area of the first window,
wherein the third area further comprises a second option of comparing content of a first part of the first content with a second part of the second content to obtain the third content, and
wherein the first option comprises at least one option for sharing.

19. An electronic device comprising:
a touchscreen comprising a first area; and
a processor coupled to the touchscreen and configured to:
display a first interface of a first application and a second interface of a second application;
receive a first operation on the first interface;
obtain, in response to the first operation, first content in the first interface;
receive a second operation on the second interface;
obtain, in response to the second operation, second content in the second interface;
simultaneously receive a third operation on the first content and a fourth operation on the second content; and
display a first window after the first content and the second content are dragged to the first area,
wherein the first window comprises third content displayed in a second area and a first option displayed in a third area of the first window,
wherein the third area further comprises a second option of comparing content of a first part of the first content with a second part of the second content to obtain the third content, and
wherein the first option comprises at least one option for sharing.

20. The electronic device of claim 19, further comprising a memory coupled to the processor and configured to store a touchscreen driver program, an interface service program, an input manager program, a window manager program, a hot area manager program, a notification manager program, the first application, and the second application, and wherein the processor is further configured to:
execute the touchscreen driver program and the interface service program to enable the electronic device to display the first interface and the second interface;
execute the touchscreen driver program, the input manager program, and the window manager program to enable the electronic device to obtain the first content and to obtain the second content;
execute the touchscreen driver program, the input manager program, and the window manager program to enable the electronic device to simultaneously receive the third operation and a and the fourth operation; and
execute the hot area manager program, the window manager program, the interface service program, and the touchscreen driver program to enable the electronic device to display the first window after the first content and the second content are dragged to the first area.

* * * * *